(12) United States Patent
Song et al.

(10) Patent No.: US 9,378,588 B2
(45) Date of Patent: Jun. 28, 2016

(54) MOBILE TERMINAL AND METHOD OF CONTROLLING APPLICATIONS OF THE SAME

(75) Inventors: Yoo Mee Song, Seoul (KR); Hye Youn Cho, Seoul (KR); I Su Byun, Seoul (KR); Yee Rang Yun, Seoul (KR); Woo Jin Suh, Seoul (KR); Byung Sang Yeo, Gyeonggi-do (KR); Sang Hyuck Lee, Gyeonggi-do (KR); Seong Yoon Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 851 days.

(21) Appl. No.: 12/761,137

(22) Filed: Apr. 15, 2010

(65) Prior Publication Data

US 2011/0134110 A1 Jun. 9, 2011

(30) Foreign Application Priority Data

Dec. 7, 2009 (KR) .................. 10-2009-0120463

(51) Int. Cl.
*G06F 3/0481* (2013.01)
*G06F 3/0488* (2013.01)
*G06T 19/00* (2011.01)

(52) U.S. Cl.
CPC ............ *G06T 19/00* (2013.01); *G06F 3/04815* (2013.01); *G06F 2203/04802* (2013.01); *G06F 2203/04803* (2013.01); *G06T 2200/24* (2013.01); *G09G 2370/24* (2013.01)

(58) Field of Classification Search
CPC ............ G06F 2203/04802; G06F 2203/04803; G06F 3/04886; G06F 3/04815; Y10S 715/976; G06T 19/00; G06T 2200/24; G09G 2370/24

USPC .................. 715/778, 783, 766, 794–796, 782
See application file for complete search history.

(56) References Cited

U.S. PATENT DOCUMENTS

| | | | | |
|---|---|---|---|---|
| 5,303,388 A * | 4/1994 | Kreitman et al. | ............. | 715/836 |
| 5,880,733 A * | 3/1999 | Horvitz et al. | ................ | 715/850 |
| 6,008,809 A * | 12/1999 | Brooks | ......................... | 715/792 |
| 6,577,330 B1* | 6/2003 | Tsuda et al. | .................. | 715/782 |
| 6,597,358 B2* | 7/2003 | Miller | ................ G06F 3/04815 345/427 |
| 6,621,509 B1* | 9/2003 | Eiref et al. | ..................... | 715/836 |
| 6,710,788 B1* | 3/2004 | Freach et al. | ................. | 715/778 |
| 7,134,095 B1* | 11/2006 | Smith et al. | .................... | 715/860 |
| 7,216,305 B1* | 5/2007 | Jaeger | ........................... | 715/849 |
| 7,263,667 B1* | 8/2007 | Hoellerer et al. | ............. | 715/782 |
| 7,441,201 B1* | 10/2008 | Printezis | ...................... | 715/762 |
| 7,487,467 B1* | 2/2009 | Kawahara et al. | ............ | 715/810 |

(Continued)

FOREIGN PATENT DOCUMENTS

KR 10-0686956 B1 2/2007

*Primary Examiner* — Amy Ng
*Assistant Examiner* — William Wong
(74) *Attorney, Agent, or Firm* — Birch, Stewart, Kolasch & Birch, LLP

(57) ABSTRACT

A mobile terminal and method of controlling applications of the same are disclosed, by which each operation of all applications currently executed in a multitasking mode can be effectively controlled within one picture. The present invention includes executing a plurality of applications, displaying an execution picture of a first application among a plurality of the executed applications on a screen, and displaying a 3D polyhedron displaying a control window of at least one of a plurality of the applications except the first application on a corresponding facet of the 3D polyhedron on a screen in the course of displaying the execution picture of the first application.

4 Claims, 91 Drawing Sheets

(56) References Cited

U.S. PATENT DOCUMENTS

| | | | |
|---|---|---|---|
| 7,595,810 B2* | 9/2009 | Louch | 345/629 |
| 2001/0003835 A1* | 6/2001 | Watts | 709/318 |
| 2001/0040571 A1* | 11/2001 | Miller | 345/419 |
| 2002/0109727 A1* | 8/2002 | Kono | 345/783 |
| 2003/0142136 A1* | 7/2003 | Carter | G06F 3/04815 715/782 |
| 2005/0138575 A1* | 6/2005 | Hashimoto et al. | 715/815 |
| 2006/0020898 A1* | 1/2006 | Kim et al. | 715/764 |
| 2006/0274060 A1* | 12/2006 | Ni et al. | 345/419 |
| 2007/0028187 A1* | 2/2007 | Katsuyama | 715/810 |
| 2007/0089152 A1* | 4/2007 | Patten et al. | 725/134 |
| 2007/0124699 A1* | 5/2007 | Michaels | 715/837 |
| 2007/0220445 A1* | 9/2007 | Yach et al. | 715/790 |
| 2007/0250787 A1* | 10/2007 | Kawahara et al. | 715/782 |
| 2008/0016443 A1* | 1/2008 | Hiroshima et al. | 715/702 |
| 2008/0016471 A1* | 1/2008 | Park | 715/848 |
| 2008/0034314 A1* | 2/2008 | Louch et al. | 715/778 |
| 2008/0163082 A1* | 7/2008 | Rytivaara | 715/762 |
| 2008/0266289 A1* | 10/2008 | Park | 345/419 |
| 2009/0141024 A1* | 6/2009 | Lee et al. | 345/420 |
| 2009/0150823 A1* | 6/2009 | Orr et al. | 715/788 |
| 2009/0158212 A1* | 6/2009 | Dykstra-Erickson et al. | 715/811 |
| 2009/0164945 A1* | 6/2009 | Li | 715/849 |
| 2009/0187862 A1* | 7/2009 | DaCosta | 715/836 |
| 2009/0249235 A1* | 10/2009 | Kim | G06F 3/0481 715/765 |
| 2010/0050129 A1* | 2/2010 | Li et al. | 715/849 |
| 2010/0079392 A1* | 4/2010 | Chiang | G06F 3/041 345/173 |
| 2010/0169836 A1* | 7/2010 | Stallings et al. | 715/848 |
| 2011/0107272 A1* | 5/2011 | Aguilar | G06F 3/04815 715/853 |

* cited by examiner

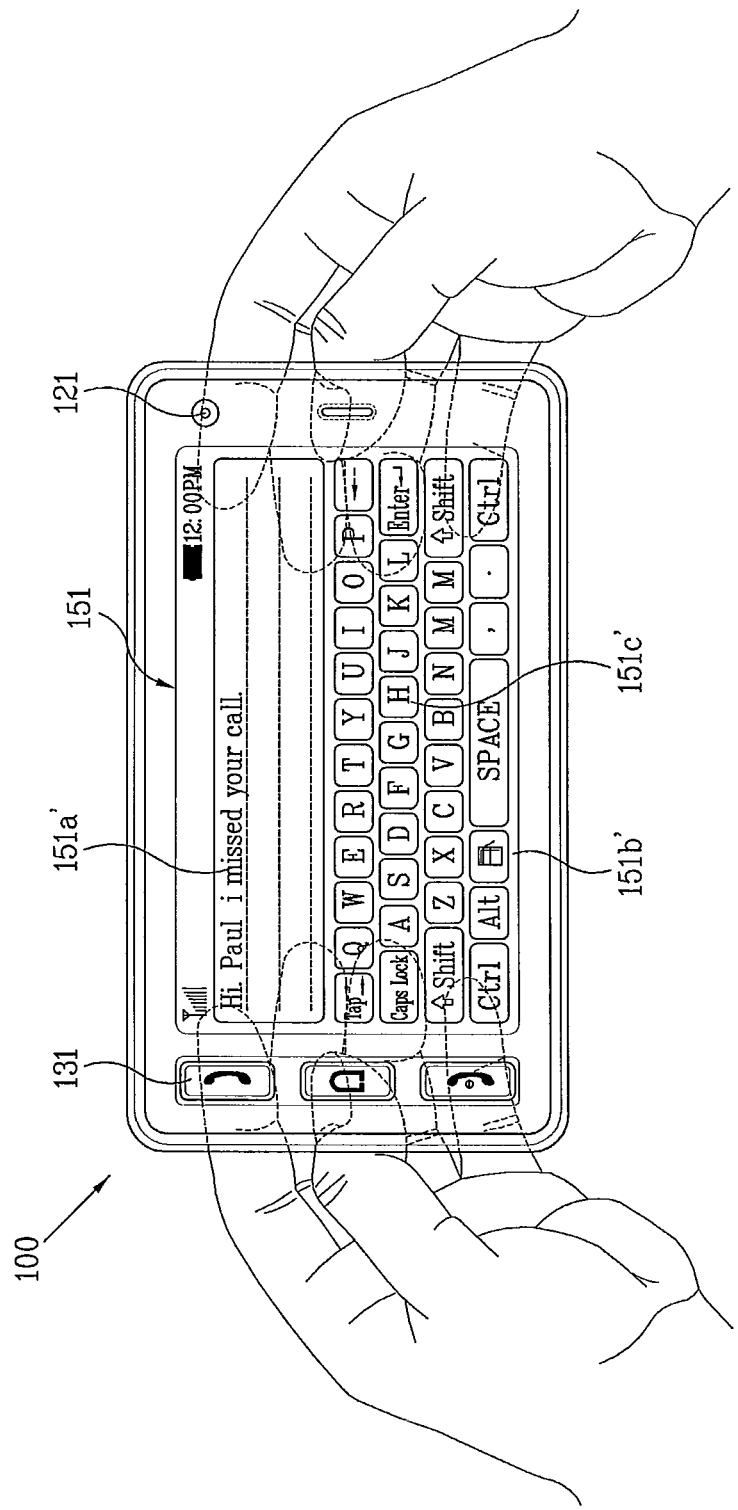

FIG. 7A
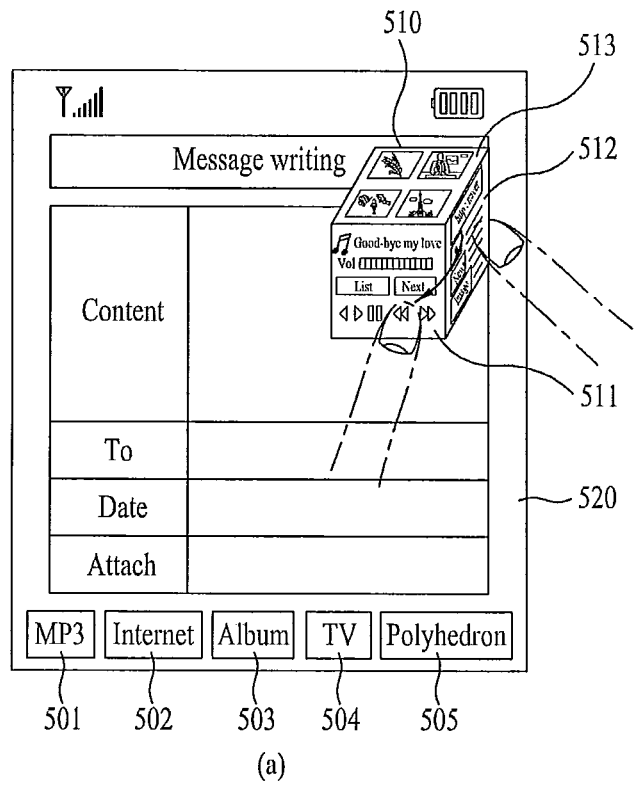
(a)
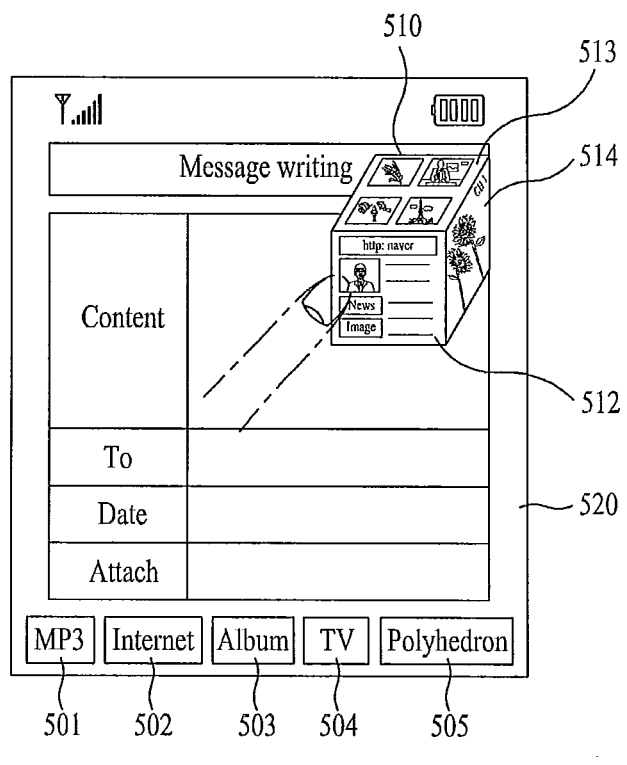
(b)

FIG. 8A
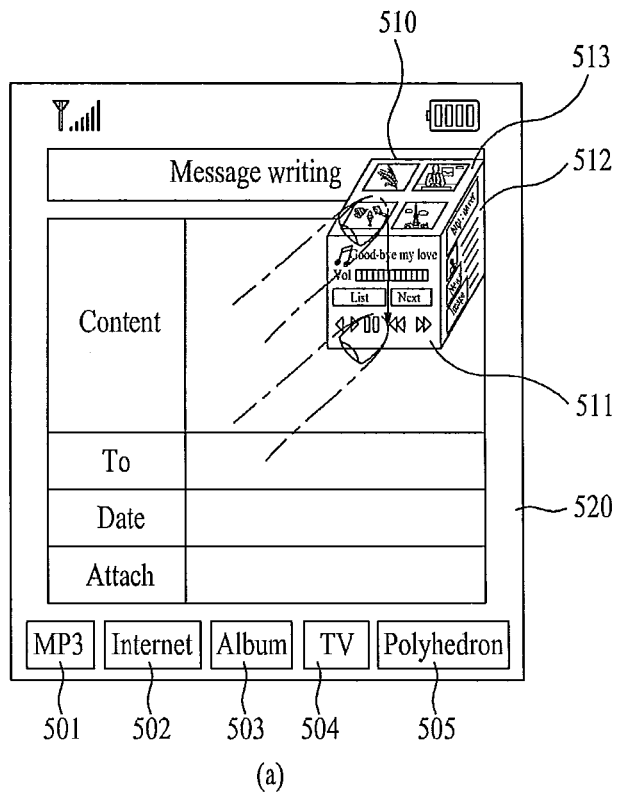
(a)
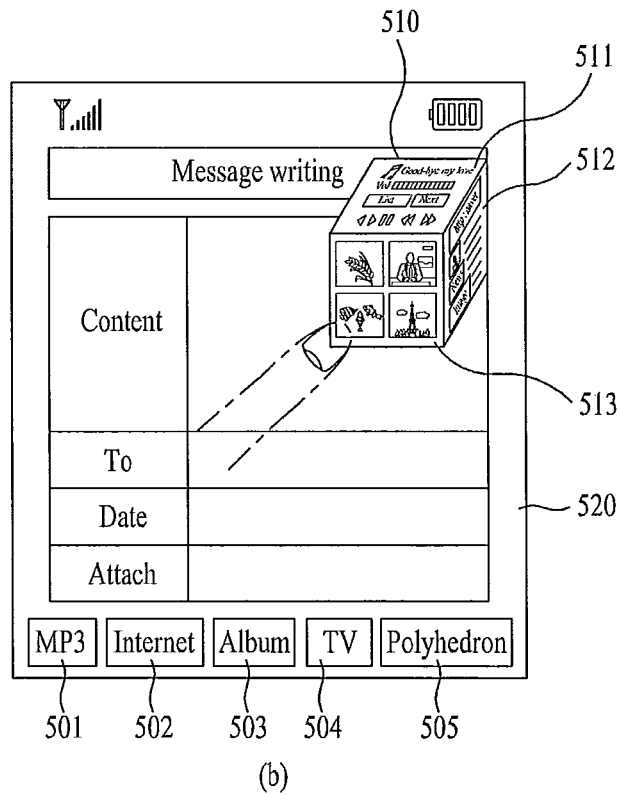
(b)

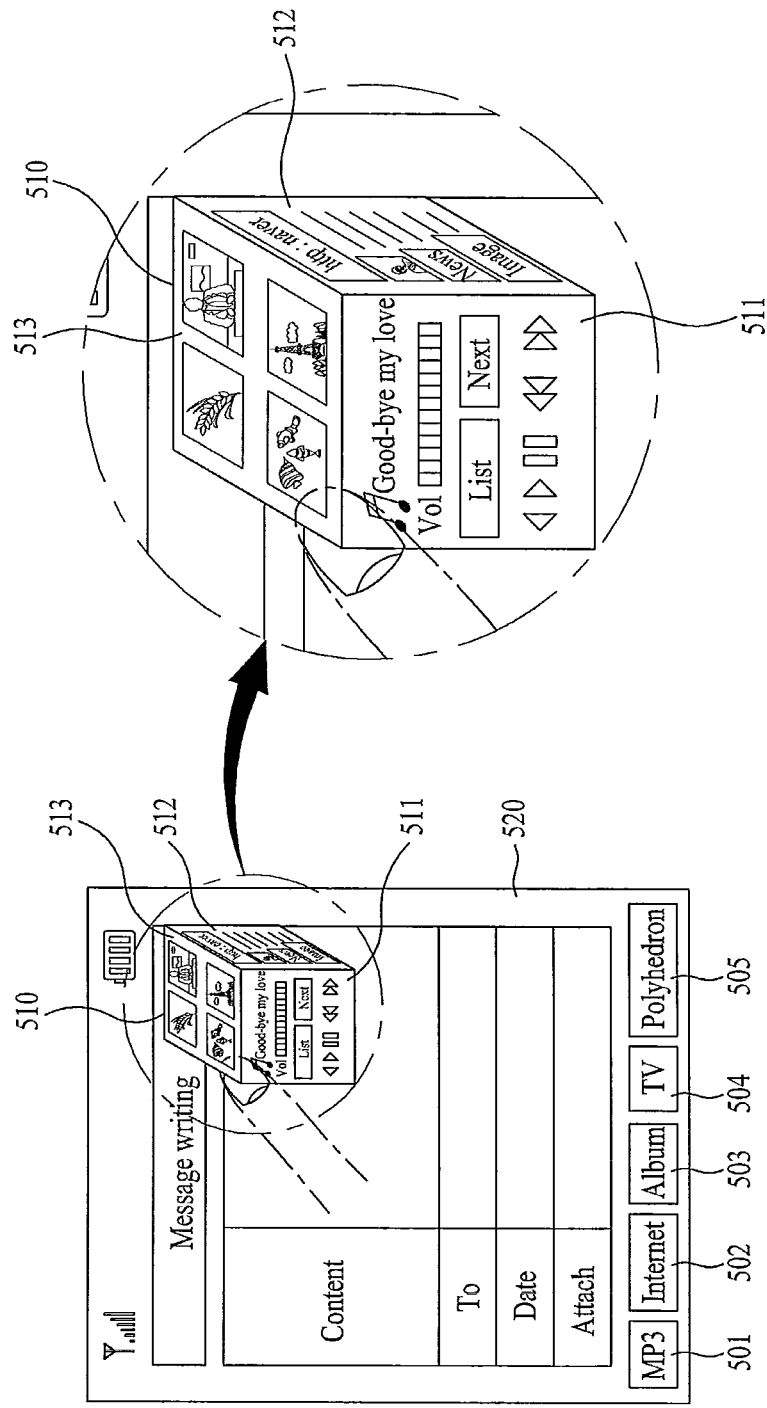

FIG. 10A
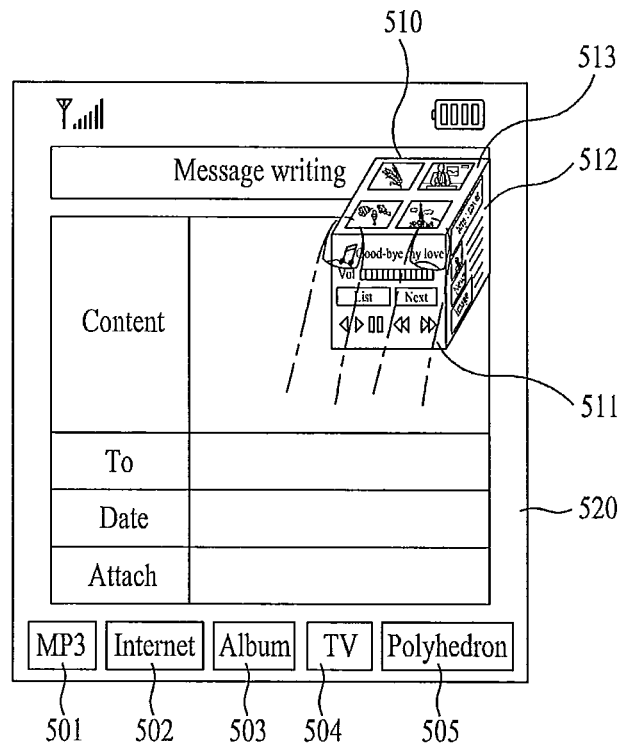
(a)
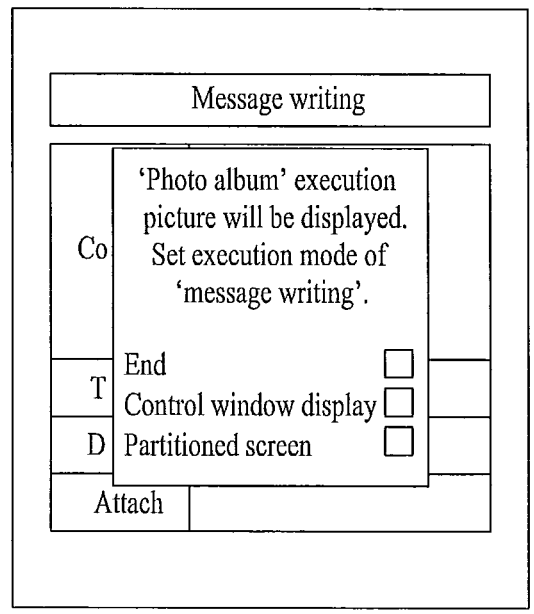
(b)

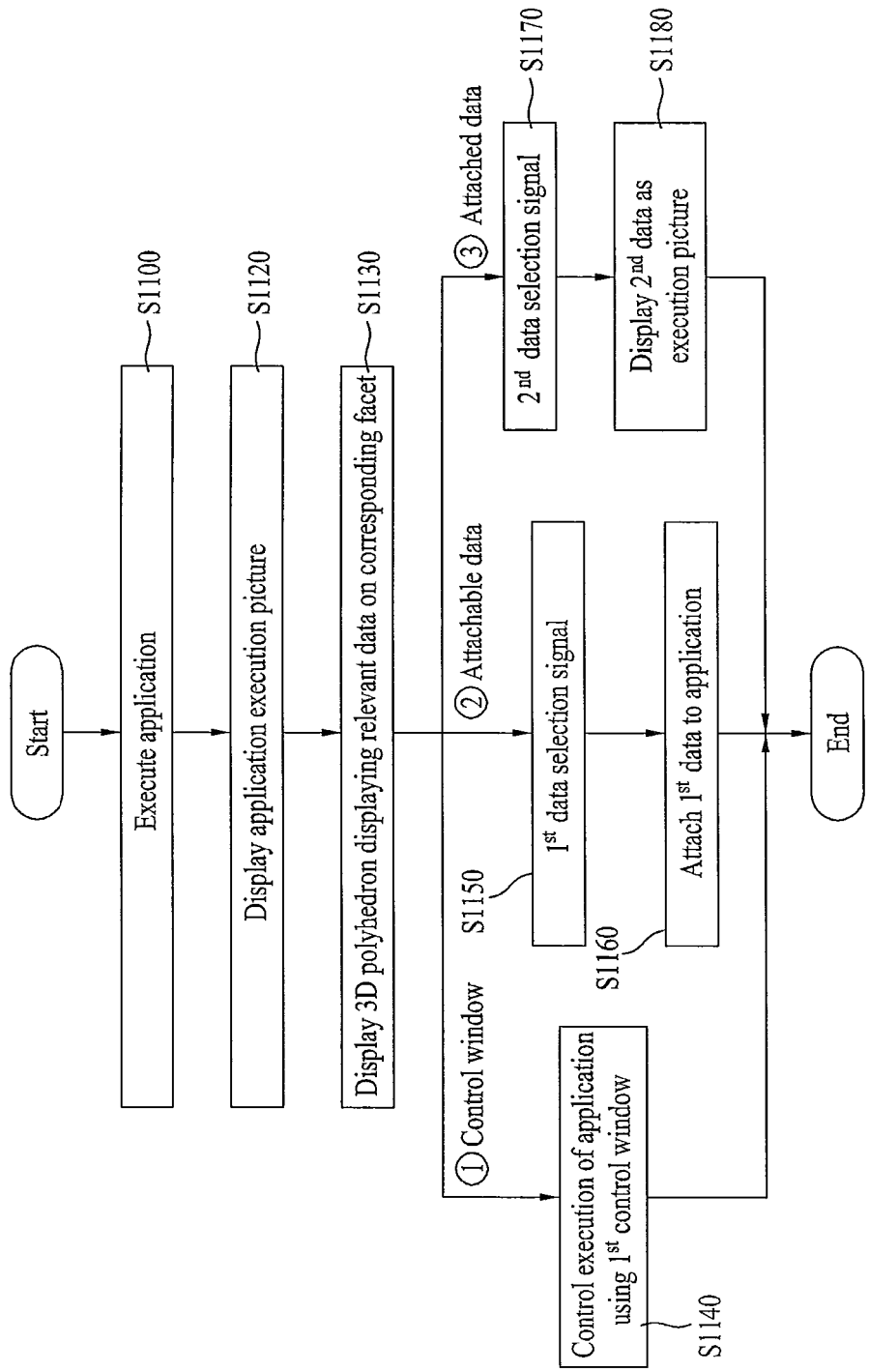

FIG. 13B
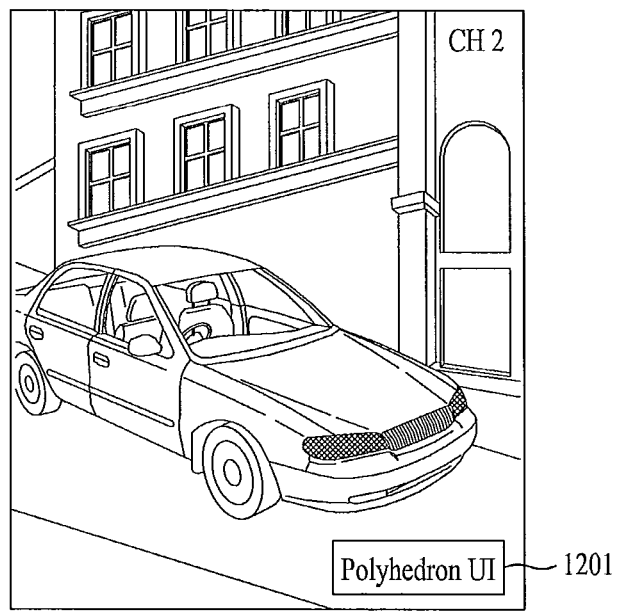
(a)
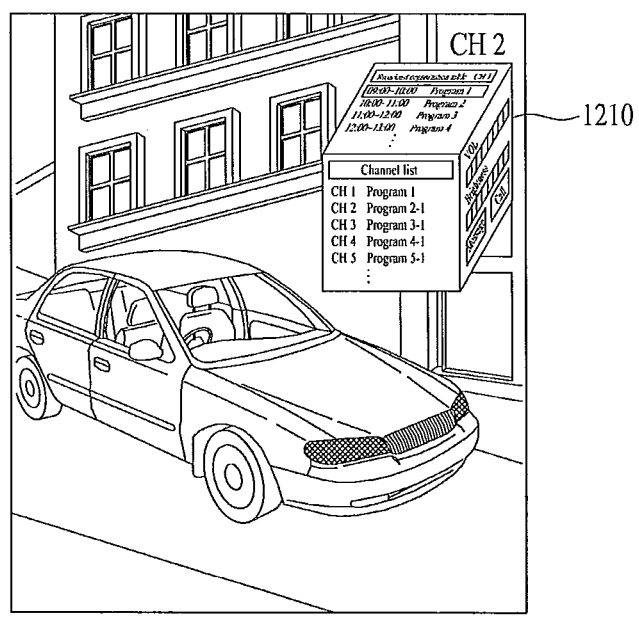
(a)

FIG. 14B
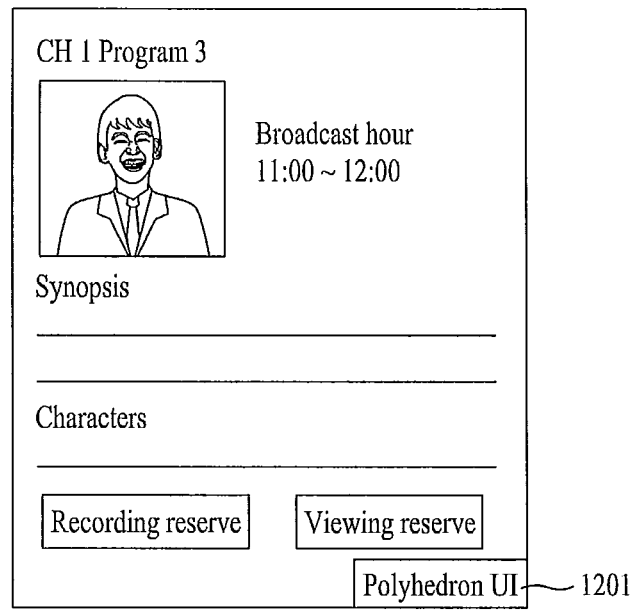
(a)
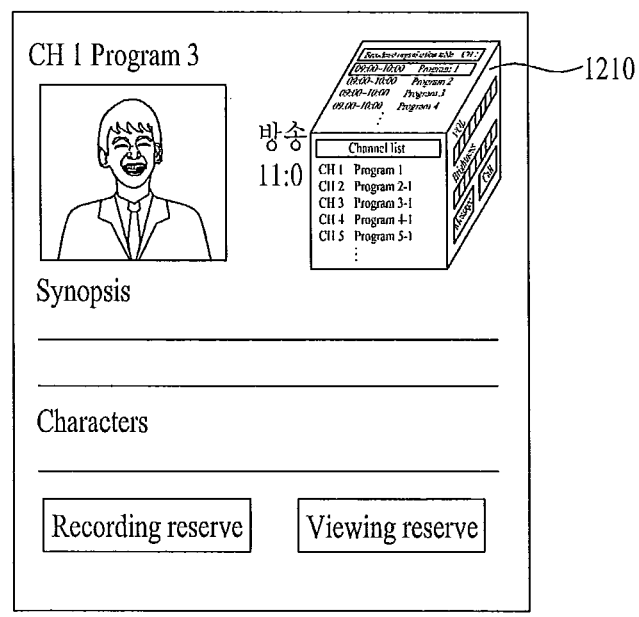
(b)

FIG. 17C
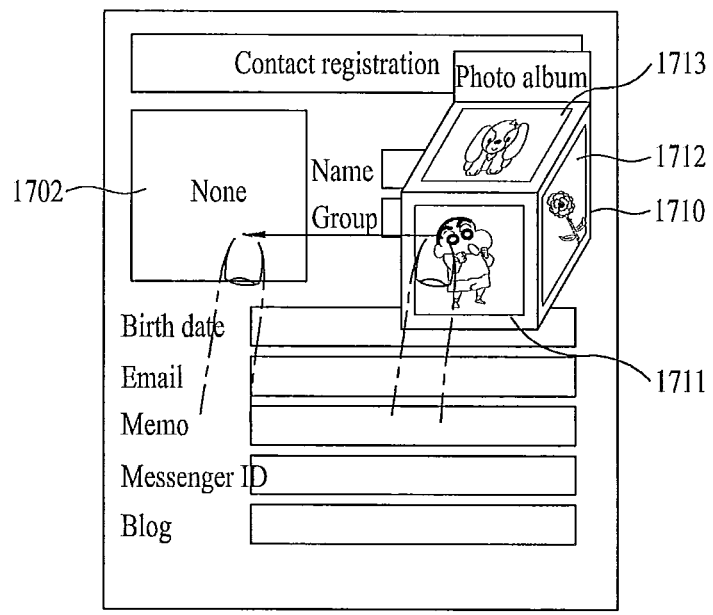
(a)
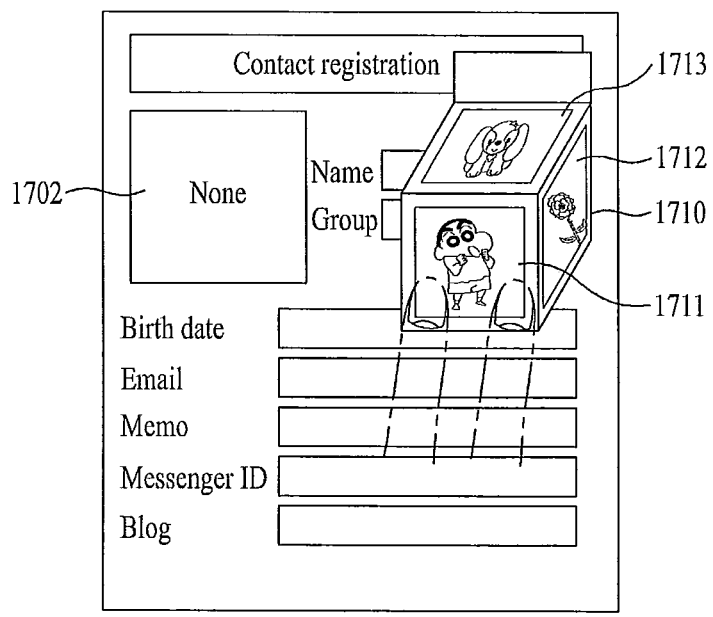
(b)

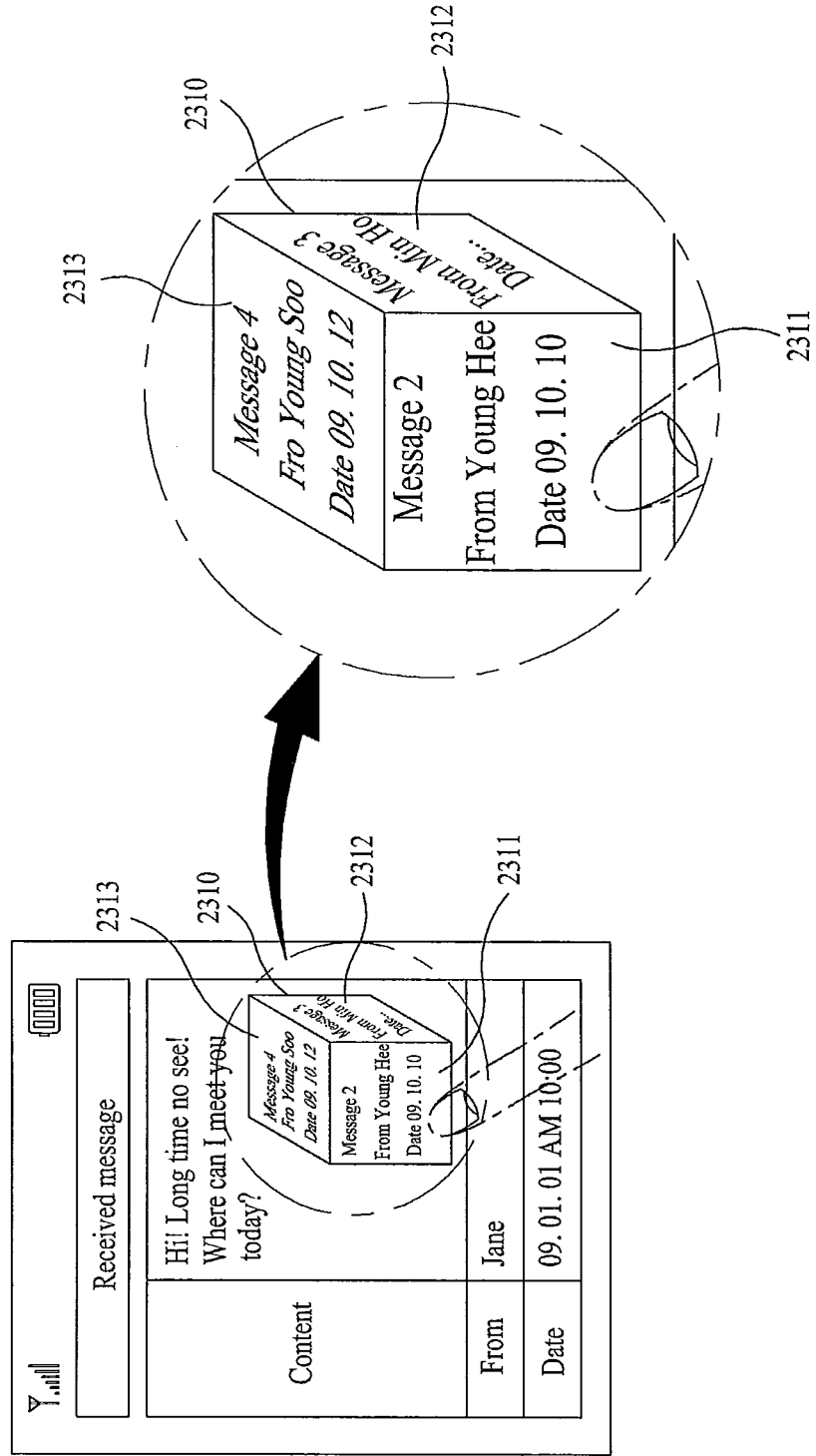

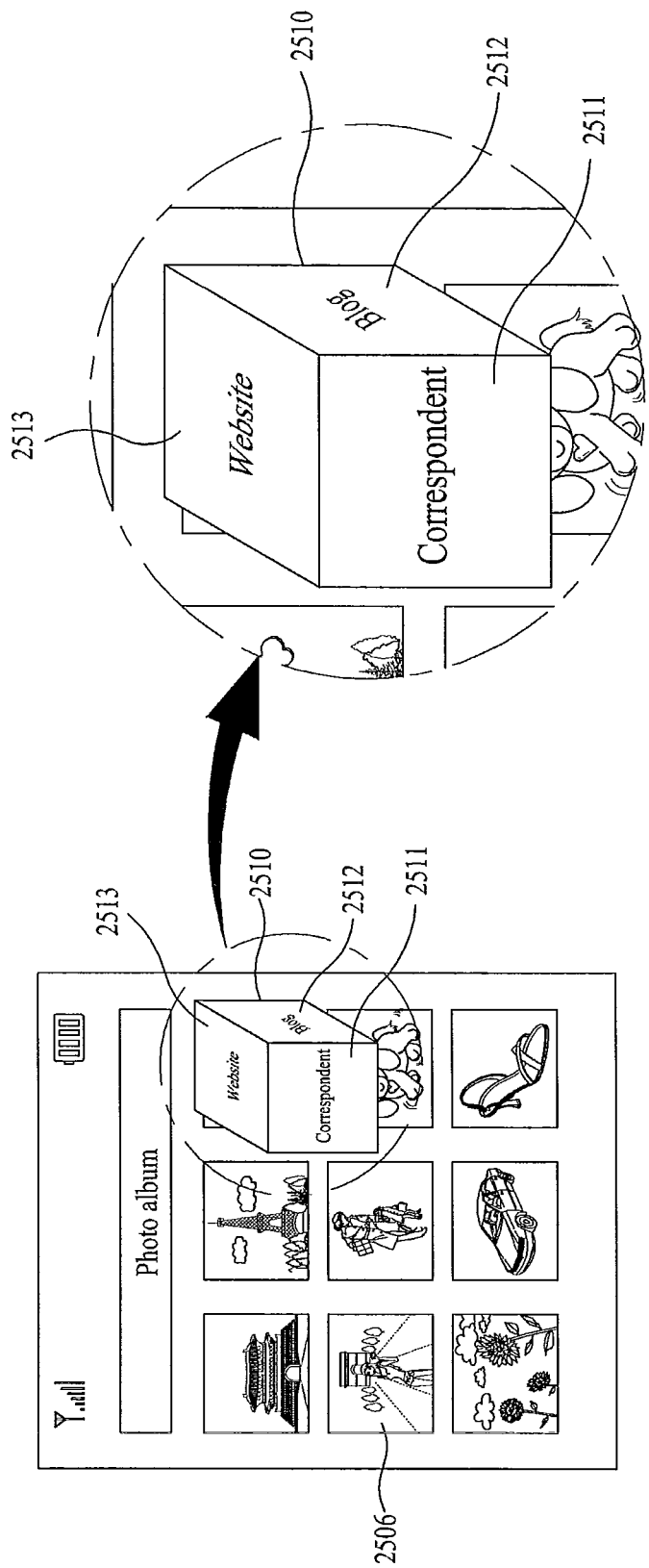

FIG. 26B
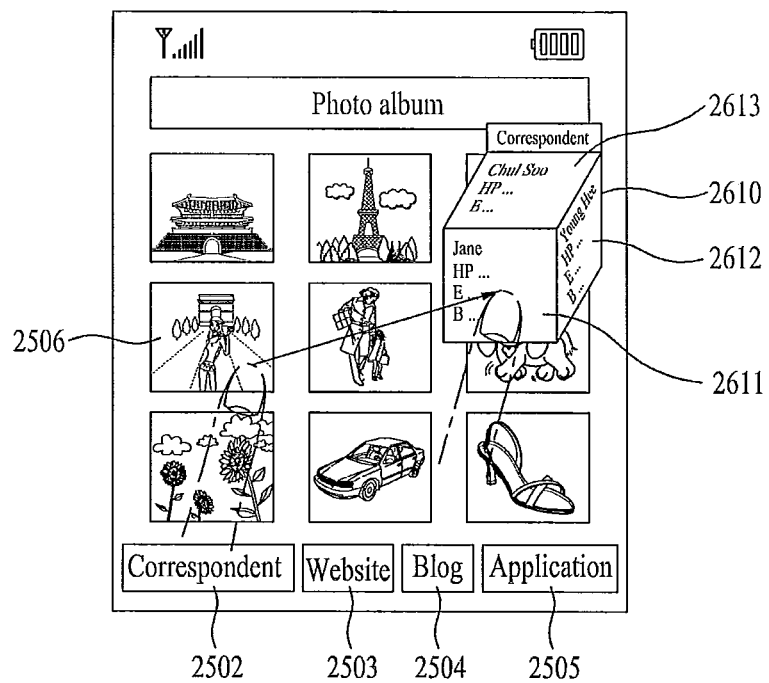
(a)
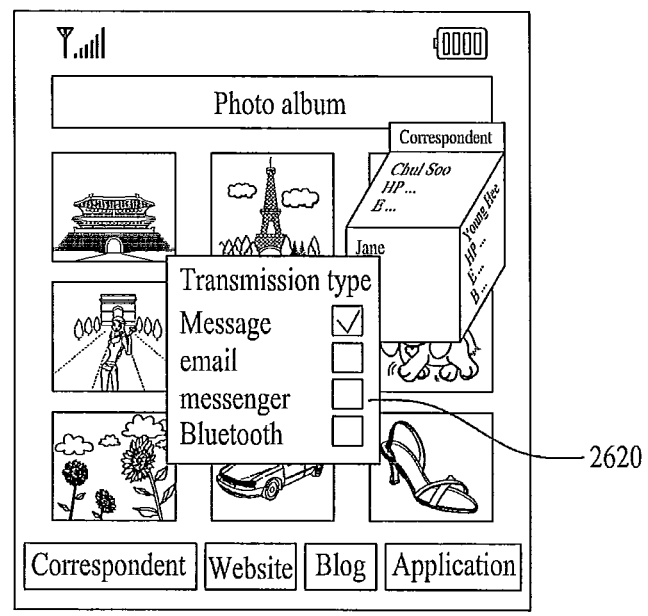
(b)

FIG. 34E
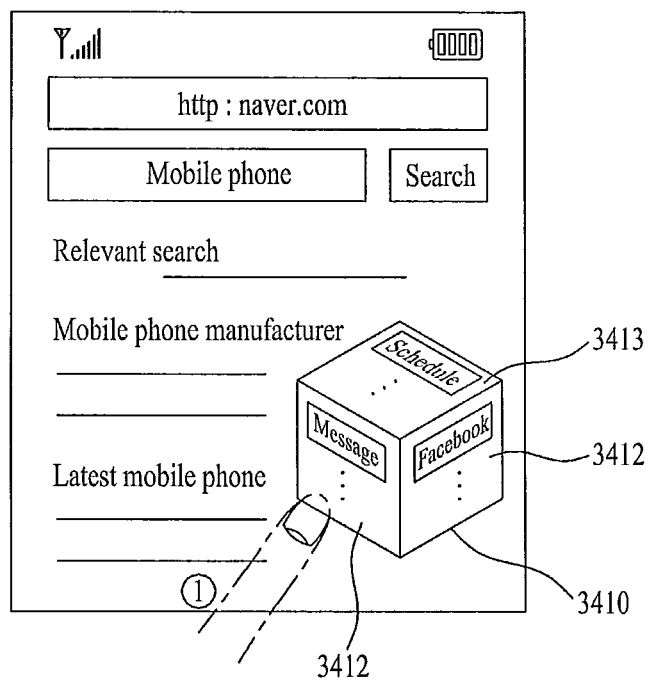
(a)
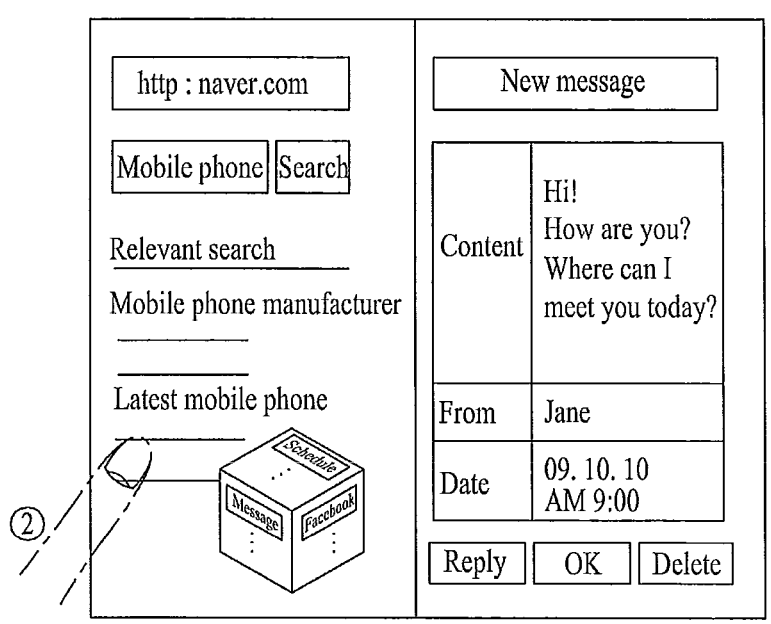
(b)

FIG. 35A
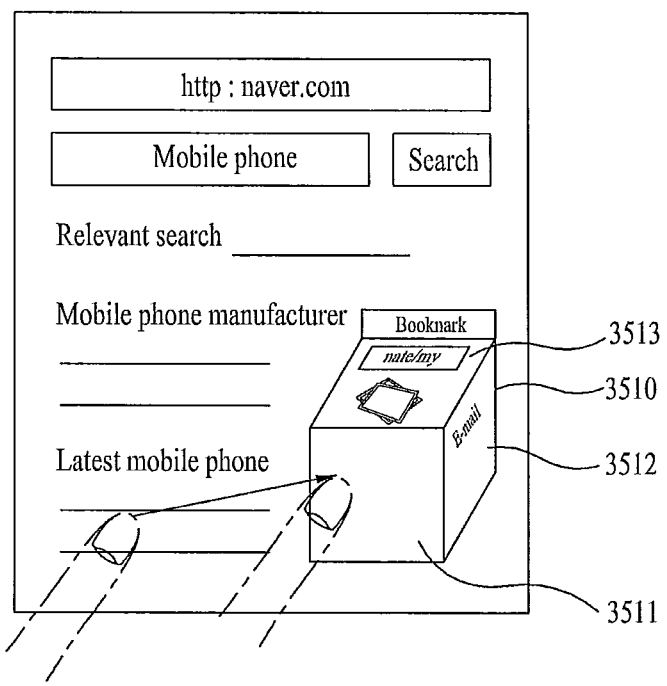
(a)
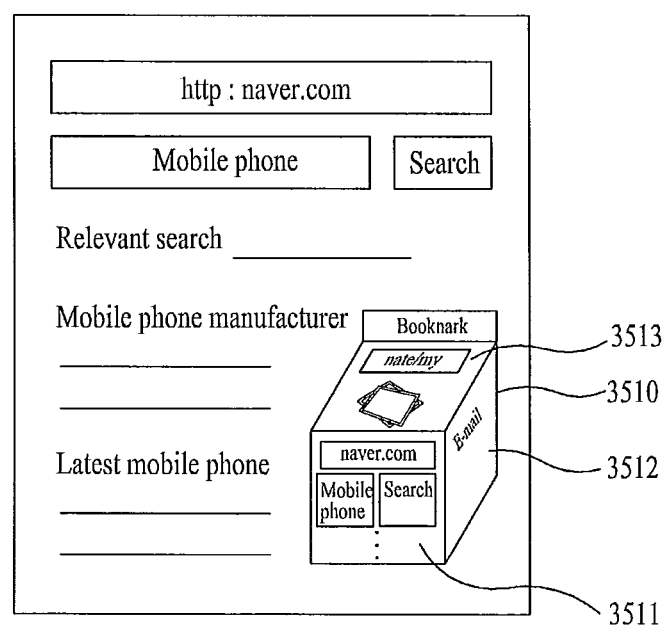
(b)

FIG. 35B
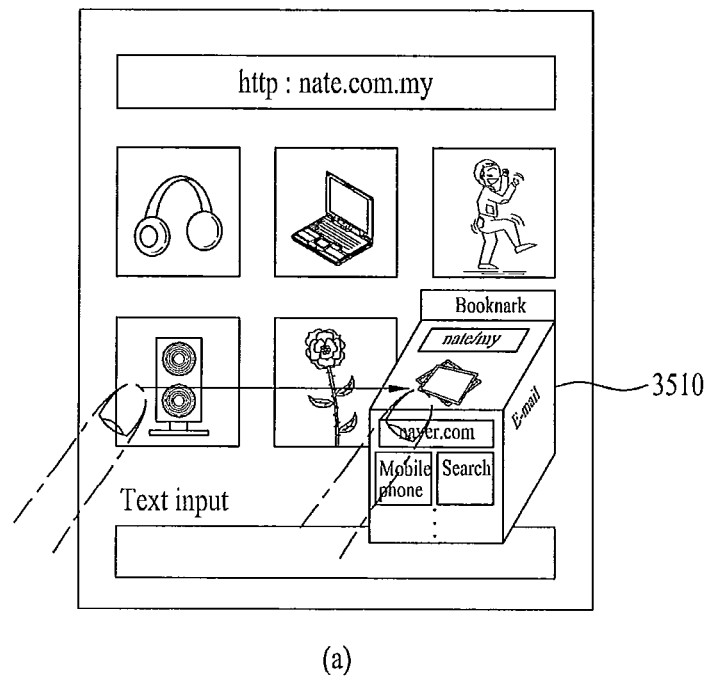
(a)
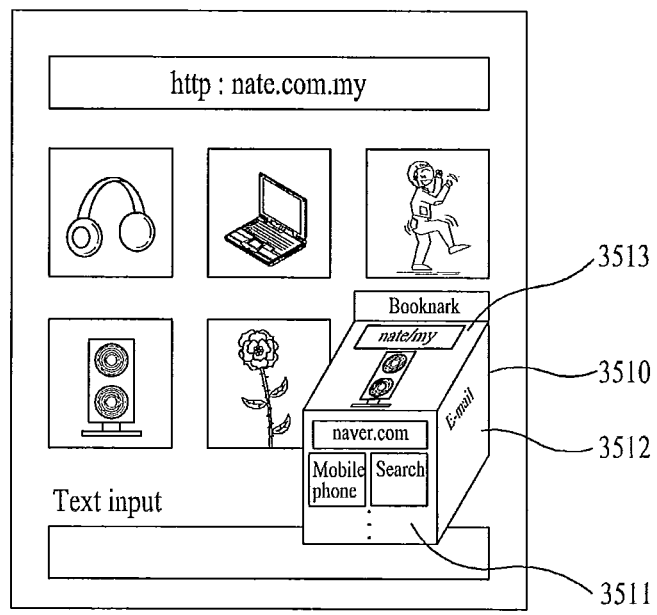
(b)

FIG. 36A
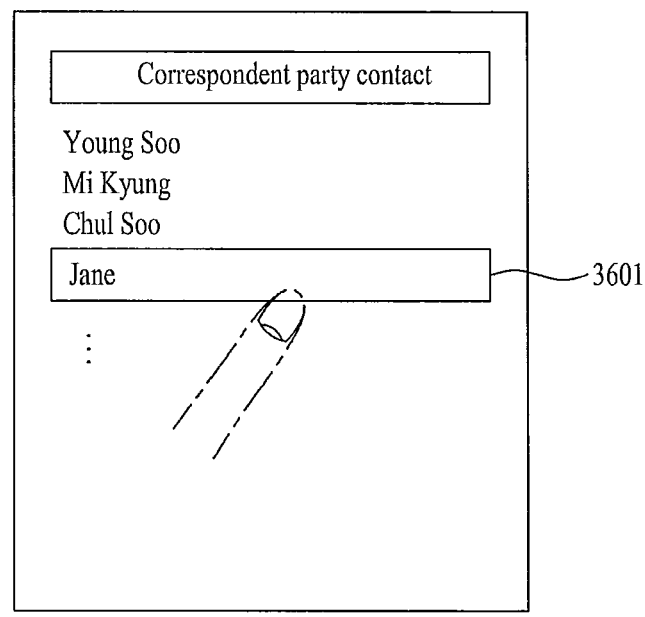
(a)
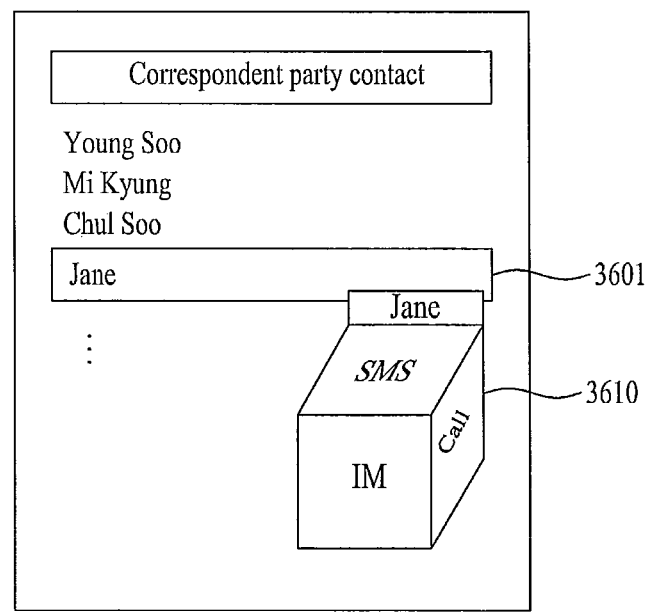
(b)

FIG. 36B
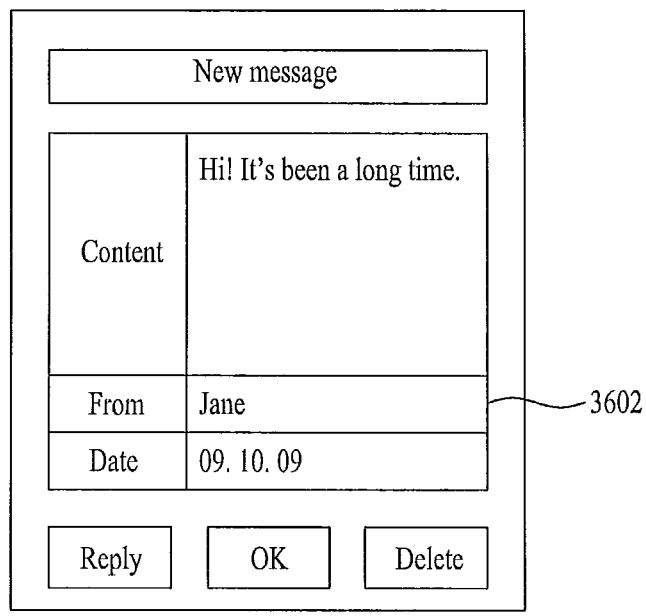
(a)
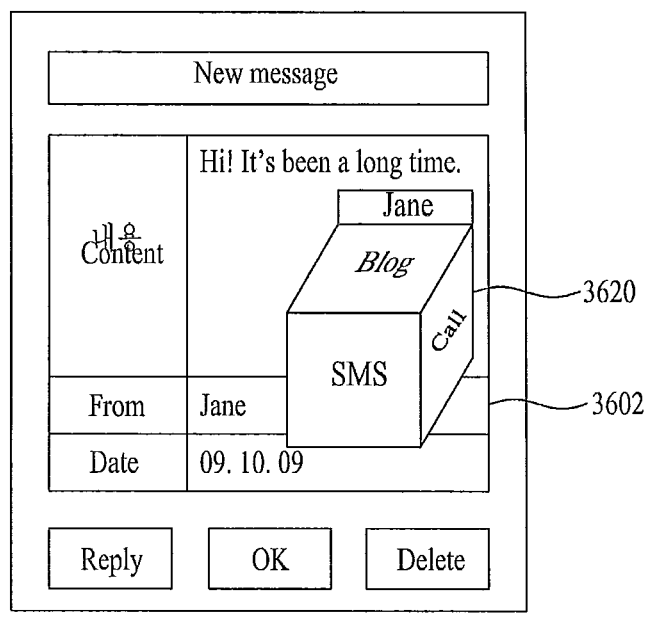
(b)

FIG. 36C
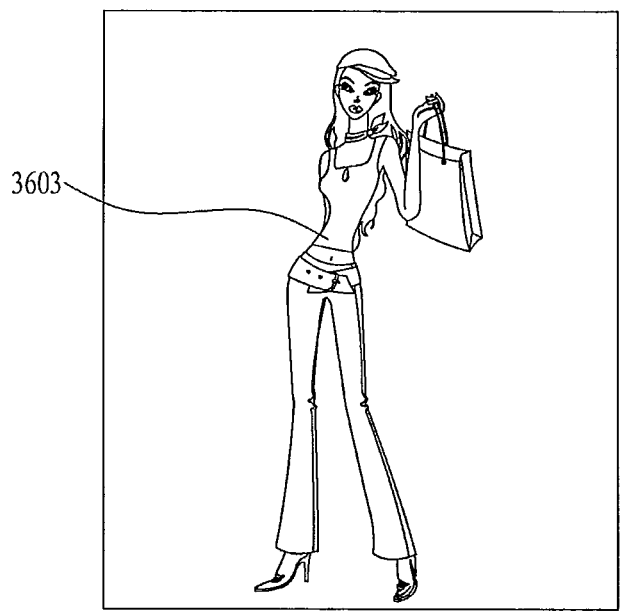
(a)
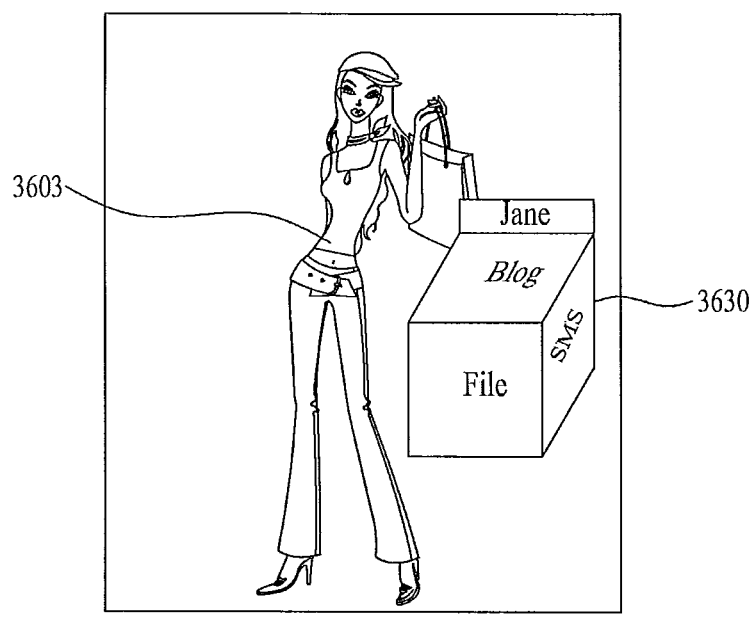
(b)

FIG. 37A
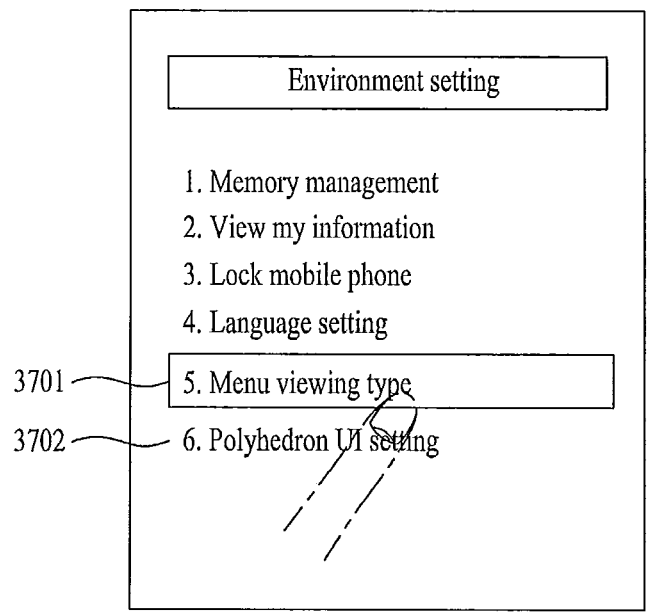
(a)
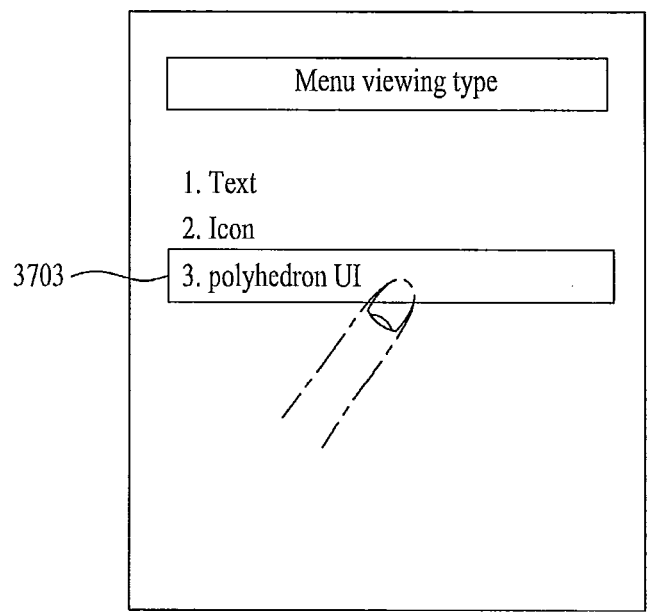
(b)

FIG. 37B
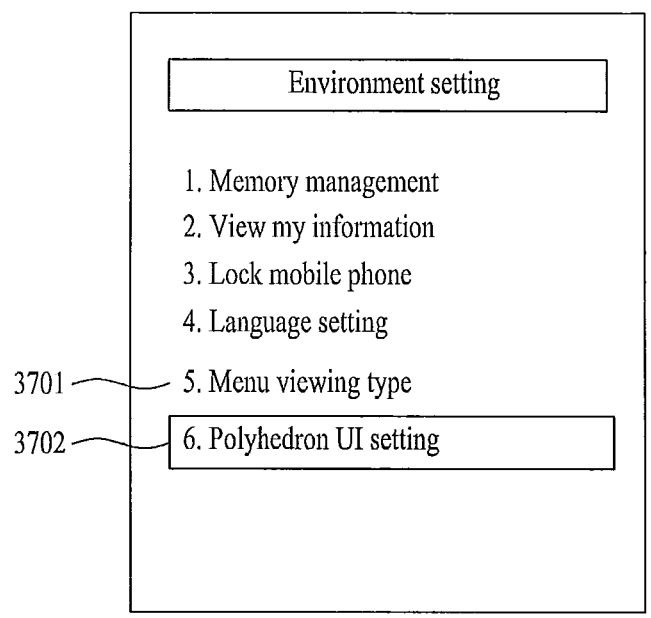
(a)
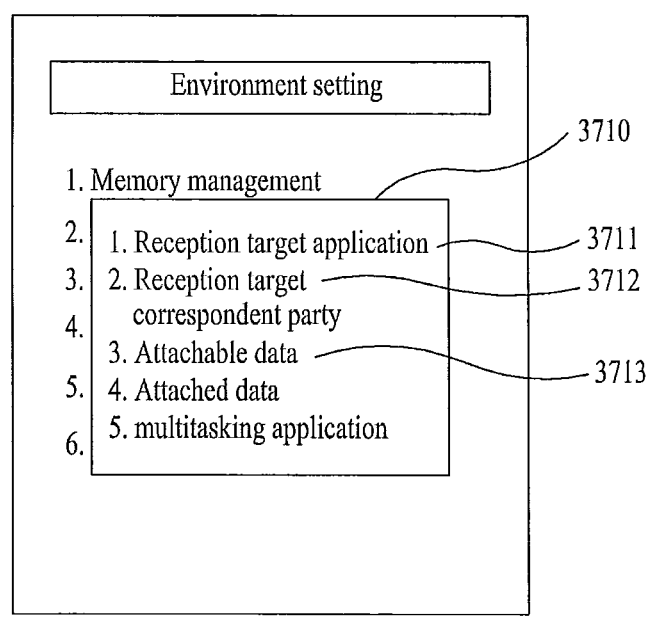
(b)

FIG. 38A
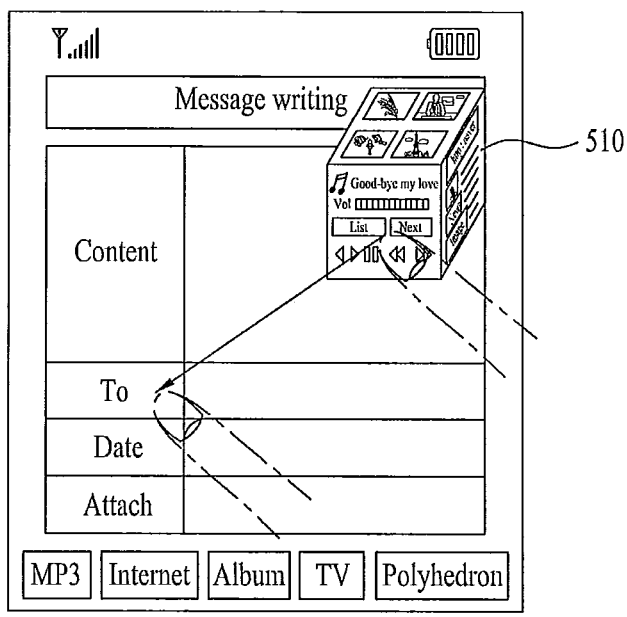
(a)
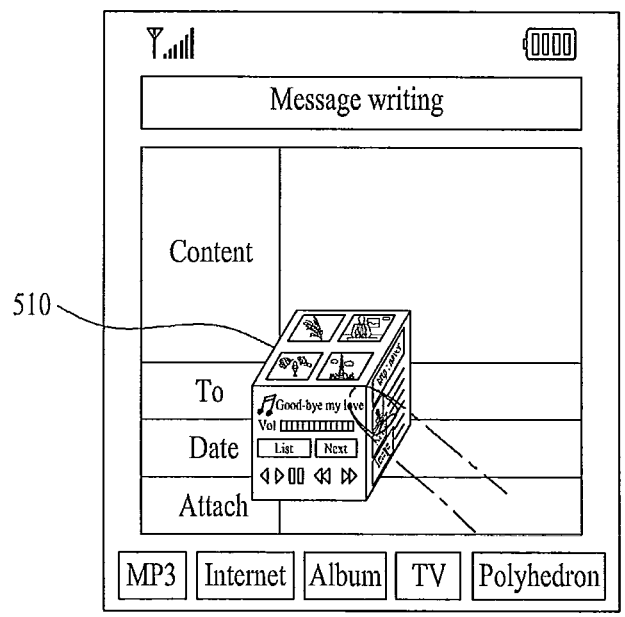
(b)

FIG. 38B
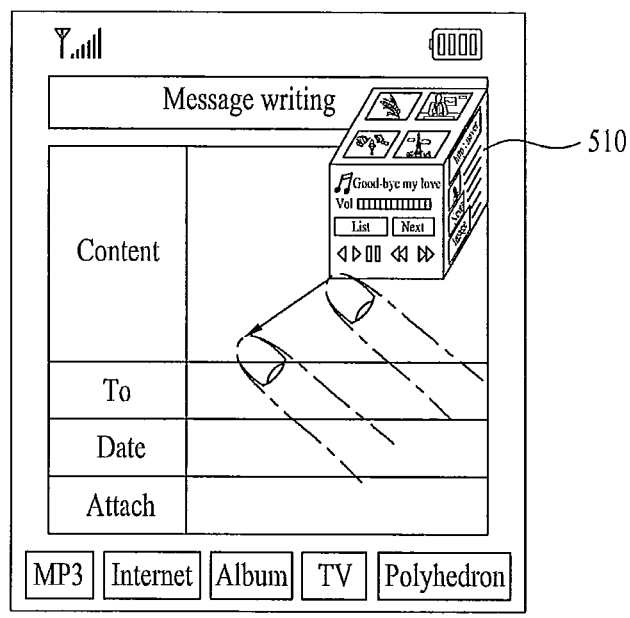
(a)
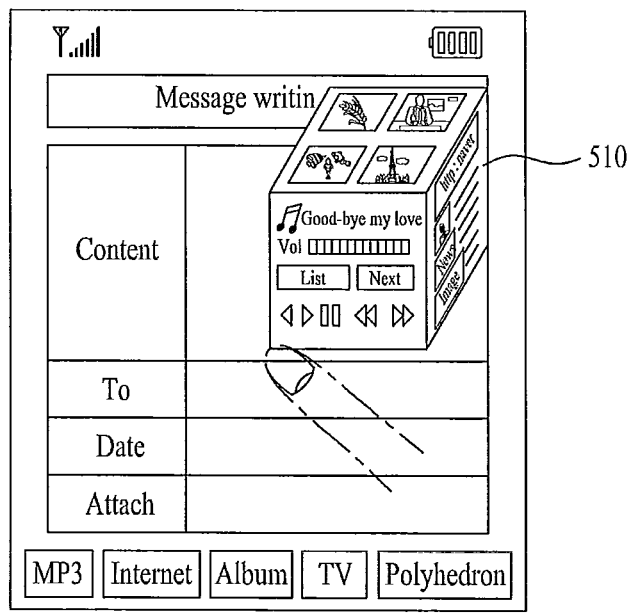
(a)

FIG. 38C
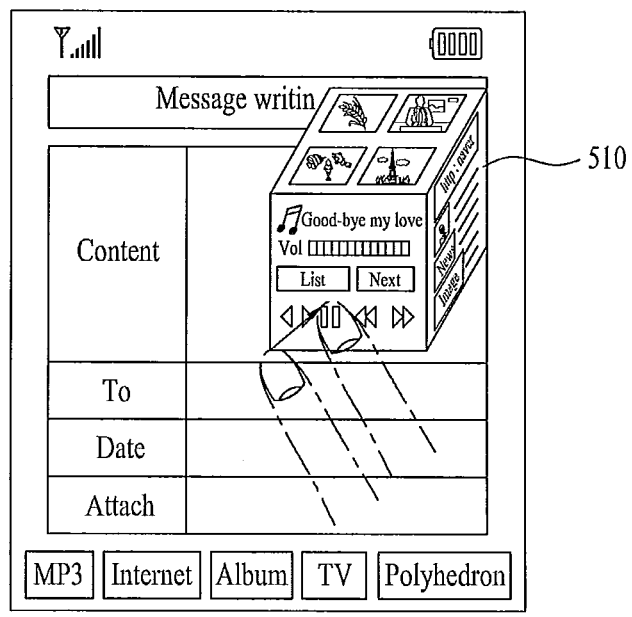
(a)
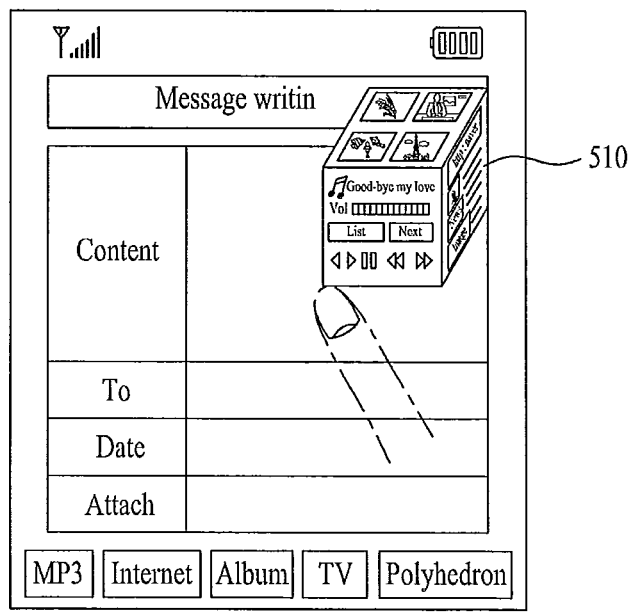
(b)

FIG. 38D
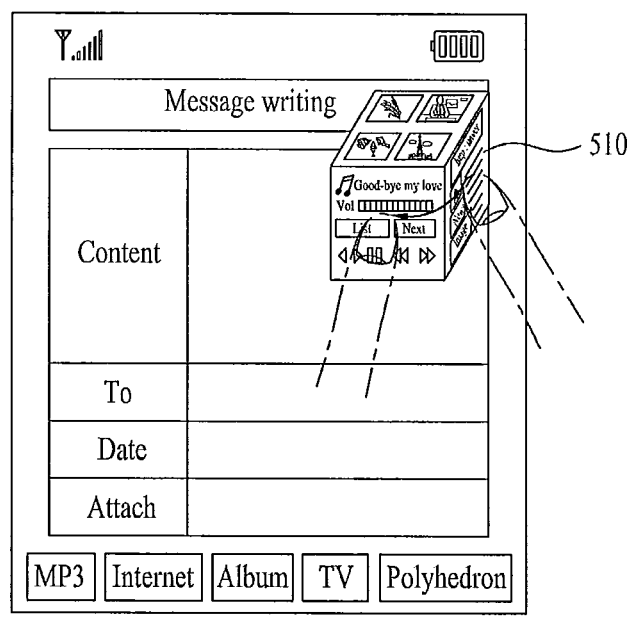
(a)
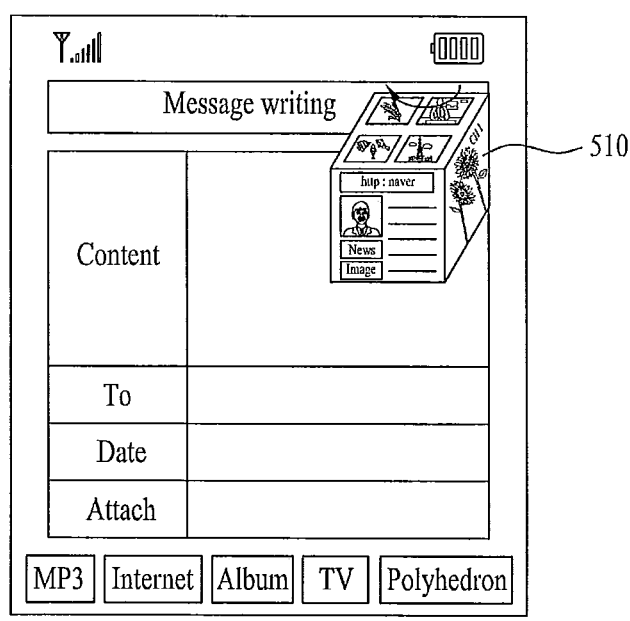
(b)

MOBILE TERMINAL AND METHOD OF CONTROLLING APPLICATIONS OF THE SAME

Pursuant to 35 U.S.C. §119(a), this application claims the benefit of earlier filing date and right of priority to Korean Application No. 10-2009-0120463, filed on Dec. 7, 2009, the contents of which are hereby incorporated by reference herein in their entirety.

BACKGROUND OF THE INVENTION

1. Field of the Invention

The present invention relates to a mobile terminal, and more particularly, to a mobile terminal and method of controlling applications of the same. Although the present invention is suitable for a wide scope of applications, it is particularly suitable for controlling an application executing operation using data displayed on each facet of a 3-dimensional polyhedron.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

According to a related art, if a user selects a menu item corresponding to an application to execute through a menu search, a mobile terminal is able to execute the application of the selected menu item. In case of attempting to search a specific data, if a menu item corresponding to a data list display is selected via a menu search, the mobile terminal 100 is able to search a displayed data list for the specific data.

However, the related art fails to provide a detailed method of providing a user with data related to an application executed in an application executed mode without performing a menu search while an execution picture display is maintained.

Moreover, the related art fails to provide a method of controlling all applications currently executed in a multitasking mode within one picture.

SUMMARY OF THE INVENTION

Accordingly, the present invention is directed to a mobile terminal and method of controlling applications of the same that substantially obviate one or more problems due to limitations and disadvantages of the related art.

An object of the present invention is to provide a mobile terminal and method of controlling applications of the same, by which each operation of all applications currently executed in a multitasking mode can be effectively controlled within one picture.

Another object of the present invention is to provide a mobile terminal and method of controlling applications of the same, by which data related to an application executed in an application executed mode can be effectively provided within one picture while a specific application is being executed.

A further object of the present invention is to provide a mobile terminal and method of controlling applications of the same, by which specific data included in a data list can be effectively attached to a specific reception target item.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a controller executing a plurality of applications including a first application and a display unit simultaneously displaying an execution picture of the first application and a 3D polyhedron displaying a control window of at least one of a plurality of the applications except the first application on a corresponding facet of the 3D polyhedron under a control of the controller. In this case, the control unit controls an execution of the application corresponding to a control signal inputted using a first control window displayed on a first facet of the 3D polyhedron.

In another aspect of the present invention, a mobile terminal includes a controller executing an application and a display unit displaying a 3D polyhedron displaying at least one data related to the application on each corresponding facet of the 3D polyhedron while displaying an execution picture of the application under a control of the controller. In this case, the at least one data related to the application includes at least one selected from the group consisting of a control window for controlling the application, data attachable to the application and data attached to the application.

In another aspect of the present invention, a mobile terminal includes a display unit displaying a data list including a plurality of data, the display unit also displaying a 3D polyhedron displaying at least one reception target item for a first data included in the data list on each corresponding facet of the 3D polyhedron and a controller, if receiving an input of a touch & drag action to a first facet of the 3D polyhedron from the first data included in the data list, controlling the first data to be attached to the reception target item corresponding to the first facet.

In another aspect of the present invention, an application controlling method of a mobile terminal includes the steps of executing a plurality of applications, displaying an execution picture of a first application among a plurality of the executed applications on a screen, displaying a 3D polyhedron displaying a control window of at least one of a plurality of the applications except the first application on a corresponding facet of the 3D polyhedron on a screen in the course of displaying the execution picture of the first application, and controlling an execution of the application corresponding to a first control window using the first control window displayed on a first facet of the 3D polyhedron.

In another aspect of the present invention, an application controlling method of a mobile terminal includes the steps of executing an application, displaying an execution picture of the executed application on a screen, and displaying a 3D polyhedron displaying at least one data related to the executed application on each corresponding facet of the 3D polyhedron while displaying the execution picture. In this case, the at least one data related to the application includes at least one selected from the group consisting of a control window for controlling the application, data attachable to the application and data attached to the application.

In a further aspect of the present invention, an application controlling method of a mobile terminal includes the steps of displaying a data list including a plurality of data, displaying a 3D polyhedron displaying at least one reception target item for a first data included in the data list on each corresponding facet of the 3D polyhedron while displaying the data list, receiving an input of a touch & drag action to a first facet of the 3D polyhedron from the first data included in the data list, and controlling the first data to be attached to the reception target item corresponding to the first facet according to the input of the touch & drag action.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3A and FIG. 3B are front diagrams of a mobile terminal according to one embodiment of the present invention for explaining one operational status of the mobile terminal, respectively;

FIGS. 7A to 7C are diagrams for screen configuration of controlling an application execution using a multitasking polyhedron according to the present invention;

FIGS. 8A to 8C are diagrams for screen configuration of controlling an application execution using a multitasking polyhedron according to the present invention;

FIG. 10A, FIG. 10B and FIG. 10C are diagrams for screen configuration of executing a background application into a foreground application using a multitasking polyhedron according to the present invention;

FIG. 11 is a second flowchart of a method of controlling applications in a mobile terminal according to one embodiment of the present invention;

FIGS. 13A to 13D are diagrams for screen configuration of controlling a broadcast view execution using a broadcast control polyhedron according to the present invention;

FIGS. 14A to 14D are diagrams for screen configuration of controlling a broadcast view execution using a broadcast control polyhedron according to the present invention;

FIGS. 17A to 17D are diagrams for screen configuration of attaching data to a phonebook using a 3D polyhedron in the course of phonebook execution according to the present invention;

FIGS. 23A to 23C are diagrams for screen configuration of checking a received message using a 3D polyhedron in the course of received message check execution according to the present invention;

FIGS. 25A to 25C are diagrams for screen configuration of displaying a reception target item according to the present invention;

FIGS. 26A to 26C are diagrams for screen configuration of transmitting specific data to a specific correspondent party using a 3D polyhedron displaying correspondent party information on each facet, in case that a reception target item is a correspondent party, according to the present invention;

FIGS. 34A to 34E are diagrams for screen configuration of displaying a new event using a 3D polyhedron in case of a website access according to the present invention;

FIG. 35A and FIG. 35B are diagrams for screen configuration of setting a bookmark for a specific webpage using a 3D polyhedron according to the present invention;

FIGS. 36A to 36C are diagrams for screen configuration of displaying a data transceiving type suitable for a specific correspondent party using a 3D polyhedron according to the present invention;

FIGS. 37A to 37H are diagrams for screen configuration of designating corresponding data to each facet of a 3D polyhedron according to the present invention; and FIGS. 38A and 38E are diagrams for screen configuration of controlling a displayed state of a 3D polyhedron according to the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
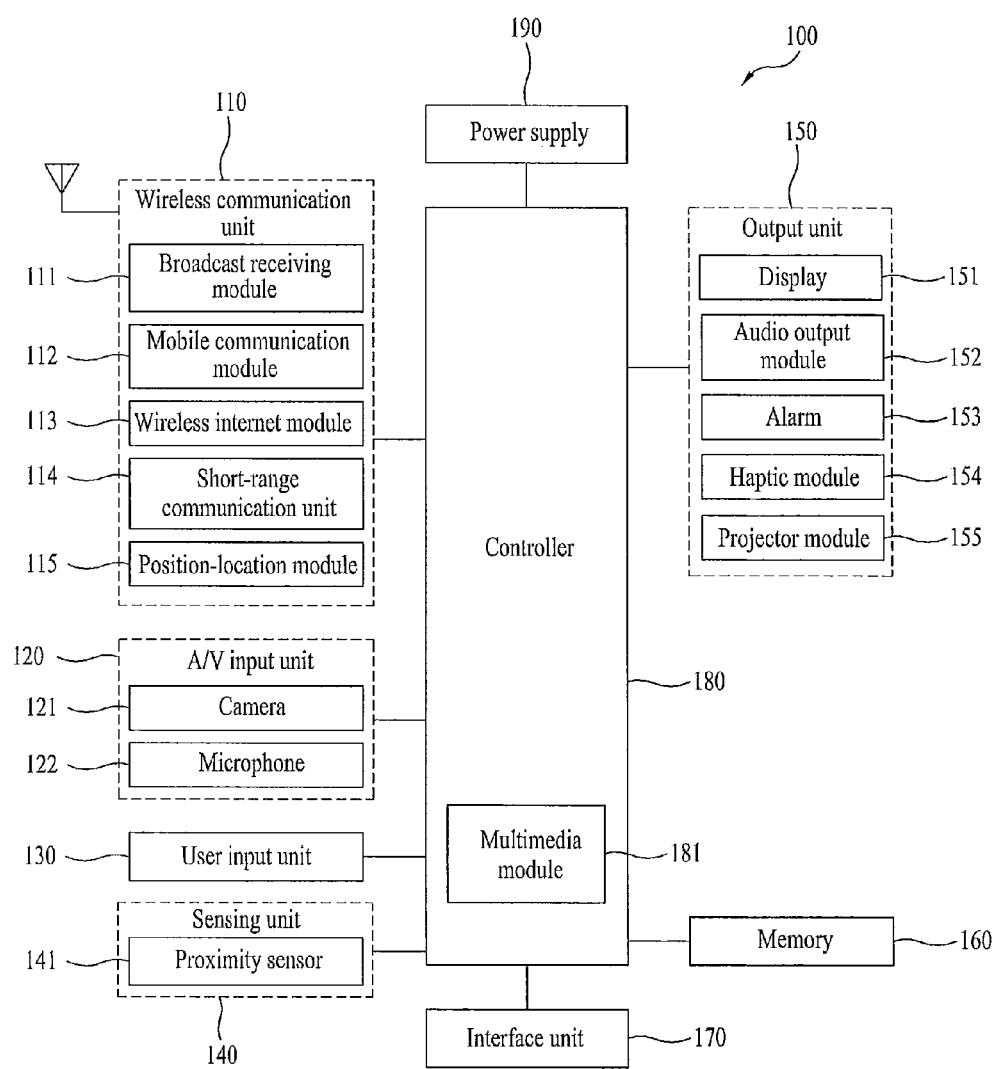
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as BLUETOOTH and ZIGBEE, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
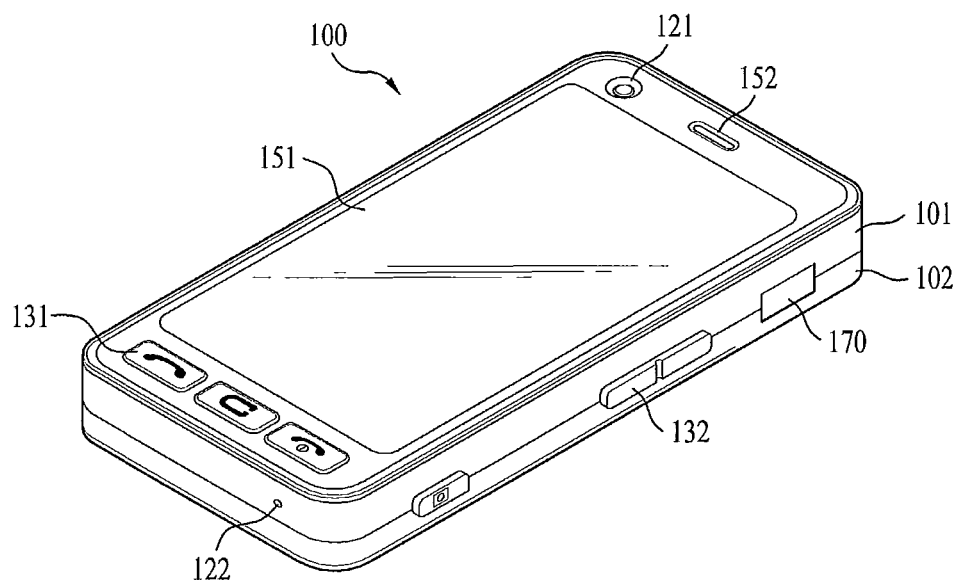
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
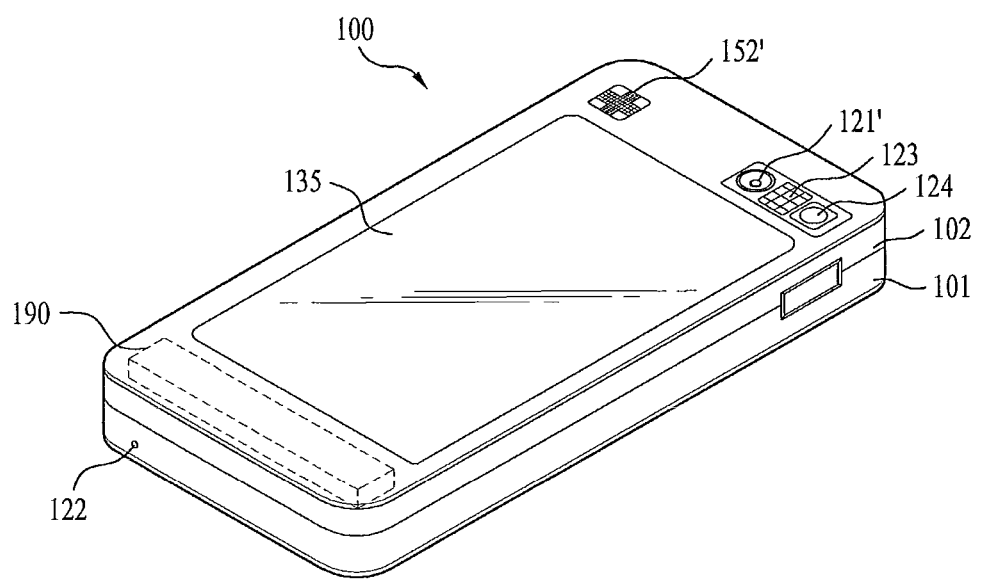
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

Interconnected operational mechanism between the display unit 151 and the touchpad 135 are explained with reference to FIG. 3A and FIG. 3B as follows.

Figure 3A:
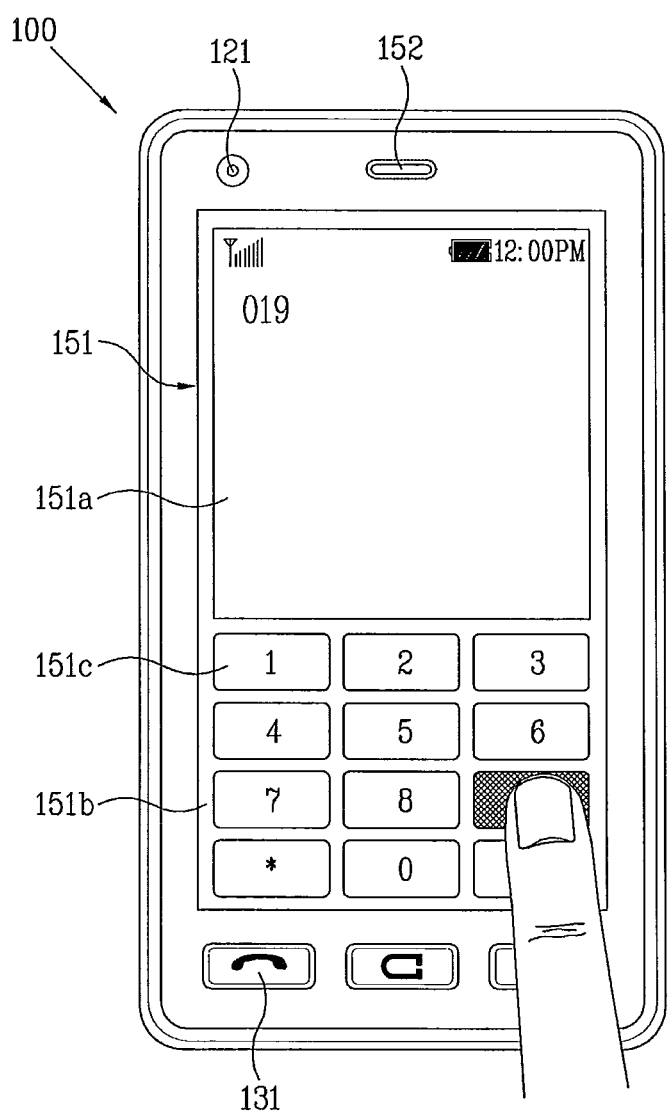

FIG. 3A and FIG. 3B are front-view diagrams of a terminal according to one embodiment of the present invention for explaining an operational state thereof.

First of all, various kinds of visual informations can be displayed on the display unit 151. And, theses informations can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3A shows that a touch applied to a soft key is inputted through a front face of a terminal body.

The display unit 151 is operable through an entire area or by being divided into a plurality of regions. In the latter case, a plurality of the regions can be configured interoperable.

For instance, an output window 151a and an input window 151b are displayed on the display unit 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

FIG. 3B shows that a touch applied to a soft key is inputted through a rear face of a terminal body. If FIG. 3A shows a case that the terminal body is vertically arranged (portrait), FIG. 3B shows a case that the terminal body is horizontally arranged (landscape). And, the display unit 151 can be configured to change an output picture according to the arranged direction of the terminal body.

FIG. 3B shows that a text input mode is activated in the terminal.

An output window 151a' and an input window 151b' are displayed on the display unit 151. A plurality of soft keys 151c' representing at least one of characters, symbols and digits can be arranged in the input window 151b'. The soft keys 151c' can be arranged in the QWERTY key formation.

If the soft keys 151c' are touched through the touchpad (cf. '135' in FIG. 2B), the characters, symbols and digits corresponding to the touched soft keys are outputted to the output window 151a'. Thus, the touch input via the touchpad 135 is advantageous in that the soft keys 151c' can be prevented from being blocked by a finger in case of touch, which is compared to the touch input via the display unit 151. In case that the display unit 151 and the touchpad 135 are configured transparent, it is able to visually check fingers located at the backside of the terminal body. Hence, more correct touch inputs are possible.

Besides, the display unit 151 or the touchpad 135 can be configured to receive a touch input by scroll. A user scrolls the display unit 151 or the touchpad 135 to shift a cursor or pointer located at an entity (e.g., icon or the like) displayed on the display unit 151. Furthermore, in case that a finger is shifted on the display unit 151 or the touchpad 135, a path of the shifted finger can be visually displayed on the display unit 151. This may be useful in editing an image displayed on the display unit 151.

To cope with a case that both of the display unit (touchscreen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display unit 151 or the touchpad 135.

A mobile terminal mentioned in this disclosure can include at least one of the components shown in FIG. 1 and can include a touchscreen.

In the following description, an application controlling method in a mobile terminal according to a first embodiment of the present invention is explained in detail with reference to the accompanying drawings.

Figure 4:
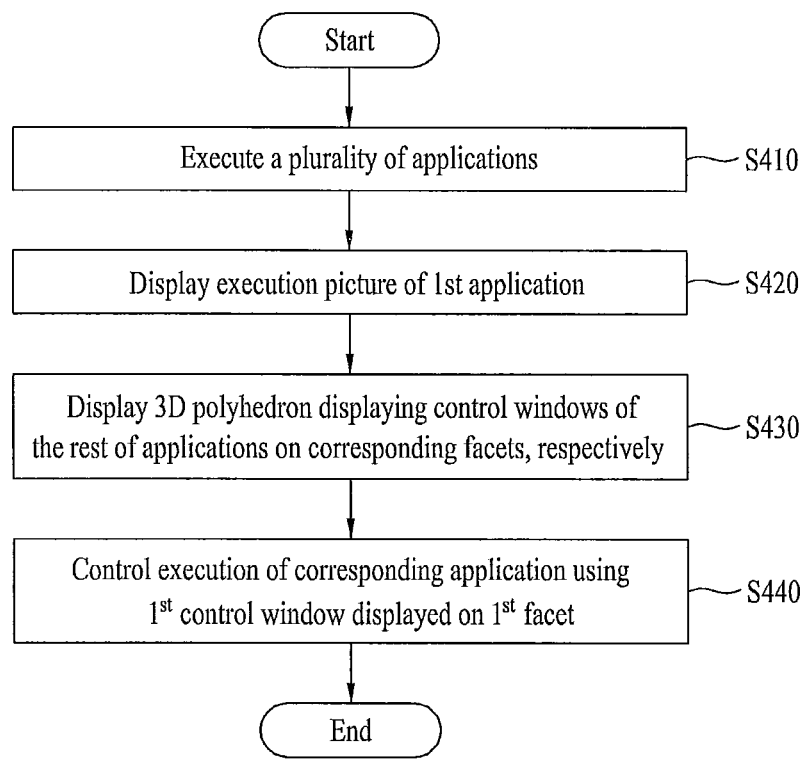
FIG. 4 is a first flowchart of a method of controlling applications in a mobile terminal according to one embodiment of the present invention.

FIG. 4 is a first flowchart of a method of controlling applications in a mobile terminal according to one embodiment of the present invention.

Referring to FIG. 4, the mobile terminal 100 executes a plurality of applications under the control of the controller 180 [S410].

In the case, each of the applications can include a function or menu that can be implemented using the mobile terminal 100. For instance, the applications can include a message writing, a broadcast viewing, a camera photographing, an MP3 playback, a game, a photo album and the like.

Moreover, if a multitasking function is supported, the mobile terminal 100 is able to simultaneously execute a plurality of the applications.

For instance, in case of implementing the multitasking function, the mobile terminal 100 is able to take a picture using the camera [a second application_camera photographing] while playing back an MP3 file [a first application_MP3 playback]. In case of implementing the multitasking function, the mobile terminal 100 is able to write a message to send to a correspond party [a second application_message writing] while providing a broadcast program to be viewed by a user [a first application_broadcast viewing].

Under the control of the controller 180, the mobile terminal 100 displays an execution picture (hereinafter named a first execution picture) of a first one of a plurality of the application executed in the executing step S410 via the display unit 151 [S420].

In doing so, the first execution picture can be displayed on a whole display region of the display unit 151. In case of executing the first application as a foreground, the mobile terminal 100 is able to display the first execution picture on the whole display region.

In the course of executing the displaying step $20, the mobile terminal 100 is able to display a 3D polyhedron (hereinafter named a multi-polyhedron), which displays each control window of at least one of a plurality the applications ongoing to be executed in the executing step S410 except the first application on its corresponding facet, via the display unit under the control of the controller 180 [S430].

In doing so, the at least one of a plurality of the applications except the first application can be executed as a background.

Moreover, as the displaying steps S420 and S430 are simultaneously executed, the controller 180 is able to control the display unit 151 to display the multi-polyhedron on one picture while displaying the first execution picture thereon.

In the following description, the displaying steps S420 and S430 are explained in detail with reference to FIGS. 5A to 5D. For clarity and convenience of the following description, a plurality of the currently multitasking executed applications can include a message writing in progress as a foreground, an MP3 playback in progress as a background, an internet access, a photo album and a broadcast viewing.

Figure 5A:
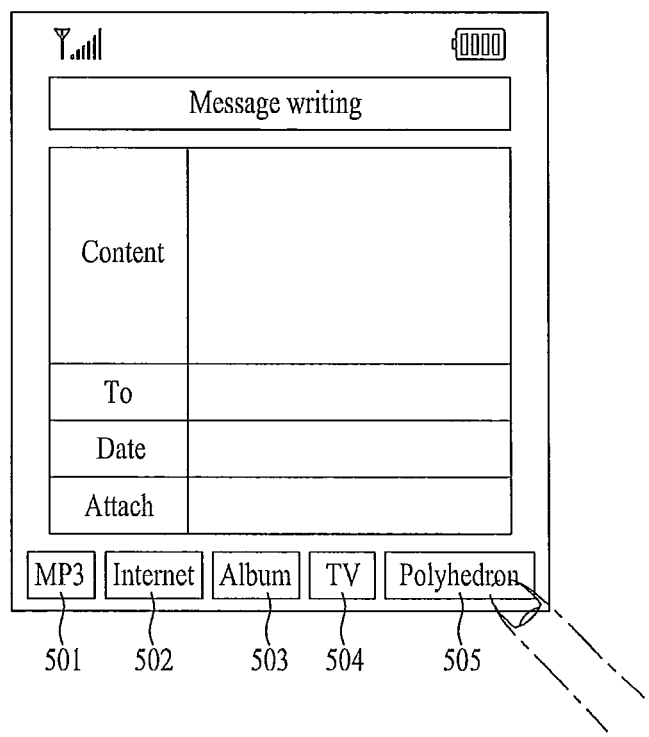
FIGS. 5A to 5D are diagrams for screen configuration of displaying a multitasking polyhedron in a multitasking mode according to the present invention.
Figure 5B:
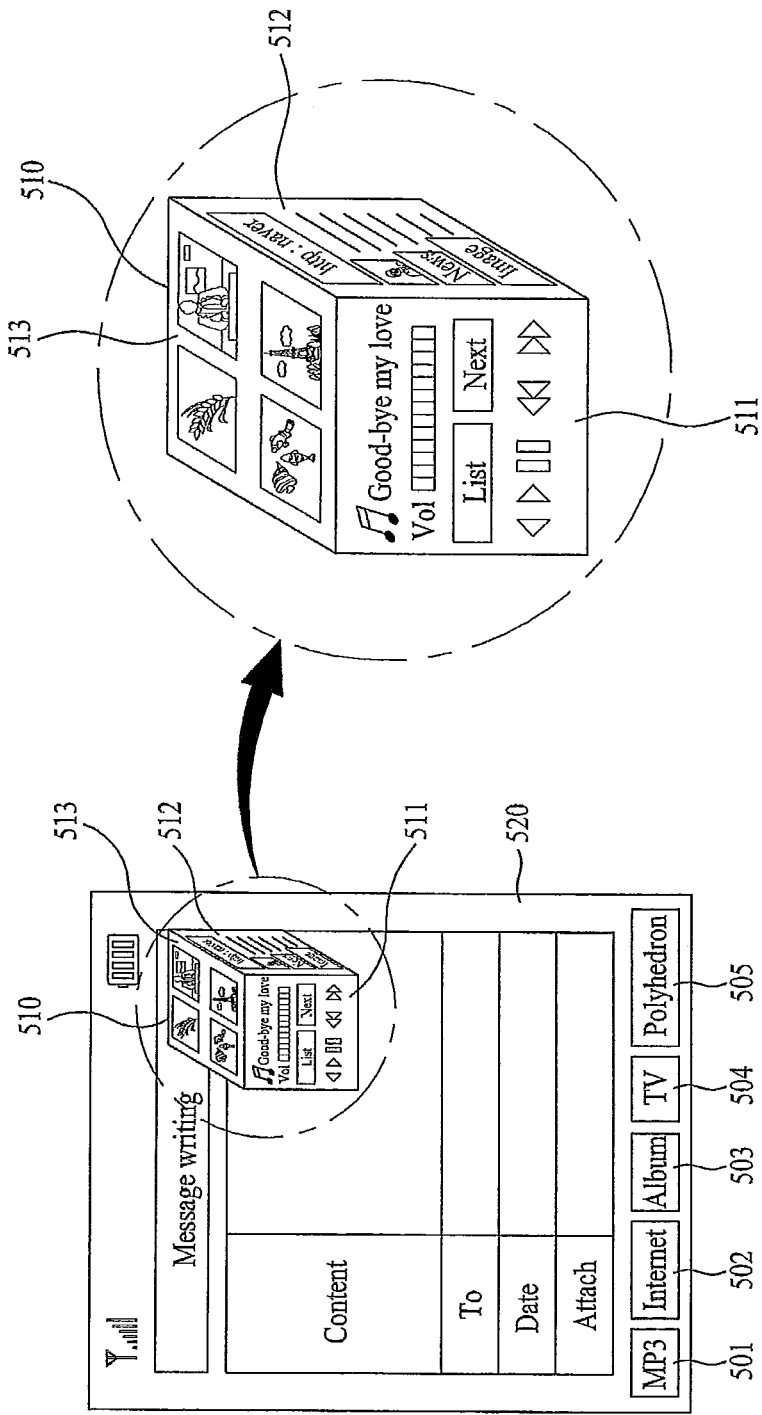

Referring to FIG. 5A, the mobile terminal 100 is able to display execution indicators 501 to 504 of an MP3 playback, an internet access, a photo album and a broadcast viewing, which are being executed as backgrounds, on a prescribed region of a screen while displaying a message writing window as an execution picture of a message writing in progress of execution as a foreground. Therefore, a user checks the execution indicators 501 to 504 to be aware which application is being executed as a background.

In FIG. 5A, the mobile terminal 100 is able to display a multi-polyhedron region 505 for receiving a command of a multi-polyhedron display from a user on a prescribed region of the screen.

If the multi-polyhedron region 505 is activated by a user selection or a user touch in FIG. 5A, the mobile terminal 100 is able to display a multi-polyhedron 510 having facets. In this case, control windows of the MP3 playback, the internet access, the photo album and the broadcast viewing, which are being executed as backgrounds, are displayed on the facets of the multi-polyhedron 510, respectively [FIG. 5B].

For instance, the multi-polyhedron 510 can display the MP3 play control window 511, the internet access control window 512 and the photo album control window 513 on the first to third facets, respectively. And, the broadcast viewing control window (not shown in the drawing) is displayed on a random facet failing to be seen in front view of the picture.

For instance, file information (e.g., singer, song title, composer, writer, album information, etc.) of a currently played audio file and play control key regions (e.g., key regions of volume control, stop, fast forward, rewind, next title, list view, etc.) and the like can be displayed in the MP3 play control window 511. A representative webpage of a currently accessed website, a last accessed webpage and the like can be displayed in the internet access control window 512. And, at least one photo attached to or stored in a photo album can be displayed as a list or thumbnail in the photo album control window 513.

Of course, if a multi-polyhedron display stop command is inputted by a user or a previously specified display time expires, the mobile terminal 100 is able to stop displaying the multi-polyhedron.

While an execution picture of the message writing is displayed, even if a command for displaying a multi-polyhedron is not inputted by a user, the mobile terminal 100 is able to automatically display the multi-polyhedron.

Figure 5C:
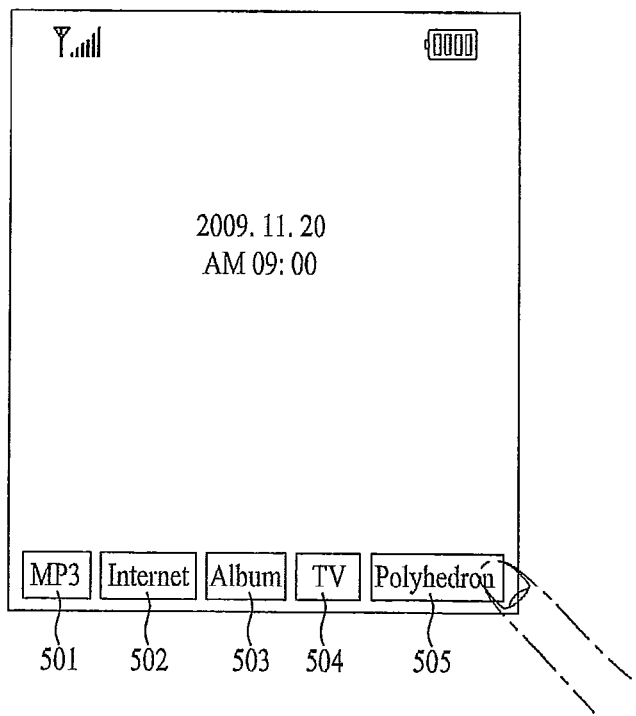

Referring to FIG. 5C, while an MP3 playback, an internet access, a photo album and a broadcast viewing are being executed, if a background picture is displayed instead of an execution picture of a specific application, the mobile terminal 100 is able to display execution indicators 501 to 504 and a multi-polyhedron 505 on a prescribed region of the background image.

Figure 5D:
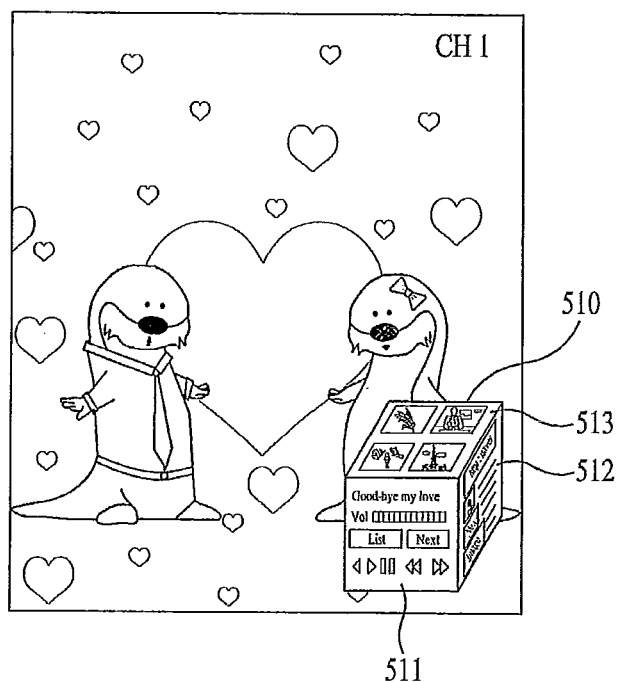

If the multi-polyhedron 505 is activated by a user selection or touch in FIG. 5C, the mobile terminal 10 is able to display a multi-polyhedron 510 having control windows of an MP3 playback, an internet access and a photo album displayed on its facets, respectively while displaying a broadcast output picture as an execution picture of a broadcast viewing [FIG. 5D].

In this case, while the background is being displayed, if the multi-polyhedron region 505 is activated, the application, of which execution picture is displayed, can include a randomly selected one of the currently executed application, an application having an execution picture displayed most recently or an application selected by a user.

Referring now to FIG. 4, in case of receiving an input of a control signal using the first control window displayed on the first facet of the multi-polyhedron displayed in the displaying step S430, the mobile terminal 100 controls an execution of the application corresponding to the first control window [S440].

Regarding the controlling step S440, the following description is made in detail with reference to FIGS. 6A to 8C. For clarity and convenience of the following description, assume that the application execution is controlled using the multi-polyhedron 510 of the state shown in FIG. 5B.

Figure 6A:
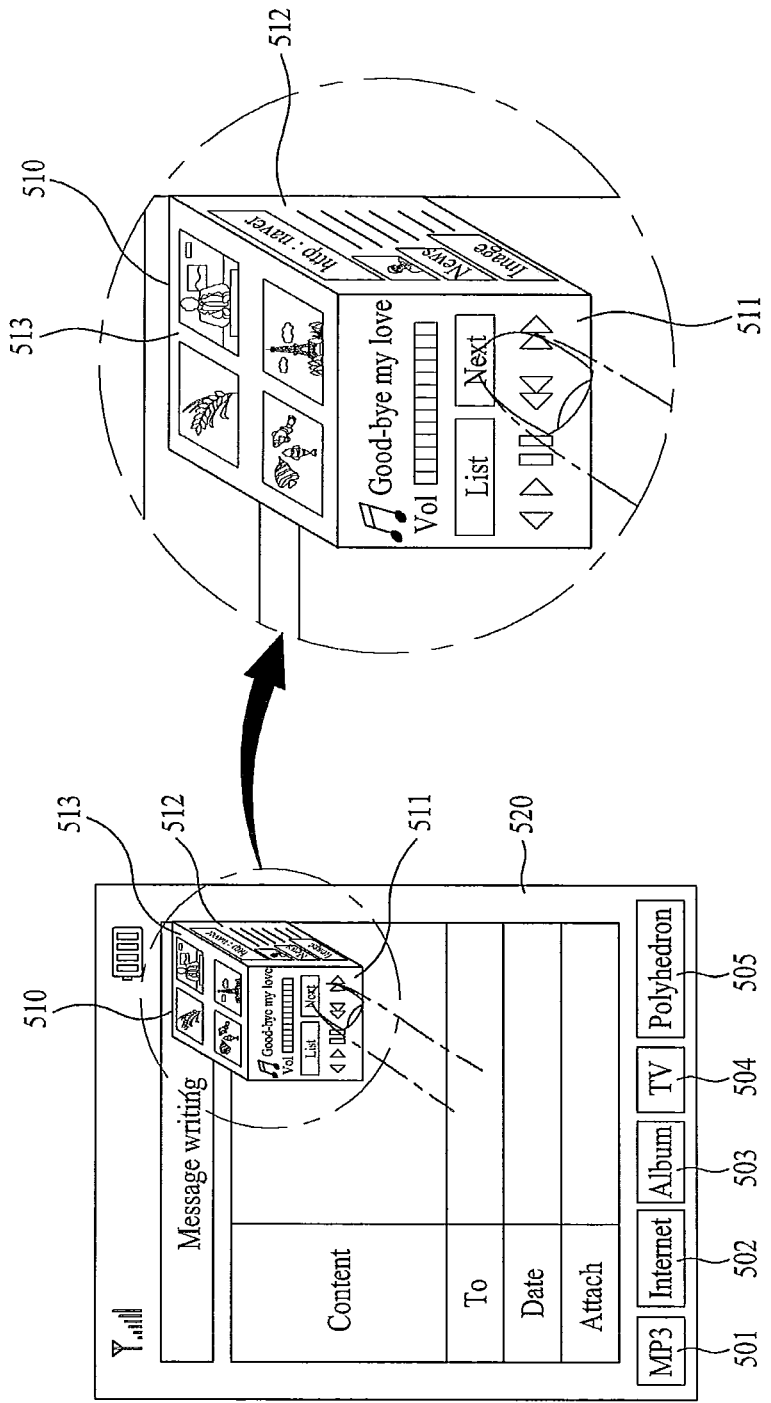
FIGS. 6A to 6B are diagrams for screen configuration of controlling an application execution using a multitasking polyhedron according to the present invention.
Figure 6B:
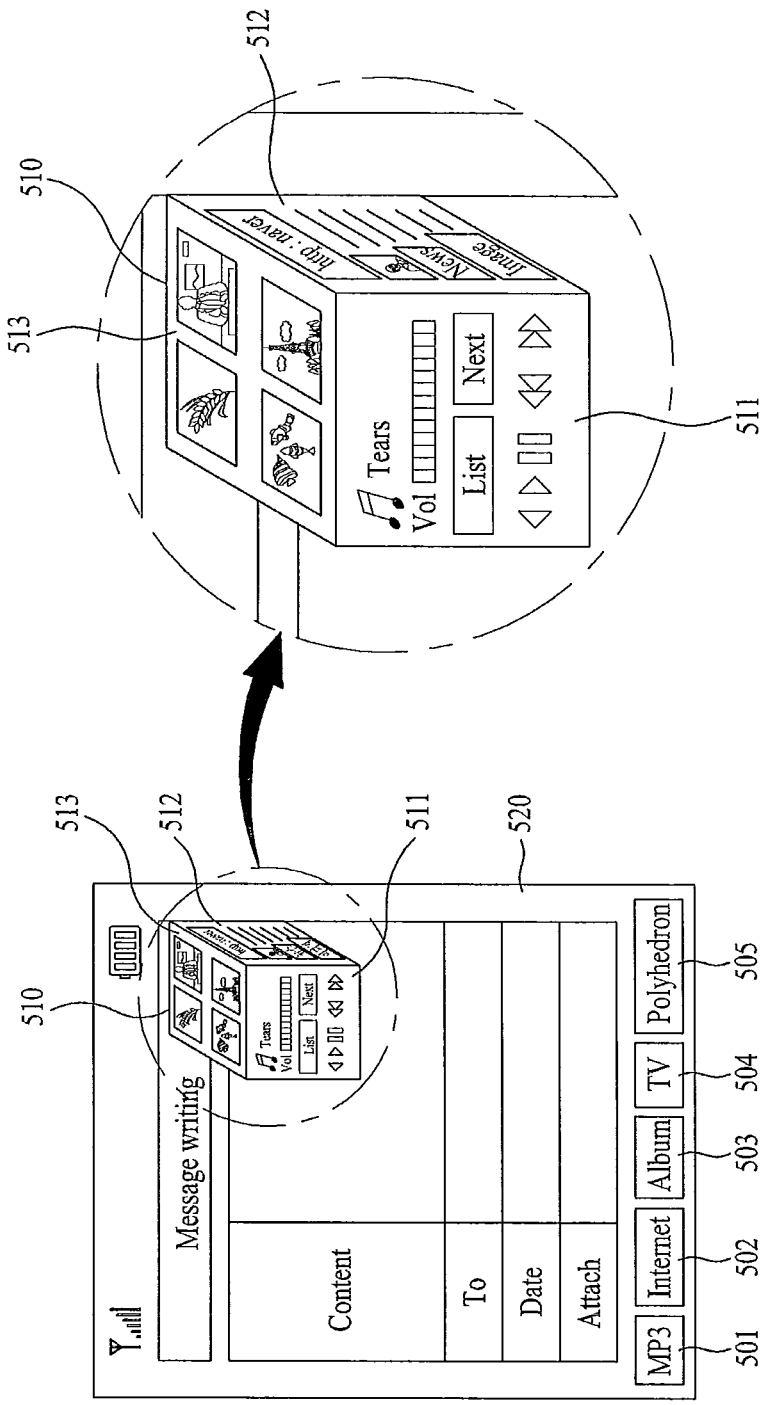

FIG. 6A and FIG. 6B show a process for controlling an MP3 play operation using the MP3 play control window 511 displayed on the first facet of the multi-polyhedron 510.

First of all, if a 'next song' region is selected from the MP3 play control window 511 by a user [FIG. 6A], the mobile terminal 100 is able to play back a second audio file located next to a currently played first audio file and file information on the second audio file can be displayed on the MP3 play control window 511 [FIG. 6B].

If a 'list view' region is selected from the MP3 play control window 511, a list of play target audio files can be displayed in the MP3 play control window 511 (not shown in the drawing). Moreover, a user is able to change a playback state of the currently played audio file by manipulating a play control key region in the MP3 play control window 511.

Figure 7B:
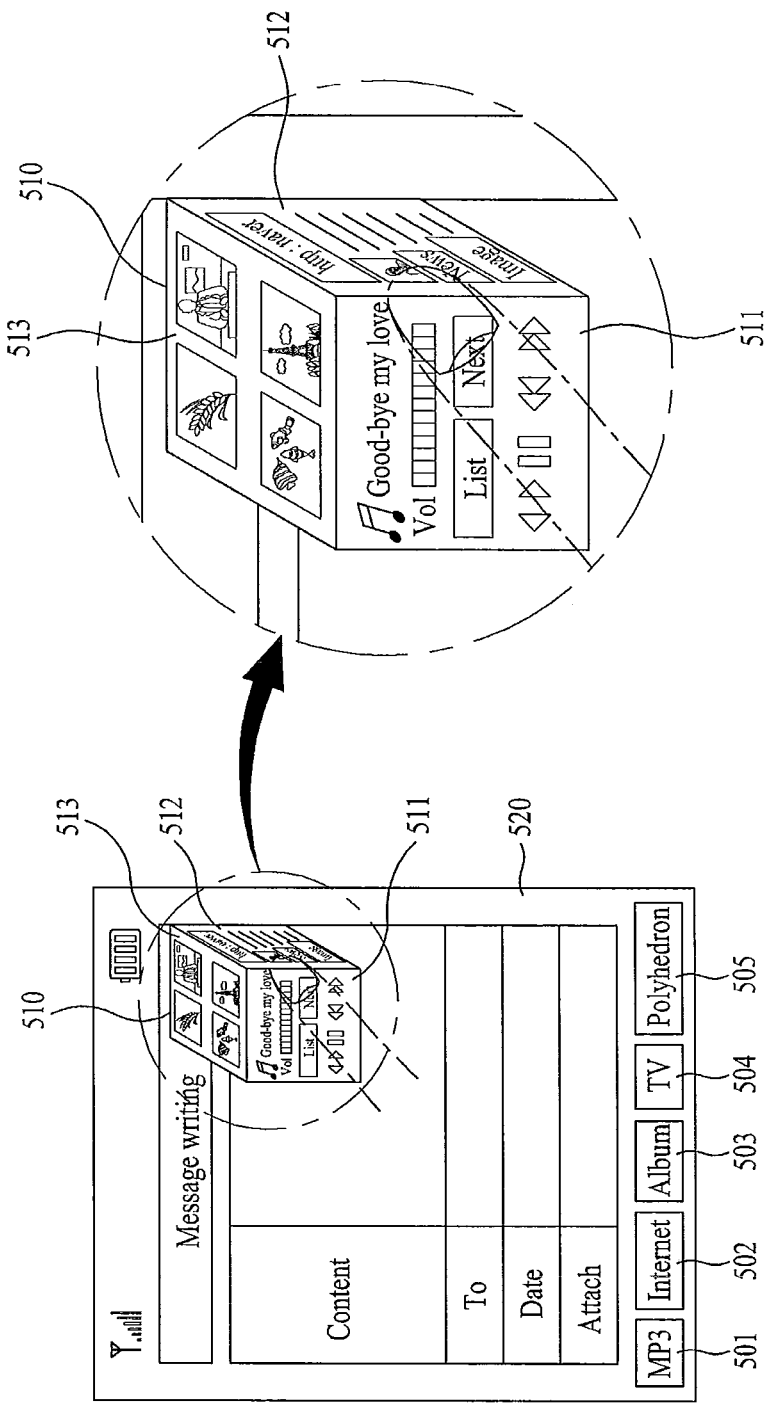
Figure 7C:
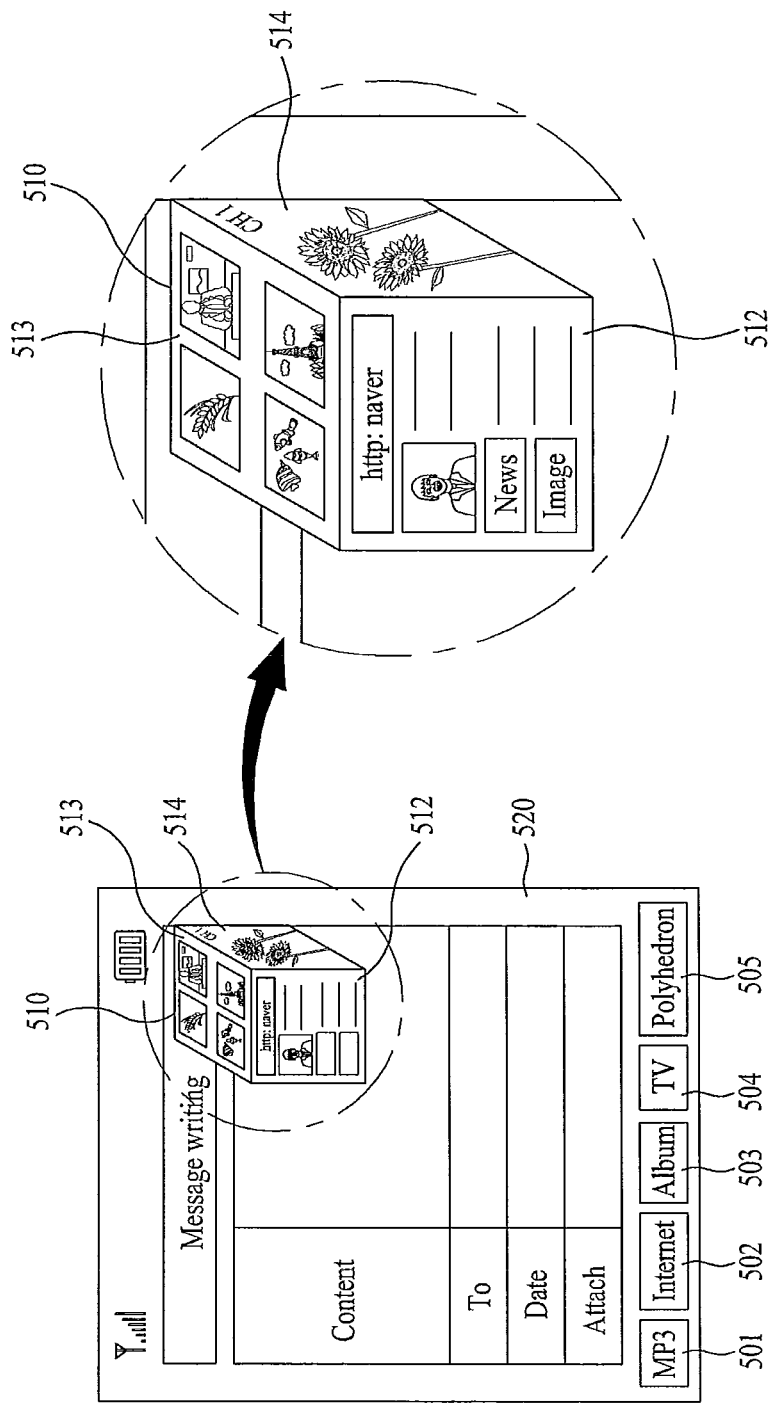

FIGS. 7A to 7C show a process for controlling an internet access operation using the internet access control window 512 displayed on the second facet of the multi-polyhedron 510.

Referring to FIG. 7A, in case of receiving an input of a rotation command signal to enable the second facet to be located at a front side from a user [a], the mobile terminal 100 rotates the multi-polyhedron 510 to enable the second facet to be located at the front side (at which the first facet was located before the rotation) [b]. Therefore, the internet access control window 512 can be displayed on the front side located facet.

For instance, the rotation command signal can be inputted by a touch & drag action in a predetermined direction (matching a rotational direction), a terminal shaking action, a manipulation of a rotation command key region, etc.

In case that a specific data region (e.g., an image region, a text region, etc.) is selected from the internet access control window 512 shown in FIG. 7A (b) or FIG. 7B by a user, the mobile terminal 100 displays a webpage, which is linked to data corresponding to the selected specific data region, in the internet access control window 512 or can enlarge and display the selected specific data region in the internet access control window 512 [FIG. 7C].

Figure 8C:
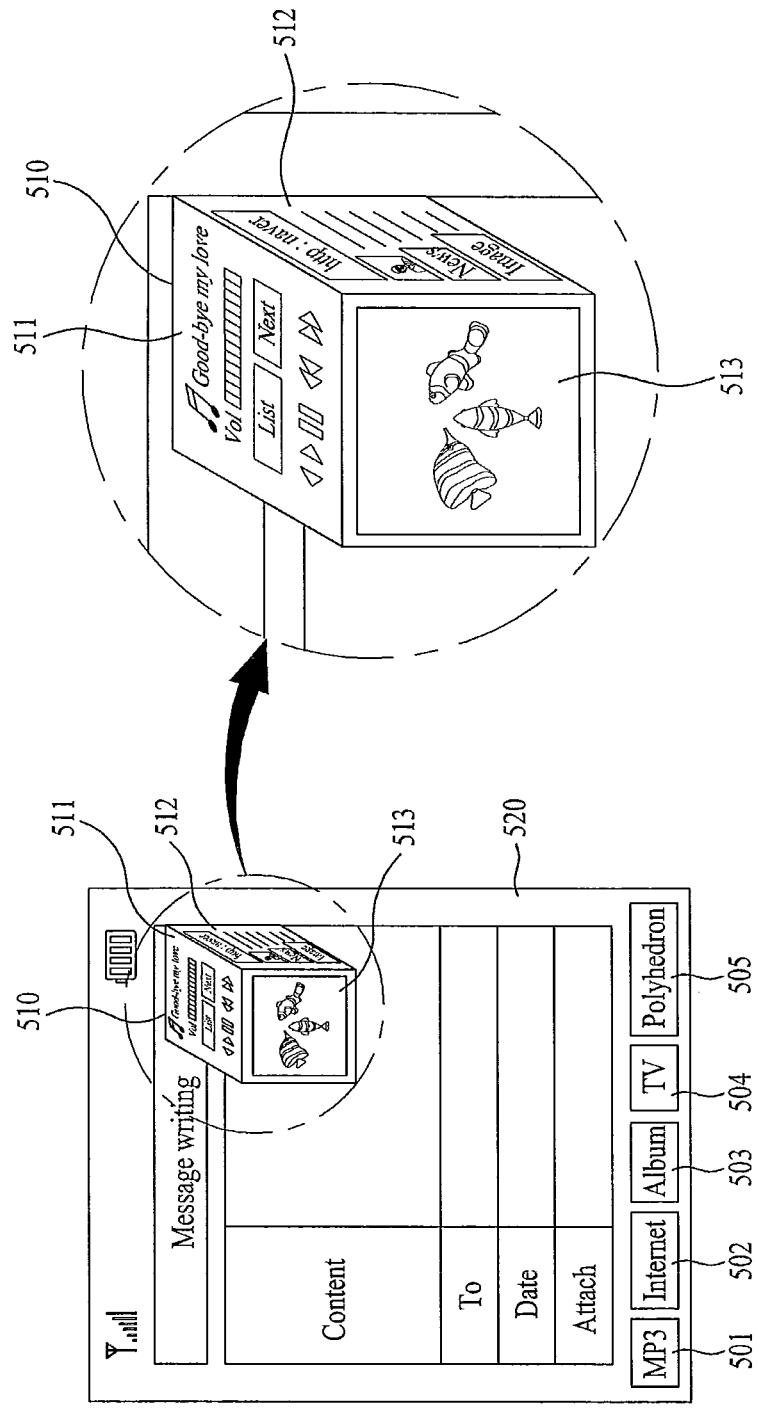

FIGS. 8A to 8C show a process for controlling a photo album operation using the photo album control window 513 displayed on the third facet of the multi-polyhedron 510.

Referring to FIG. 8A, in case of receiving an input of a rotation command signal to enable the third facet to be located at a front side from a user [a], the mobile terminal 100 rotates the multi-polyhedron 510 to enable the third facet to be located at the front side (at which the first facet was located before the rotation) [b]. Therefore, the photo album control window 513 can be displayed on the front side located facet.

If a specific photo is selected from the photo album control window 513 by the user, the mobile terminal 100 is able to display selected specific photo in the photo album control window 513 [FIG. 8C].

According to the first embodiment of the present invention, the mobile terminal 100 is able to switch a first application to a specific one of the rest of the at least one or more applications using a multi-polyhedron [cf. FIG. 4]. In particular, in case that the first application and the specific application are executed as a foreground and a background, respectively, the execution formats are switched to each other to enable the first application and the specific application to be executed as the background and the foreground, respectively.

In more particular, in case of receiving an input of a touch & drag action between a first execution picture and a specific facet of the multi-polyhedron, the mobile terminal 100 displays a control window of the first application on a specific facet and is able to display an execution picture of the specific application corresponding to the control window displayed on the specific facet, under the control of the controller 180.

In this case, the touch & drag action between the first execution picture and the specific facet is an example of an application switching command action and can include any action for commanding an application switching regardless of a type of the corresponding action.

Figure 9A:
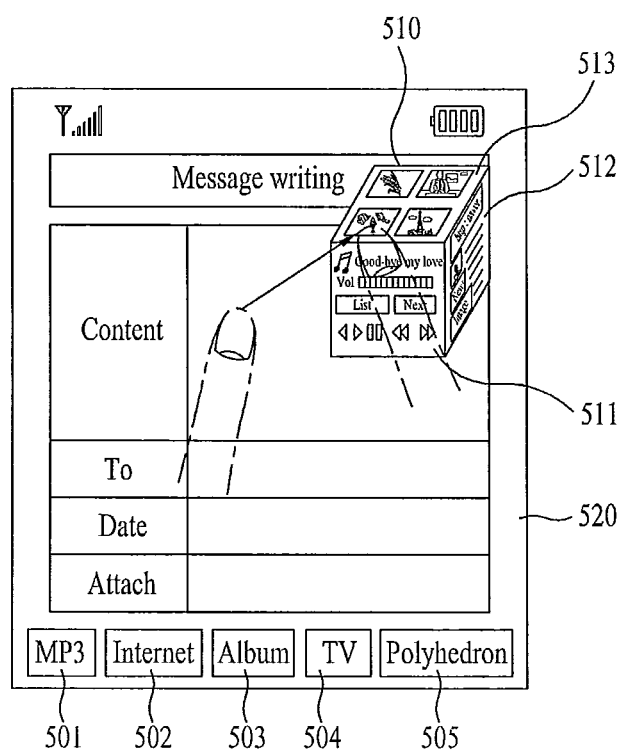
FIG. 9A and FIG. 9B are diagrams for screen configuration of switching a background application and a foreground application using a multitasking polyhedron according to the present invention.
Figure 9B:
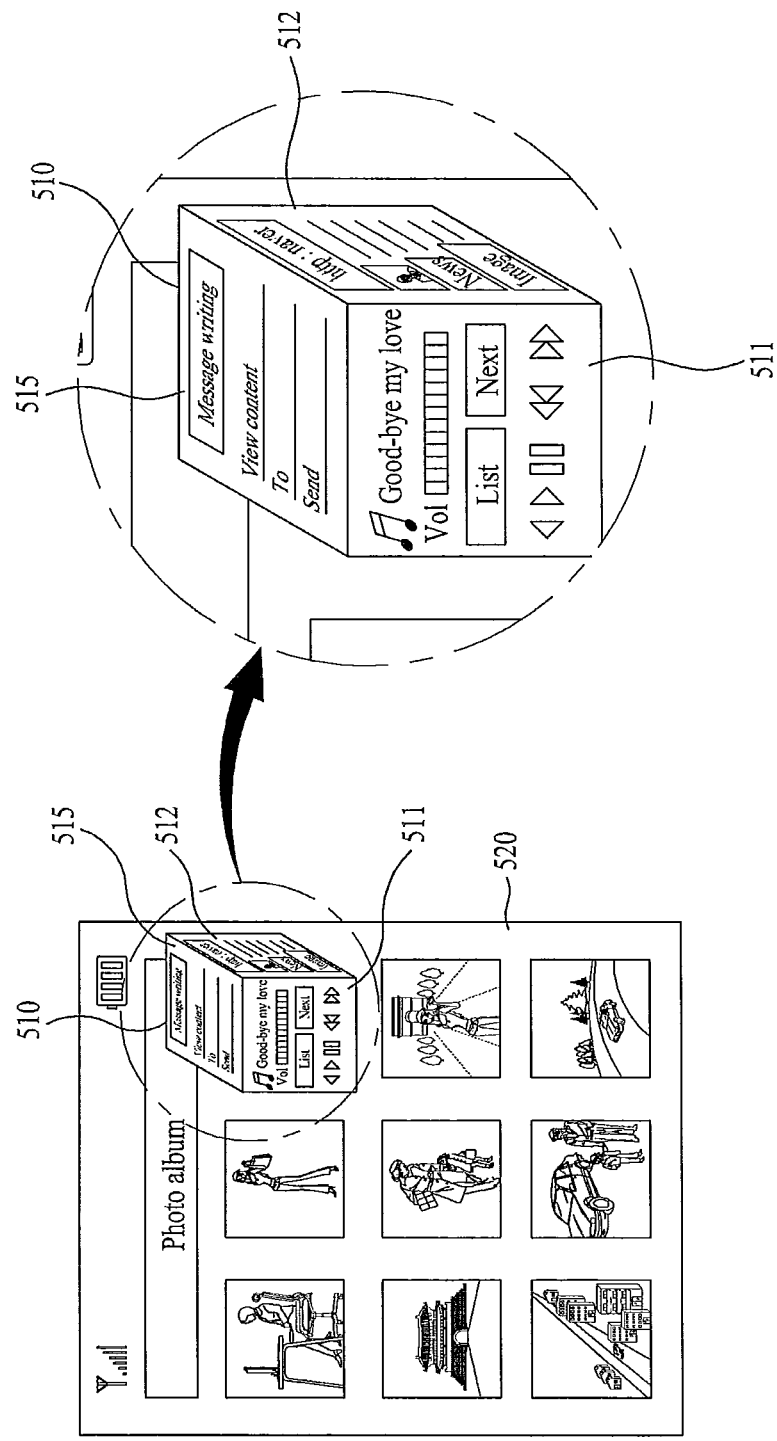

Regarding this, the following description is made in detail with reference to FIG. 9A and FIG. 9B. For clarity and convenience of the following description, assume that an application switching action is performed in the state shown in FIG. 5B.

First of all, in case of receiving an input of a touch & drag action to a third facet from a message writing window (example of an execution picture of a message writing) [FIG. 9A], the mobile terminal is able to display a control window 515 of the message writing on the third facet while displaying an execution picture of a photo album corresponding to a photo album control window 513 displayed on the third facet [FIG. 9B].

According to a first embodiment of the present invention, in case of receiving an input of a selection signal for a specific facet of a multi-polyhedron, the mobile terminal 100 is able to display an execution picture of a specific application corresponding to a control window displayed on the specific facet. In particular, the mobile terminal 100 is able to switch an execution type of the specific application from a background to a foreground.

In this case, the selection signal for the specific facet includes a foreground execution command signal for the specific application and can include any action for commanding a foreground execution for the specific application regardless of a type of the corresponding input action.

Figure 10B:
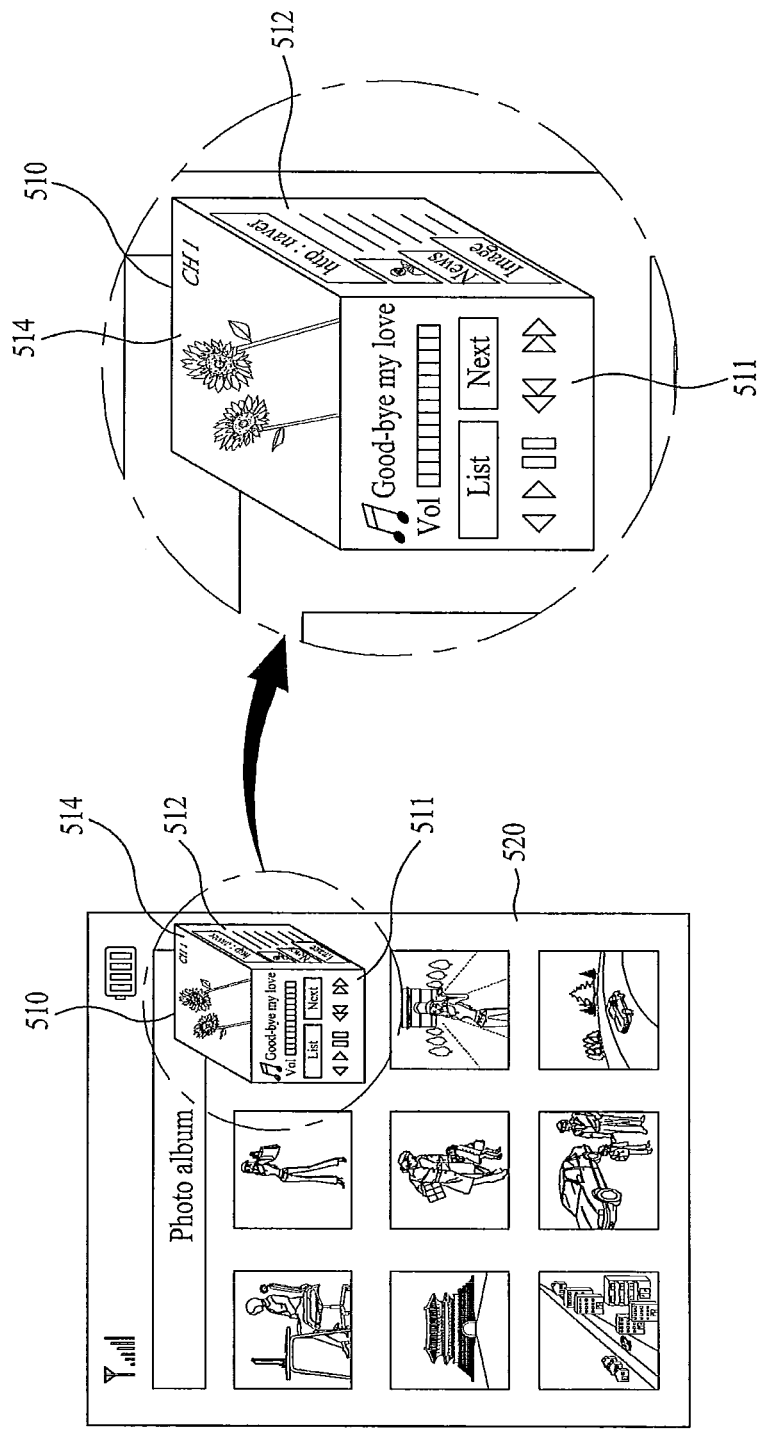
Figure 10C:
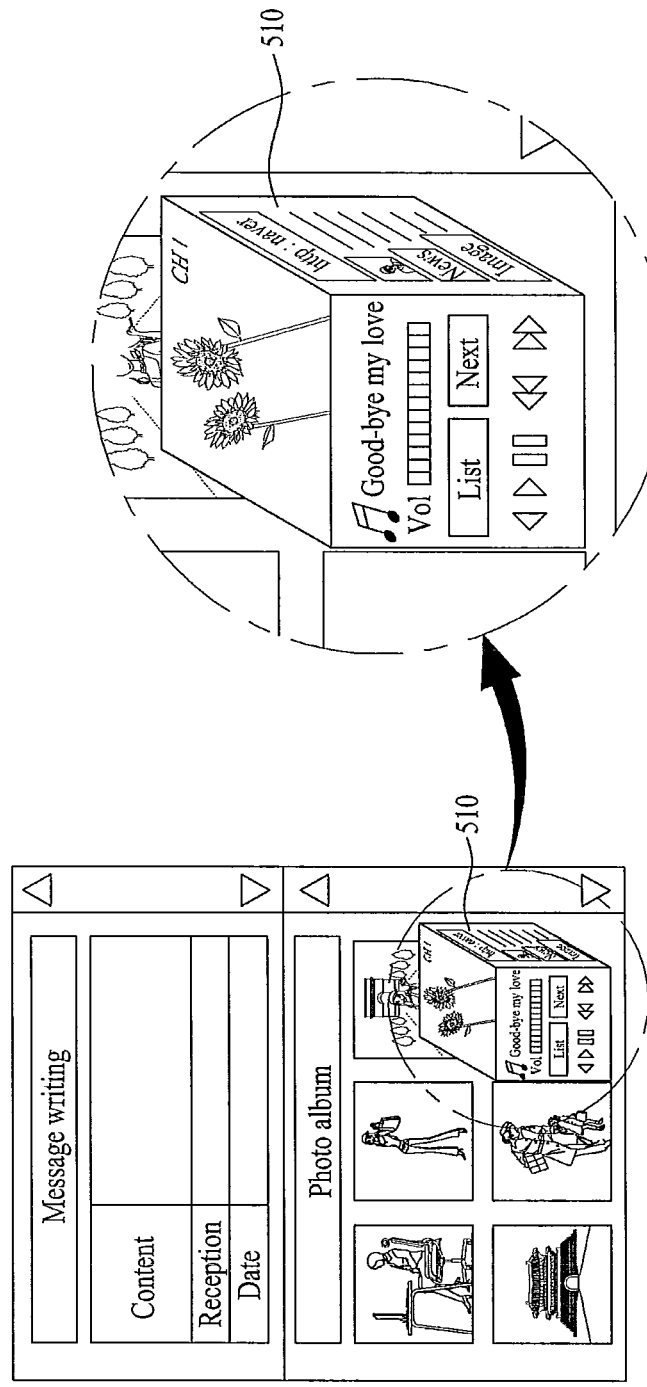

Regarding this, the following description is made in detail with reference to FIGS. 10A to 10C. For clarity and convenience of the following description, assume that an application switching action is performed in the state shown in FIG. 5B.

Referring to FIG. 10A, in case of receiving an input of a multi-touch action (example of an action for commanding a foreground execution of a photo album) to a third facet on which a photo album control window 513 is displayed [a], the mobile terminal 100 enables a user to select an execution state of a message writing of which execution picture is currently displayed [b].

For instance, the selectable execution states can include 'terminate', 'control window display' and 'partition screen'.

If the 'terminate' is selected as the execution state of the message writing in FIG. 10A (b), the mobile terminal 100 terminates the execution of the message writing and is then able to display an execution picture of a photo album [FIG. 10B].

If the 'partition screen' is selected as the execution state of the message writing in FIG. 10A (b), the terminal 100 partitions the screen into a plurality of partitioned screens and is then able to display the execution picture of the message writing and the execution picture of the photo album on the first partitioned screen and the second partitioned screen, respectively [FIG. 10C].

If the 'control window display' is selected as the execution state of the message writing in FIG. 10A (b), the terminal 100 is able to display an execution picture of a photo album while displaying a control window 515 of the message writing on the third facet [cf. FIG. 9B].

In the following description, a method of controlling applications in a mobile terminal according to a second embodiment of the present invention is explained in detail with reference to the accompanying drawings.

FIG. 11 is a second flowchart of a method of controlling an application in a mobile terminal according to one embodiment of the present invention.

Referring to FIG. 11, the mobile terminal 100 executes a first application [S1110] and then displays an execution picture (hereinafter called a first execution picture) of the first application via the display unit 151 [S1120], under the control of the controller 180.

The mobile terminal 100 displays a 3D polyhedron displaying at least one data related to the first application on its corresponding facet [S1130] while displaying the first execution picture [S1120], under the control of the controller 180.

For instance, the data related to the first application can include a control window for controlling the first application and data attachable to the first application or data attached to the first application, according to a data type.

The following description is made with reference to data types.

First of all, there is a case ① that the data type is a control window for controlling the first application (hereinafter called a control window).

In case of receiving an input of a control signal using a first control window displayed on a first facet of a 3D polyhedron, the mobile terminal 100 is able to control an execution of the first application under the control of the controller 180 [S1140].

Regarding the controlling step S1140, the following description is made in detail with reference to the accompanying drawings.

Figure 12A:
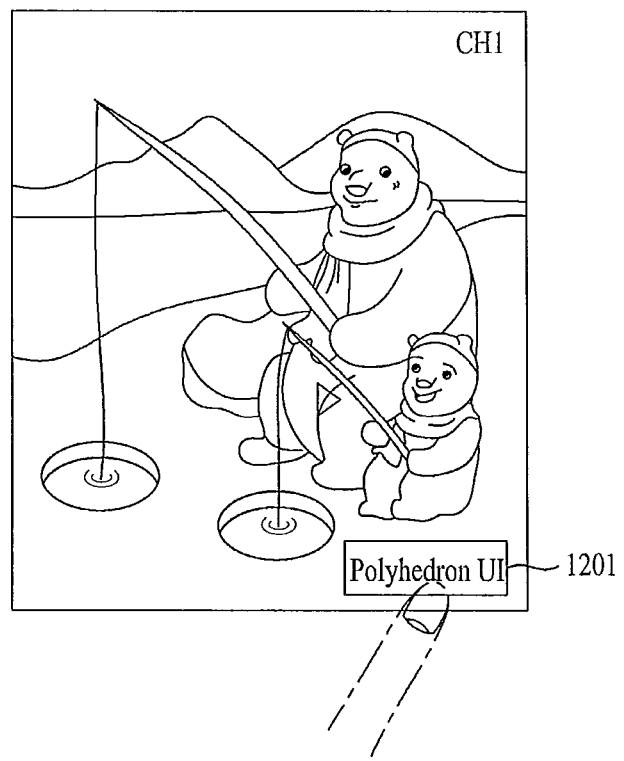
FIG. 12A and FIG. 12B are diagrams for screen configuration of displaying a 3D polyhedron for a broadcast viewing control in the course of broadcast view execution according to the present invention.
Figure 12B:
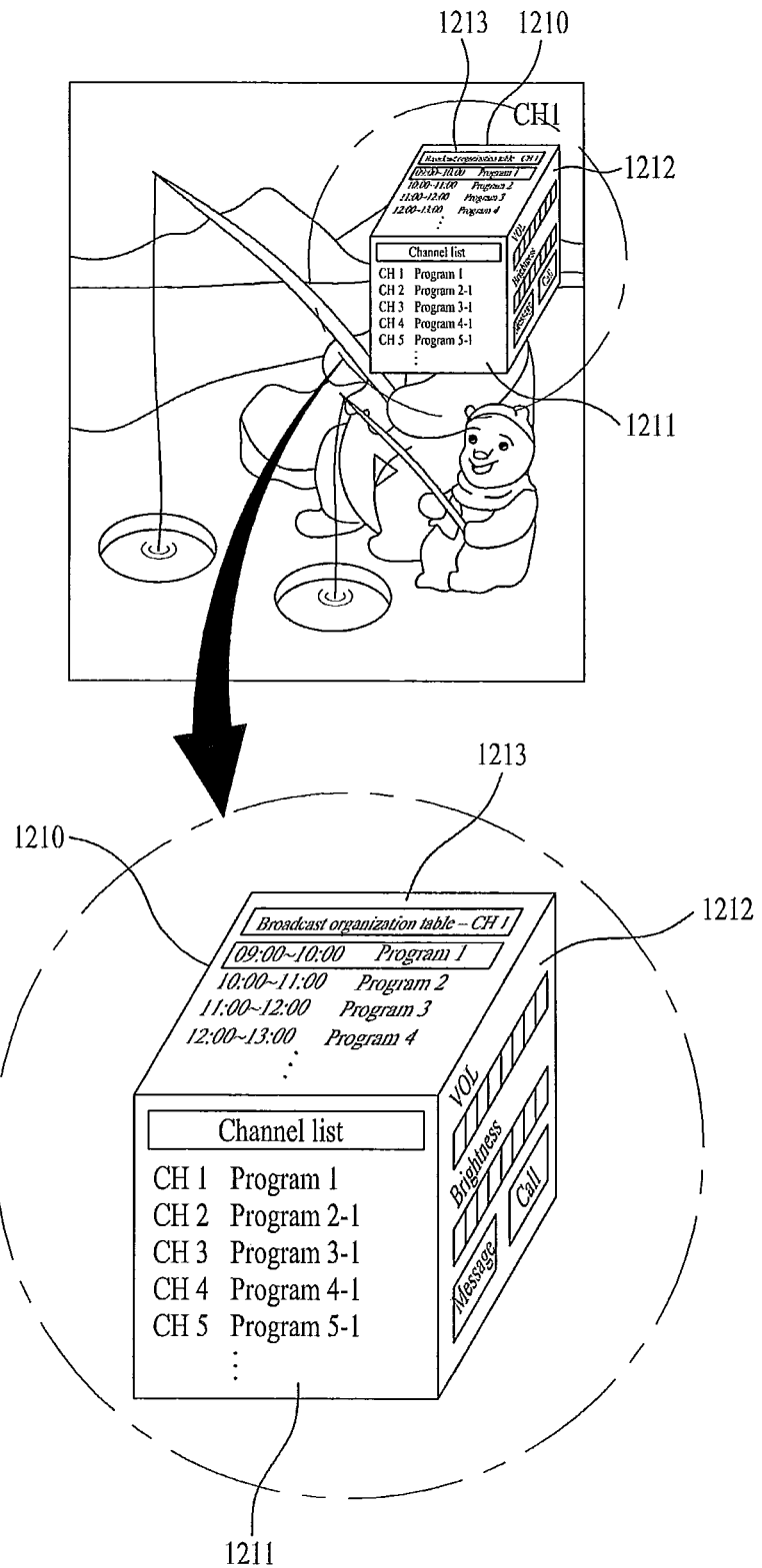

FIG. 12A and FIG. 12B are diagrams for screen configuration of displaying a 3D polyhedron for a broadcast viewing control in the course of broadcast view execution according to the present invention. For clarity and convenience of the following description, a first application is limited to a broadcast viewing only.

First of all, the mobile terminal 100 displays a broadcast picture according to a broadcast viewing execution and is also able to simultaneously display a key region 1201 for receiving an input of a display command signal of a 3D polyhedron (hereinafter named a broadcast control polyhedron) for a broadcast viewing control on a prescribed region of the broadcast picture [FIG. 12A].

If the key region 1201 is activated by a user selection action, the mobile terminal 100 is able to display a broadcast control polyhedron 1210 on a prescribed region of the broadcast picture [FIG. 12B].

For instance, a first control window 1211 for displaying a channel list, a second control window 1212 for displaying a broadcast relevant menu item (e.g., volume, brightness, message, call connection, etc.) and a third control window 1213 for displaying a broadcast organization table of a broadcast channel providing a currently outputted broadcast program can be displayed on facets of the broadcast control polyhedron 1210, respectively.

Meanwhile, even if the display command signal of the broadcast control polyhedron 1210 is not inputted by a user, the mobile terminal 100 is able to automatically display the broadcast control polyhedron 1210 related to a currently outputted broadcast.

FIGS. 13A to 15C are diagrams for screen configuration of controlling a broadcast view execution using the broadcast control polyhedron 1210 shown in FIG. 12B according to the present invention.

In the following description, a broadcast viewing control using the first control window 1211 displayed on the first facet of the broadcast control polyhedron 1210 is explained with reference to FIGS. 13A to 13D.

Figure 13A:
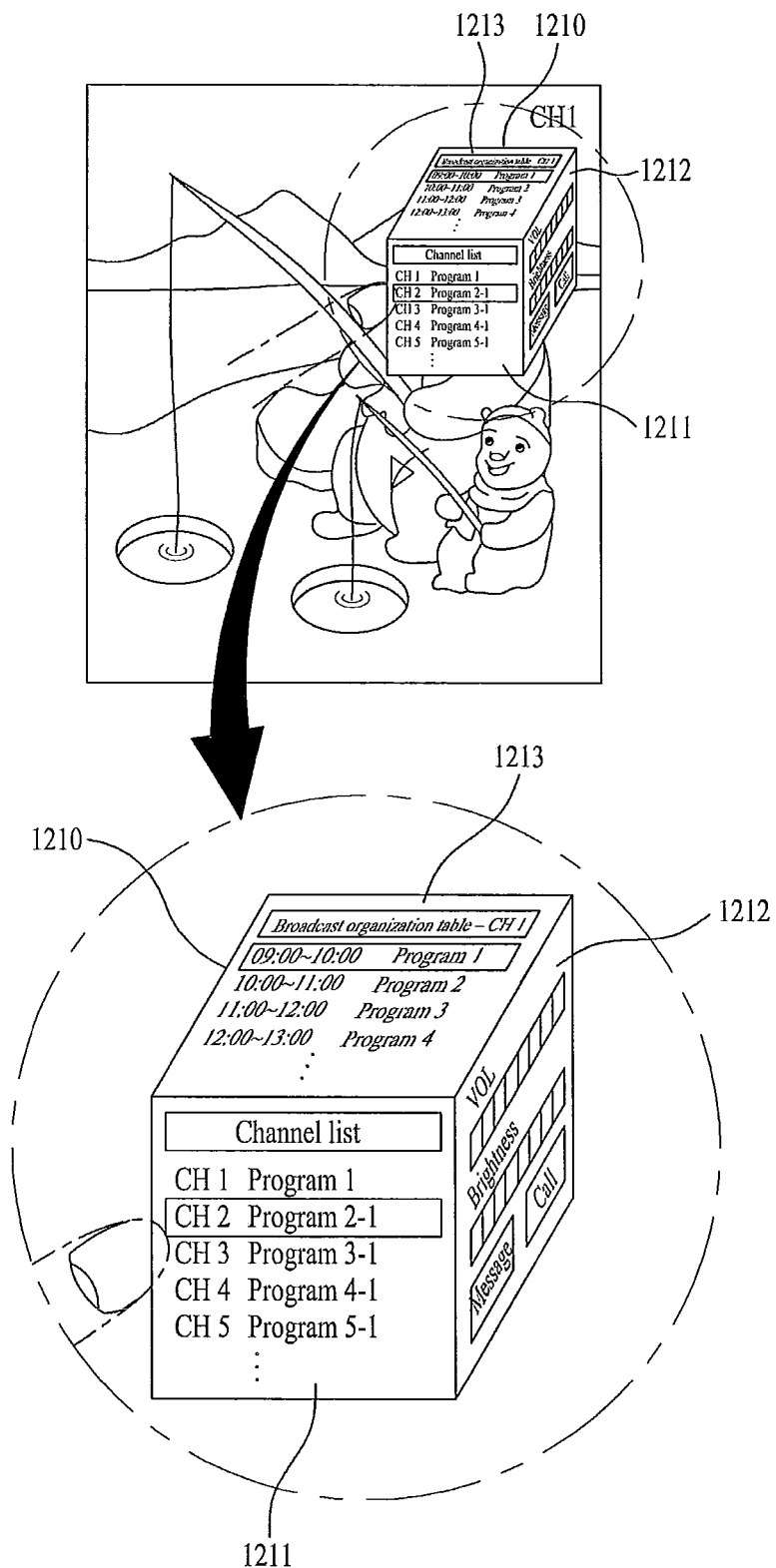
Figure 13C:
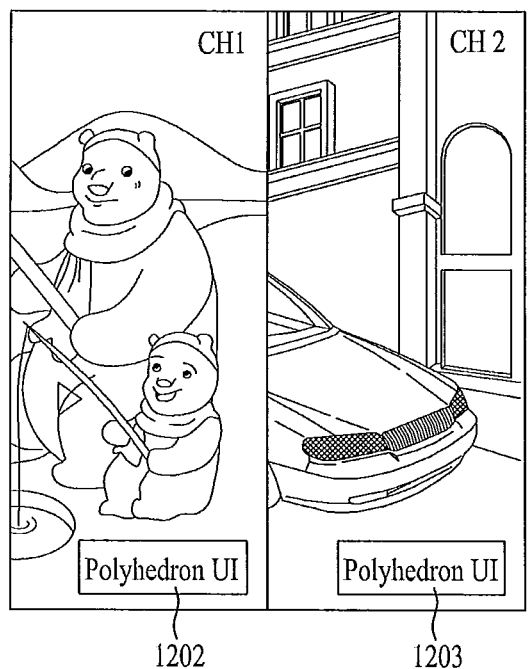
Figure 13D:
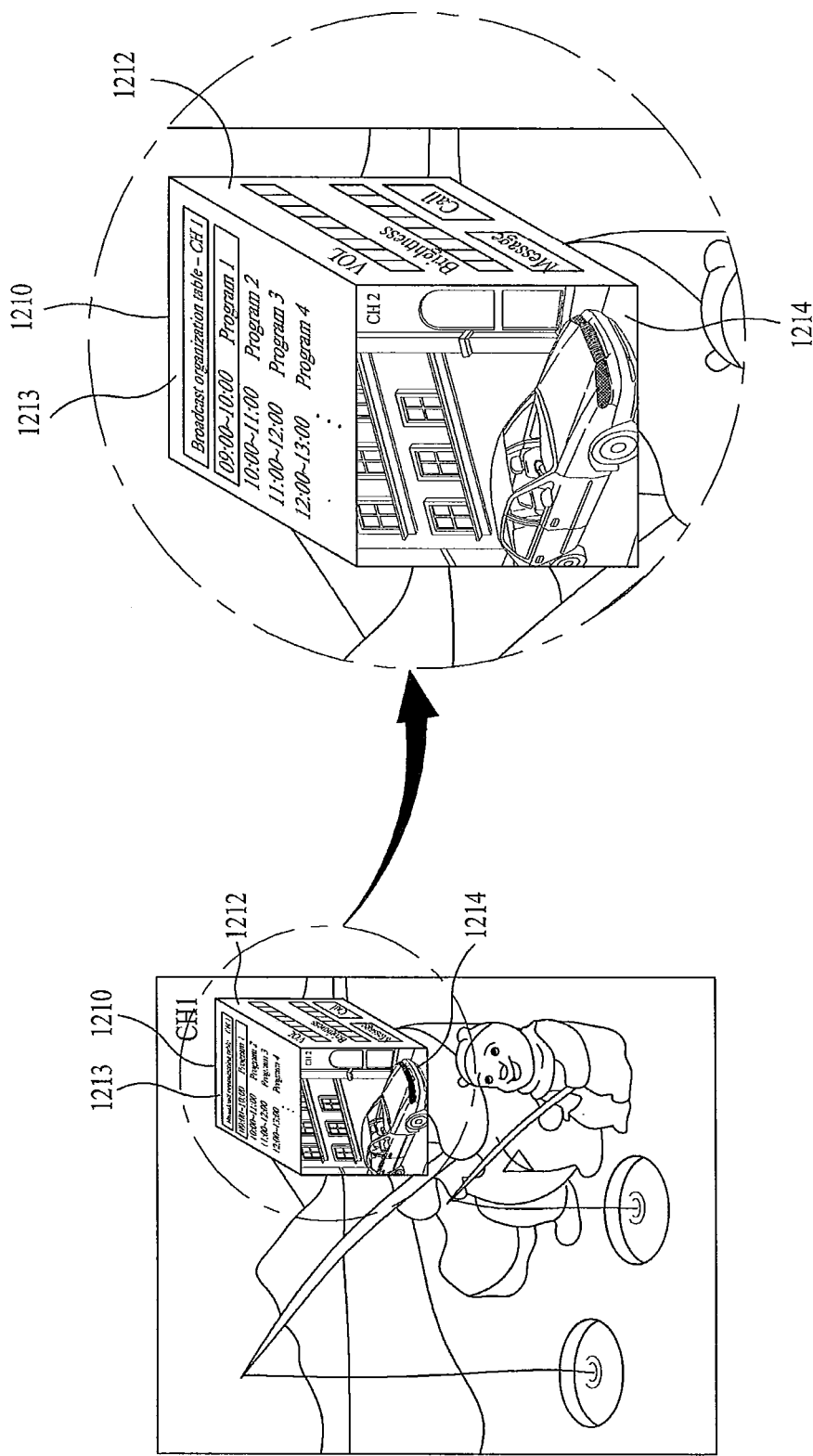

First of all, in the course of outputting a broadcast program provided from a first broadcast channel, in case of receiving a selection of a second broadcast channel 1211-1 from a channel list displayed in the first control window 1211 from a user [FIG. 13A], the mobile terminal 100 receives a broadcast program provided via the second broadcast channel 1211-1 and is then able to output the received broadcast program [FIGS. 13B to 13D].

Referring to FIG. 13B, the mobile terminal 100 switches to the second broadcast channel 1211-1 and then displays a key region 1201 for receiving an input of a display command signal of the broadcast control polyhedron 1210 on a prescribed region of a broadcast picture for the second broadcast channel 1211-1 [a] or is able to display the broadcast control polyhedron 1210 on a prescribed region of the broadcast picture for the second broadcast channel 1211-1 [b]. Of course, as mentioned in the foregoing description, if the key region 1201 is activated in FIG. 13B (a), it is able to configure the picture shown in FIG. 13B (b).

Referring to FIG. 13C, the mobile terminal 100 partitions a display region of the display unit 151 into a plurality of partitioned display regions and is then able to display a broadcast picture (hereinafter named a first broadcast picture) of a first broadcast channel and a broadcast picture (hereinafter named a second broadcast picture) of a second broadcast channel on the first and second partitioned display regions, respectively.

In this case, key regions 1202 and 1203 (refer to the former key region 1201) are displayed in the first and second broadcast pictures, respectively. If a user selects the key region 1202/1203, a broadcast control polyhedron corresponding to the first/second broadcast channel can be displayed in the first/second broadcast picture.

Referring to FIG. 13D, the mobile terminal 100 keeps displaying the first broadcast picture and is also able to simultaneously display a fourth control window 1214 for displaying the second broadcast picture on the first facet of the broadcast control polyhedron 1210.

In the following description, a broadcast viewing control using the third control window 1213 displayed on the third facet of the broadcast control polyhedron 1210 is explained with reference to FIGS. 14A to 14D.

Figure 14A:
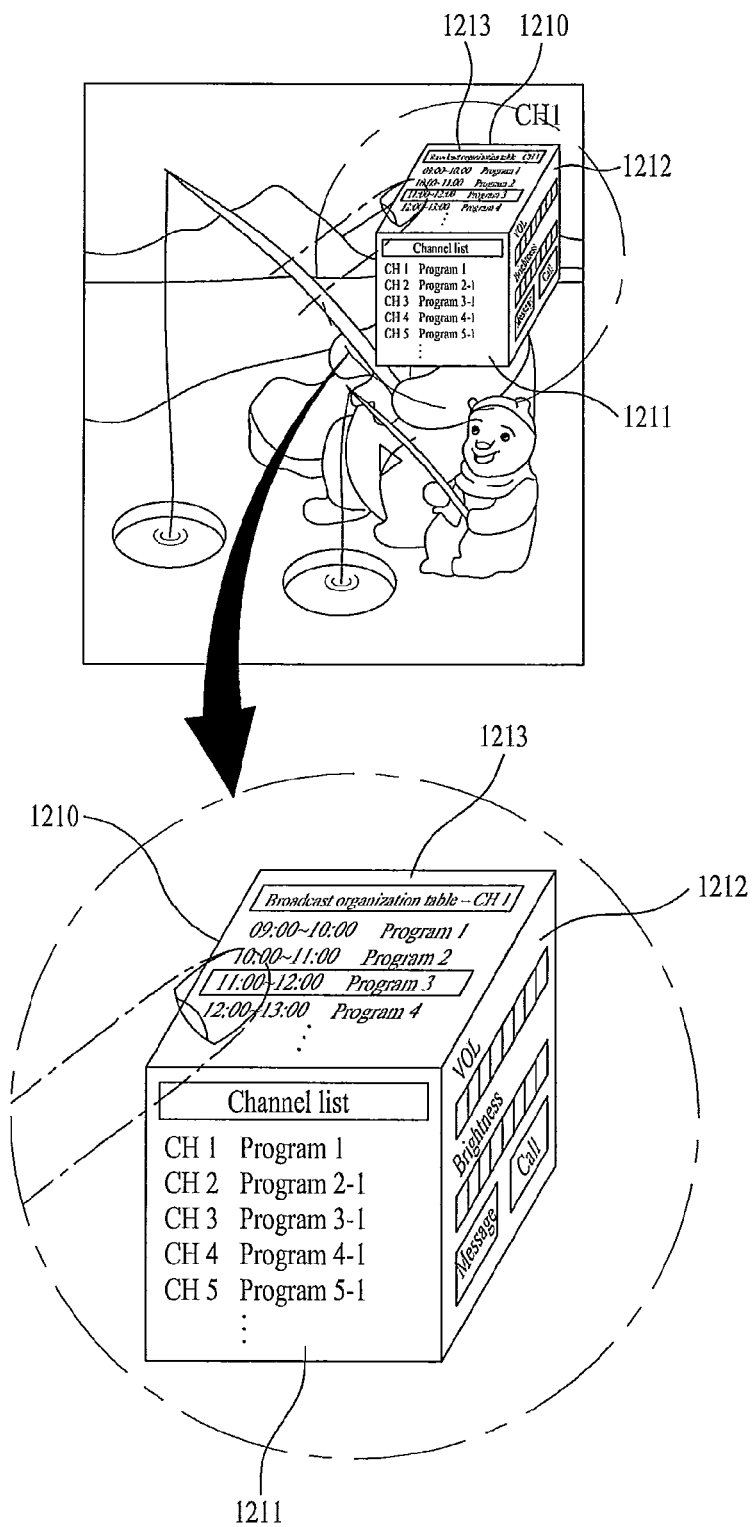
Figure 14C:
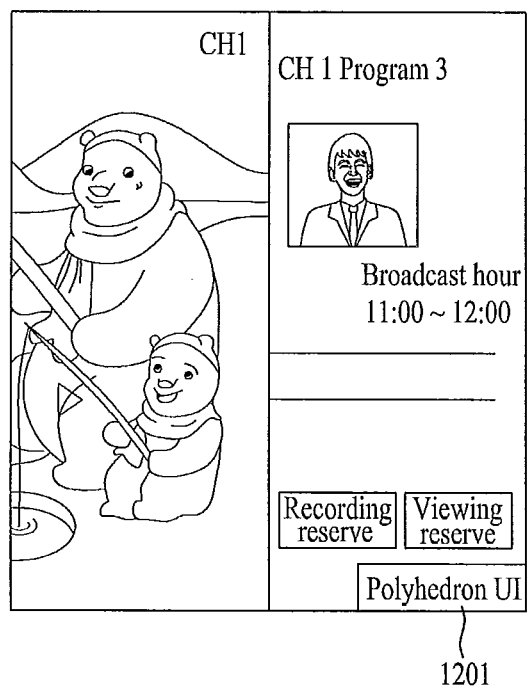
Figure 14D:
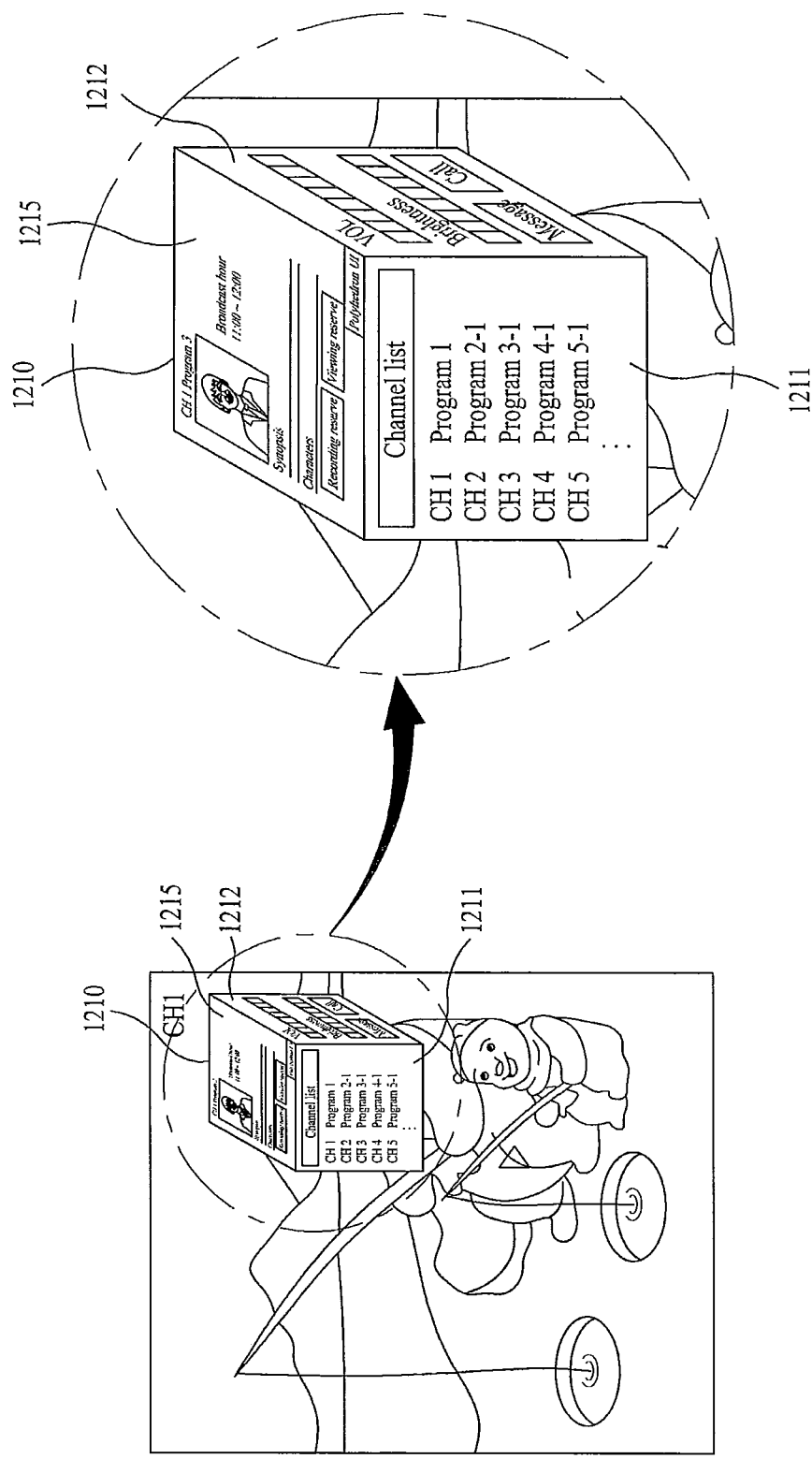

First of all, in the course of outputting a first broadcast program, if a user selects a specific broadcast program from a broadcast organization table displayed in the third control window 1213 [FIG. 14A], the mobile terminal is able to output broadcast information on the selected specific broadcast program [FIGS. 14B to 14D]. For instance, the broadcast information can include a broadcast synopsis, a representative image, character information, broadcast time information and the like and can further include a key region for setting a recording or viewing reservation.

Referring to FIG. 14B, the mobile terminal 100 stops outputting the first broadcast program and is then able to output the broadcast information on the specific broadcast program instead of a broadcast picture of the first broadcast program [a]. Moreover, if the key region 1201 is selected in FIG. 14B (a), the mobile terminal 100 is able to return to the state shown in FIG. 14A.

Referring to FIG. 14C, the mobile terminal 100 partitions a display region of the display unit 151 into a plurality of partitioned display regions and is then able to output a broadcast picture of a first broadcast program and the broadcast information on the specific broadcast program to the first and second partitioned display regions, respectively.

Referring to FIG. 14D, the mobile terminal 100 keeps displaying the broadcast picture of the first broadcast program and is also able to simultaneously display a fifth control window 1215 for displaying the broadcast information on the specific broadcast program on the third facet of the broadcast control polyhedron 1210.

In the following description, a broadcast viewing control using the second control window 1212 displayed on the second facet of the broadcast control polyhedron 1210 is explained with reference to FIGS. 15A to 15C.

Figure 15A:
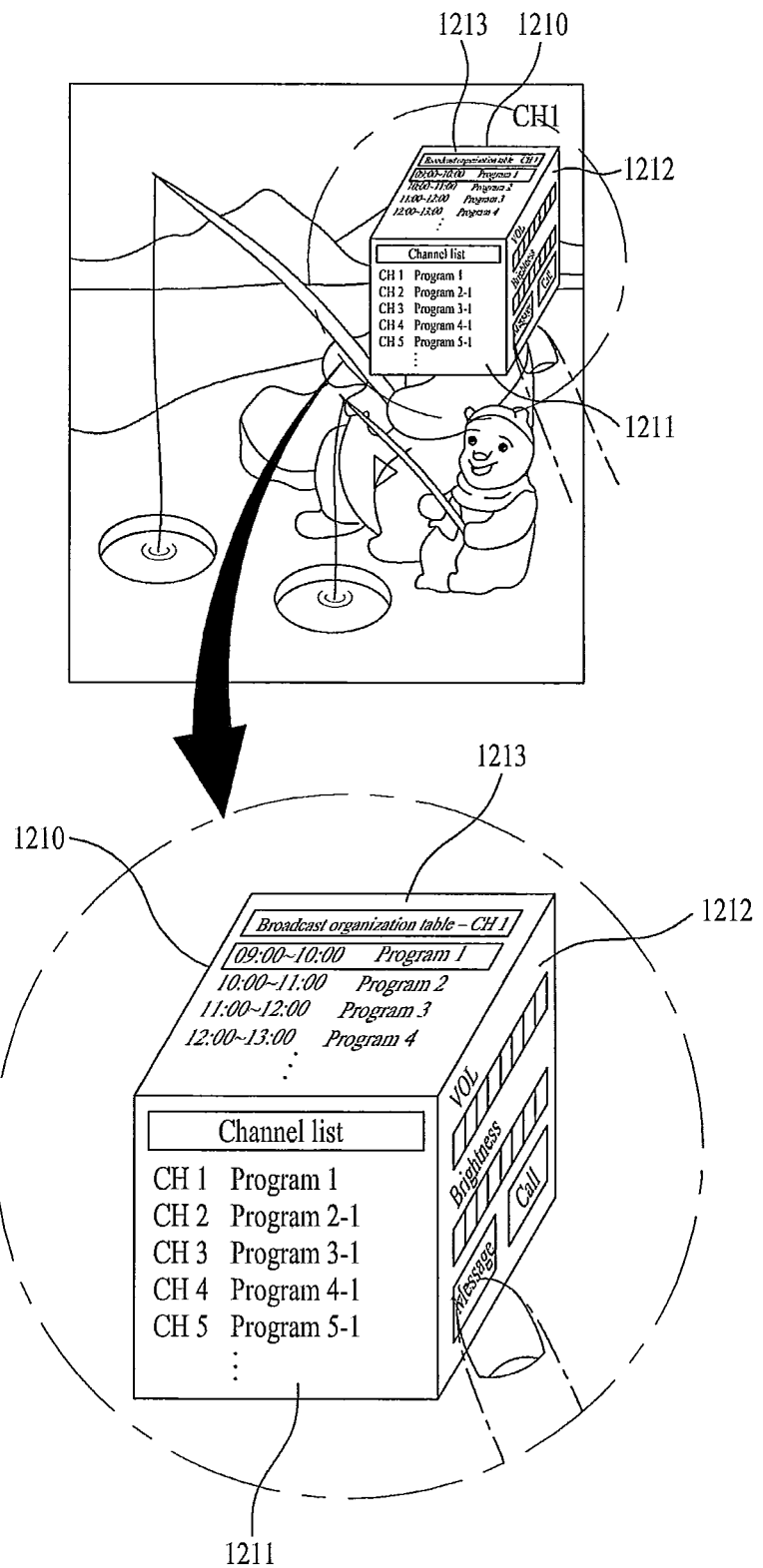
FIGS. 15A to 15C are diagrams for screen configuration of controlling a broadcast view execution using a broadcast control polyhedron according to the present invention.
Figure 15B:
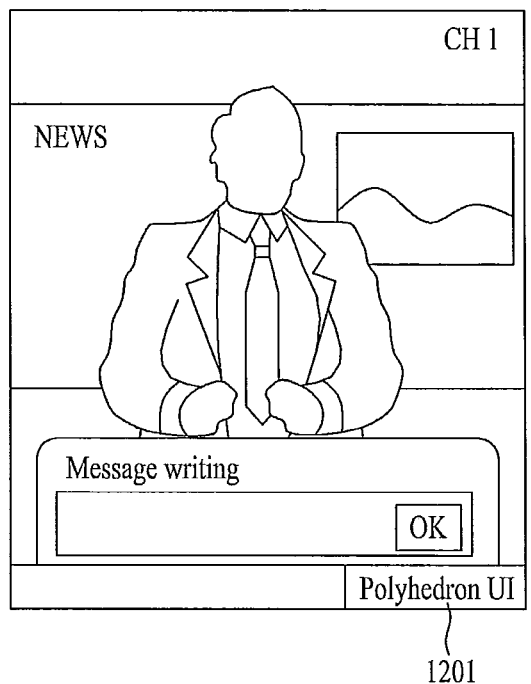
Figure 15C:
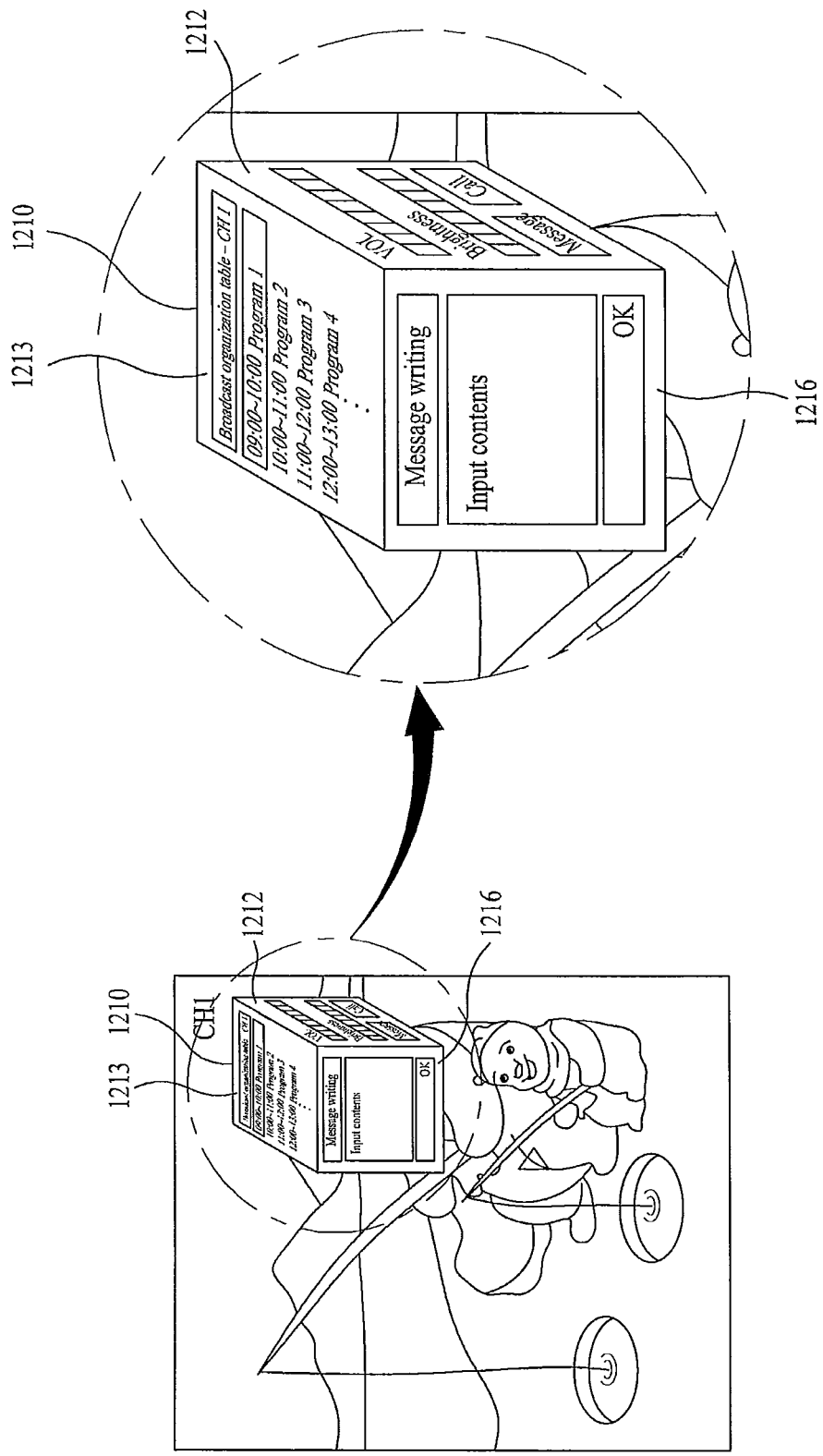

First of all, in the course of outputting a first broadcast program, if a user selects a message region displayed in the second control window 1212 [FIG. 15A], the mobile terminal 100 displays a message writing window on a prescribed region of a broadcast picture [FIG. 15B] or is able to display a sixth control window 1216 displaying the message writing window on the second facet of the broadcast control polyhedron 1210.

Figure 16A:
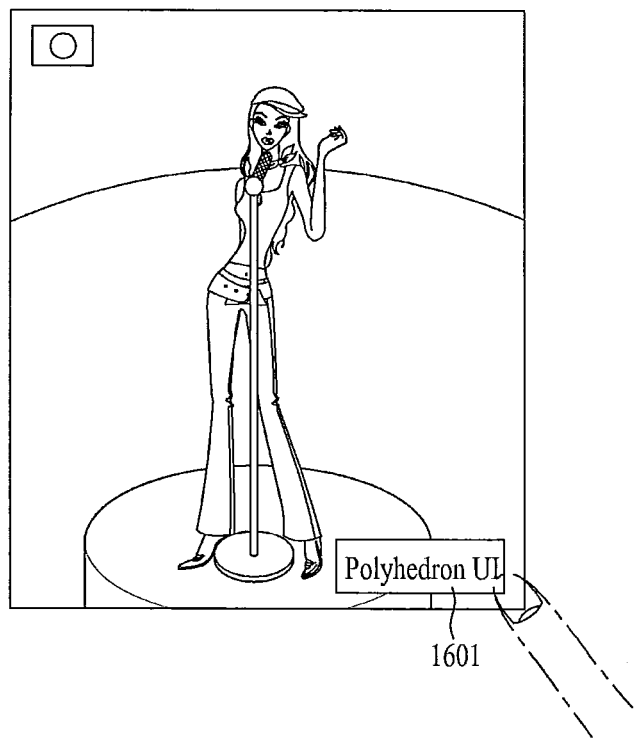
FIG. 16A and FIG. 16B are diagrams for screen configuration of displaying a 3D polyhedron for a camera photographing control in the course of camera photographing execution according to the present invention.
Figure 16B:
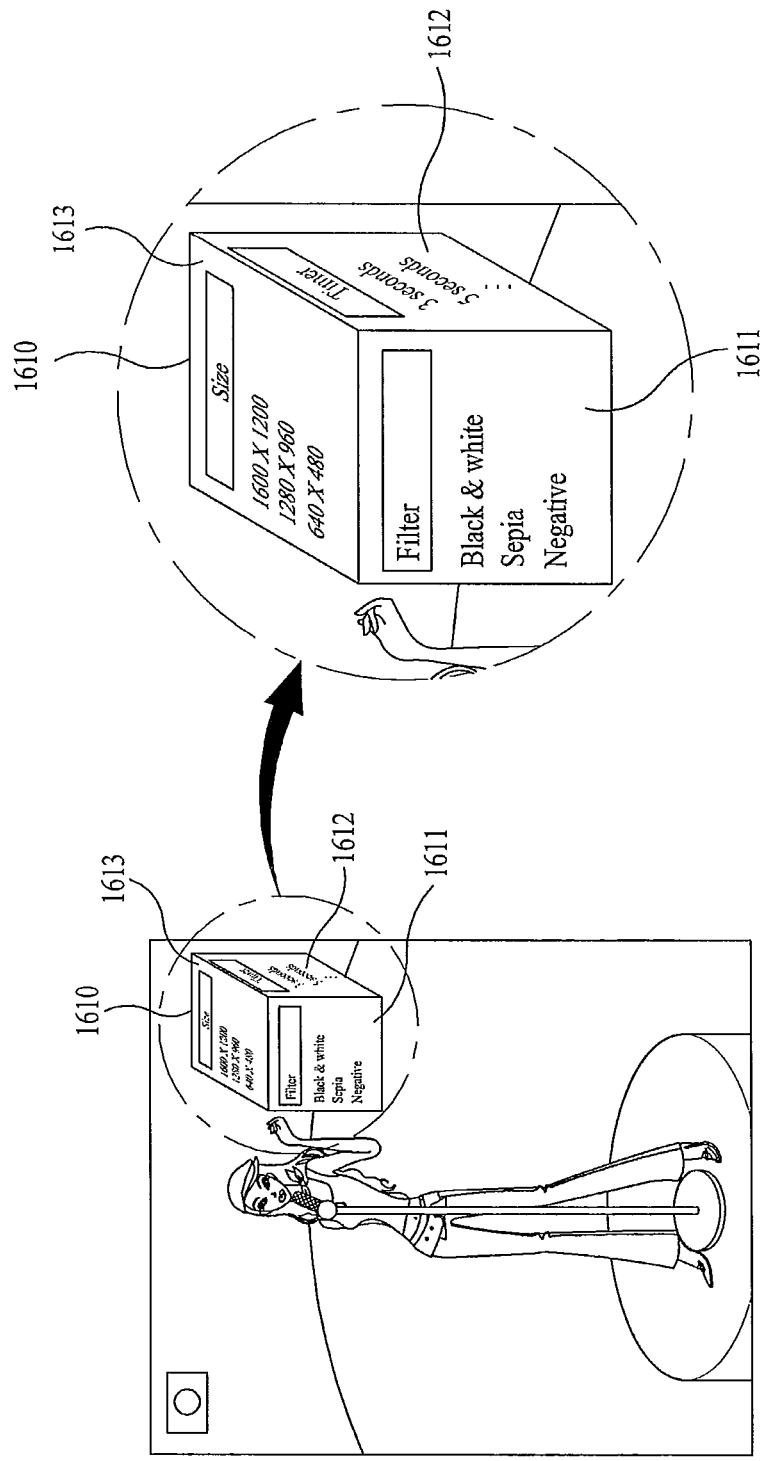

FIG. 16A and FIG. 16B are diagrams for screen configuration of displaying a 3D polyhedron for a camera photographing control in the course of camera photographing execution according to the present invention. For clarity and convenience of the following description, a first application is limited to a camera photographing.

First of all, as a camera photographing application is executed, the mobile terminal 100 displays an object image inputted via a camera on a screen and is also able to simultaneously display a key region 1601 for receiving an input of a display command signal of a 3D polyhedron (hereinafter named a camera control polyhedron) for a camera photographing control on a prescribed region of the screen [FIG. 16A].

If the key region 1601 is activated by a user selecting action, the mobile terminal 100 is able to display a camera control polyhedron 1610 on a prescribed region of the screen [FIG. 16B].

For instance, a first control window 1611 displaying an image filter list including settable image filters, a second control window 1612 displaying a size list including settable image sizes (or resolutions) and a third control window 1613 displaying a timer time list including settable timer operating times can be displayed on facets of the camera control polyhedron 1610, respectively.

Therefore, a user selects a specific one of the image filters from the image filter list displayed in the first control window 1611, selects a specific one of the image sizes from the size list displayed in the second control window 1612, or is able to select a specific one of the timer operating times from the timer time list displayed in the third control windows 1613.

Meanwhile, even if the user does not input the display command signal of the camera control polyhedron 1610, if the camera photographing application is being driven, the mobile terminal 100 is able to automatically display the camera control polyhedron 1610.

In the following description, explained is a case ② that the data type is the data attachable to the first application.

First of all, while displaying the data attachable to the first application on the facets of the 3D polyhedron, respectively, the mobile terminal 100 receives an input of a selection signal of the first data displayed on the first facet from a user [S1150].

For instance, the selection signal includes a touch to the first facet, a touch & drag action between the first facet and the execution picture of the first application or the like and can be inputted by a command action for attaching the first data of one of various types to the first application.

In case of receiving the input of the selection signal of the first data, the mobile terminal 100 attaches the first data to the first application under the control of the controller 180 [S1160].

In this case, the attachment of the first data to the first application can include an action of designating the first data to a data field related to the first application, an action of storing the first data in a storage area of the first application or the like.

In the displaying step S1150, when a plurality of data input fields are included in the execution picture of the first application, if an input indicator is located at a specific one of a plurality of the data input fields, the mobile terminal 100 is able to display a 3D polyhedron displaying at least one data attachable to the specific data input field on its corresponding facet under the control of the controller 180. If a selection signal of the specific data displayed on the specific facet is inputted, the mobile terminal 100 is able to attach the specific data to the specific data input field.

Regarding the attaching step S1160, the following description is made in detail with reference to the accompanying drawings.

FIGS. 17A to 17D are diagrams for screen configuration of attaching data to a phonebook using a 3D polyhedron in the course of phonebook execution according to the present invention. For clarity and convenience of the following description, the first application is limited to the phonebook.

Figure 17A:
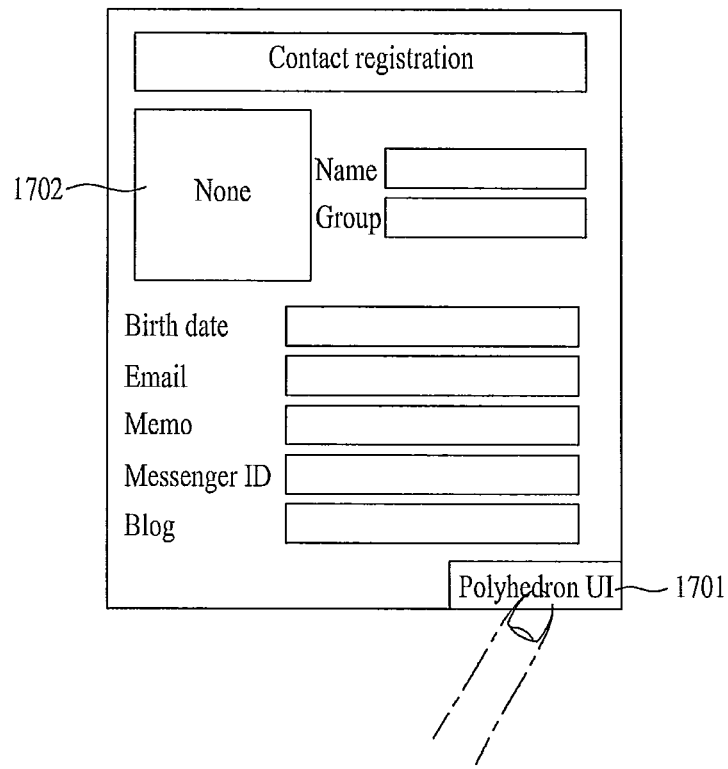

Referring to FIG. 17A, as the phonebook is executed, the mobile terminal 100 displays a contact registration picture as a phonebook execution picture and is then bale to display a key region 1701 for receiving an input of a display command signal of a 3D polyhedron having facets, on which data attachable to the phonebook are displayed, respectively, on a prescribed region of the contact registration picture.

Figure 17B:
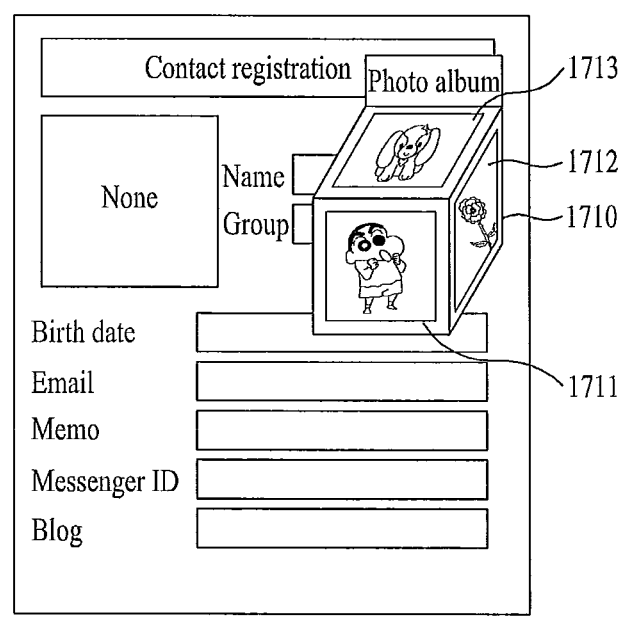

If the key region 1701 is activated by a user selecting action in FIG. 17A, the mobile terminal 100 is able to display a 3D polyhedron 1710 having facets, on which at least one or more images attachable as a contact image corresponding to the currently displayed contact registration picture are displayed, respectively [FIG. 17B].

For instance, the image displayed on each of the facets of the 3D polyhedron 1710 can include an image attached to the photo album.

In case of receiving an input of a selecting action of the first image 1711 displayed on the first facet of the 3D polyhedron 1710 from a user, the mobile terminal 100 is able to attach the first image 1711 as the contact image corresponding to the currently displayed contact registration picture [FIG. 17C].

For instance, the selecting action of the first image 1711 can include a touch & drag action to the contact image region 1702 from the first facet, a multi-action performed on the first facet or the like.

Figure 17D:
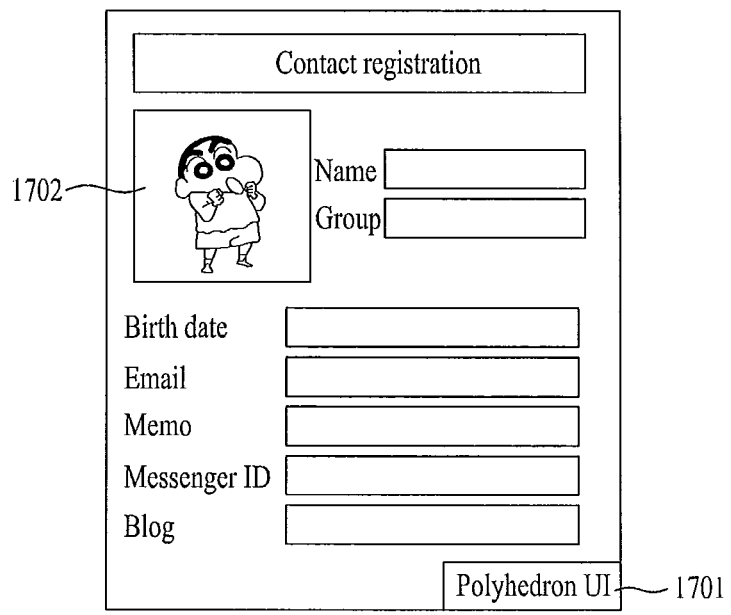

Referring to FIG. 17D, as the first image 1711 is attached as the contact image, the mobile terminal 100 is able to display a contact registration picture in which the first image 1711 is displayed in the contact image region 1702.

Of course, the embodiment shown in FIGS. 17A to 17D is applicable to such an application requiring a data attachment (or input) as an email writing, a message writing, a conversation through messenger and the like as well as the phonebook.

FIGS. 18 to 21B are diagrams for screen configuration of attaching corresponding data to each message field using a 3D polyhedron in the course of message writing execution according to the present invention. For clarity and convenience of the following description, the first application is limited to the message writing.

Figure 18:
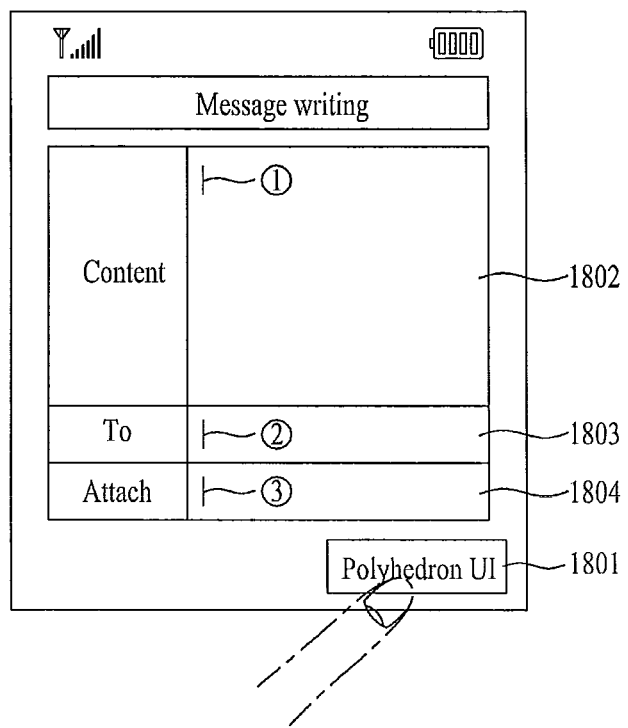
FIGS. 18 is diagrams for screen configuration of attaching corresponding data to each message field using a 3D polyhedron in the course of message writing execution according to the present invention.

Referring to FIG. 18, as the message writing is executed, the mobile terminal 100 displays a message writing window as an execution picture of the message writing and is then able to display a key region 1801 for receiving an input of a display command signal of a 3D polyhedron having facets, on which data attachable to the message writing are displayed, respectively, on a prescribed region off the message writing window.

For instance, the message writing window can include various data input fields including a content input field, a correspondent party's contact input field, an attachment file input field and the like.

Figure 19A:
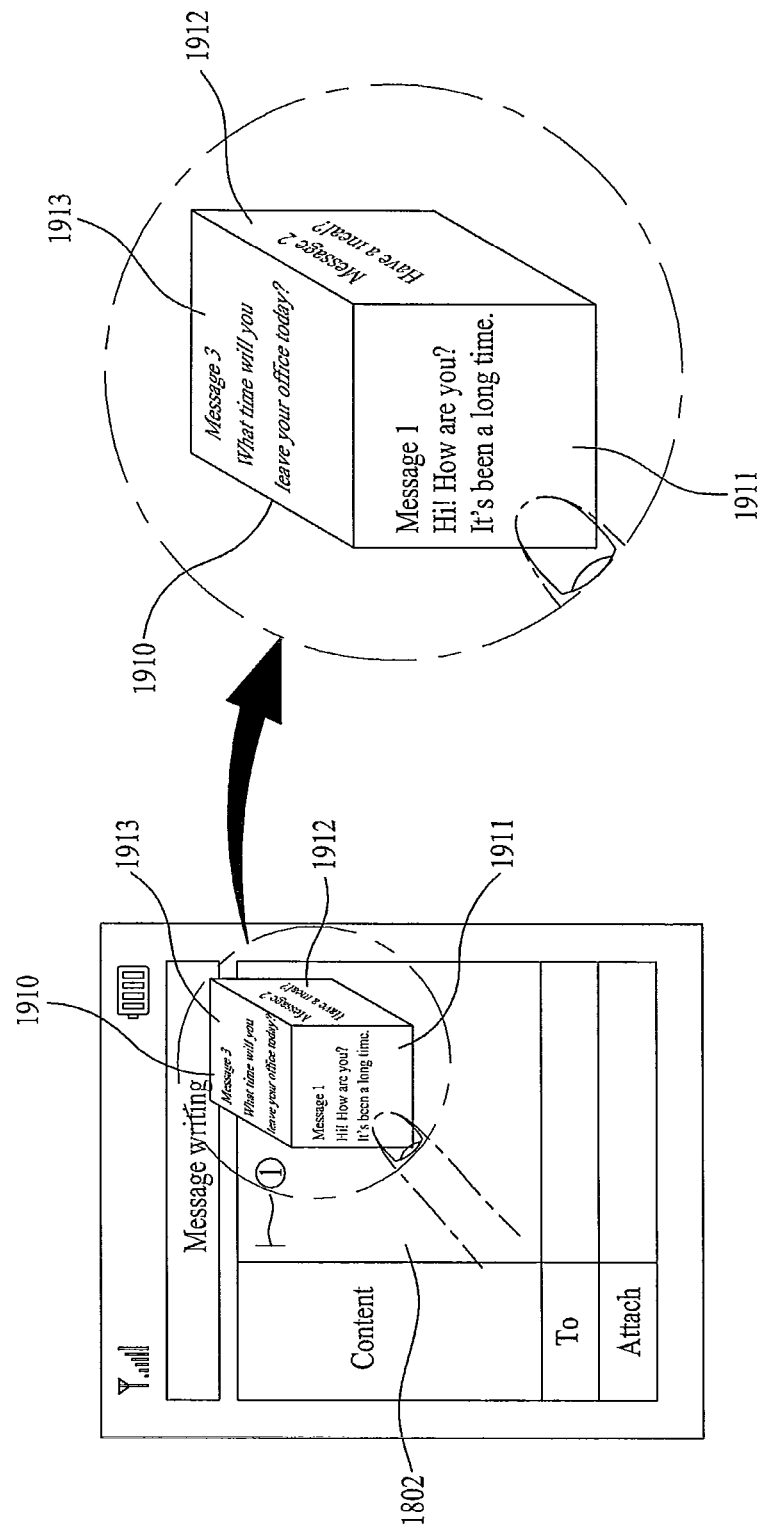
FIGS. 19A to 19B are diagrams for screen configuration of attaching corresponding data to each message field using a 3D polyhedron in the course of message writing execution according to the present invention.
Figure 19B:
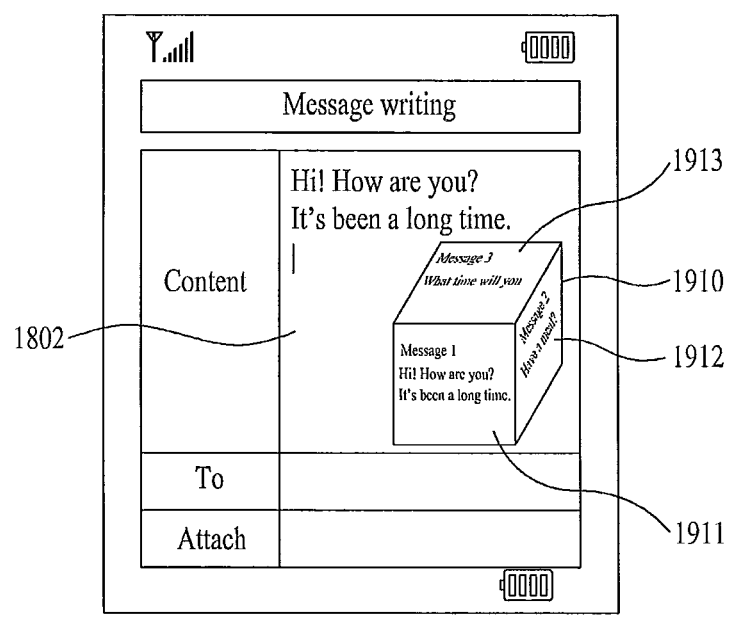

Referring to FIG. 19A, if an input indicator (e.g., a cursor) is located at the content input field 1802 [①], the mobile terminal 100 is able to display a 3D polyhedron 1910 having at least one message content displayed on its facet. In this case, the message content can include a message content previously set by the terminal or user.

If the first message content 1911 displayed on the first facet is selected in FIG. 19A, the mobile terminal 100 attaches the selected first message content 1911 to the content input field 1802 and is then able to display the first message content 199 in the content input field 1802 [S19B].

Figure 20A:
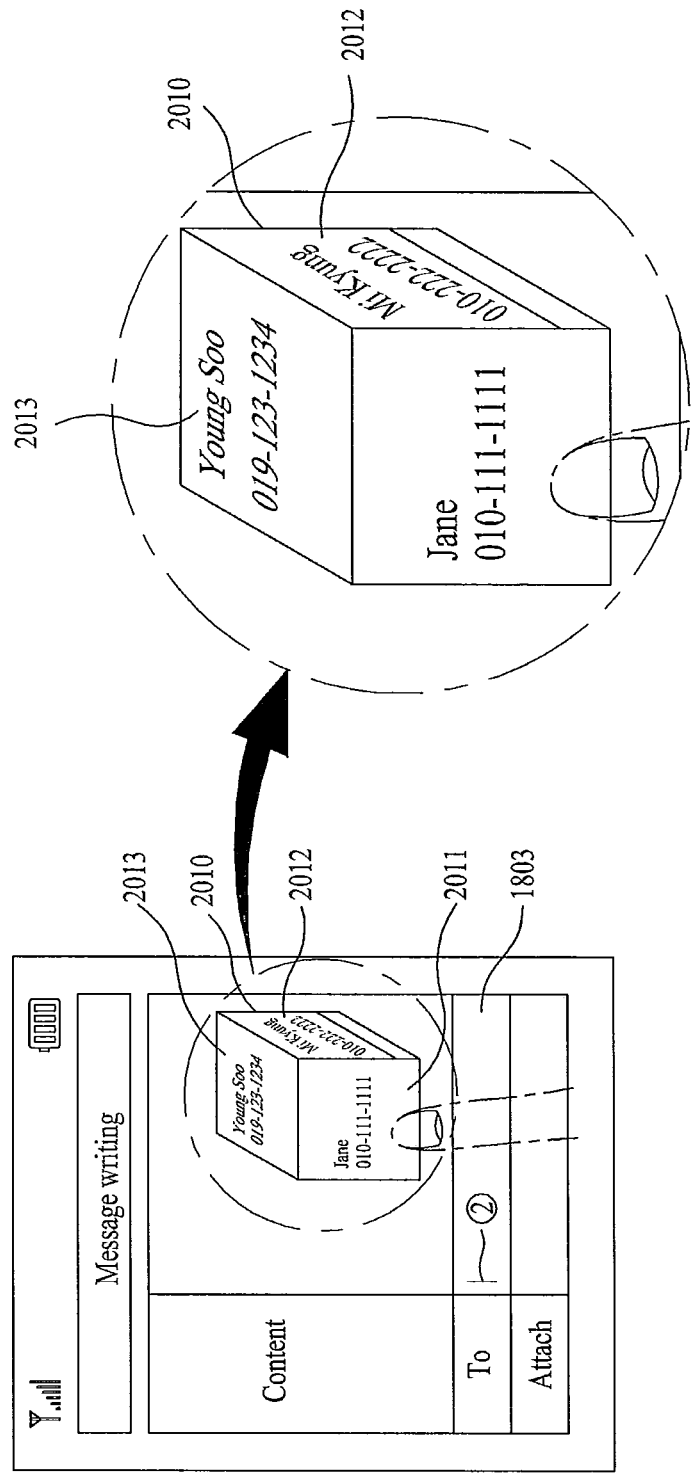
FIGS. 20A to 20B are diagrams for screen configuration of attaching corresponding data to each message field using a 3D polyhedron in the course of message writing execution according to the present invention.
Figure 20B:
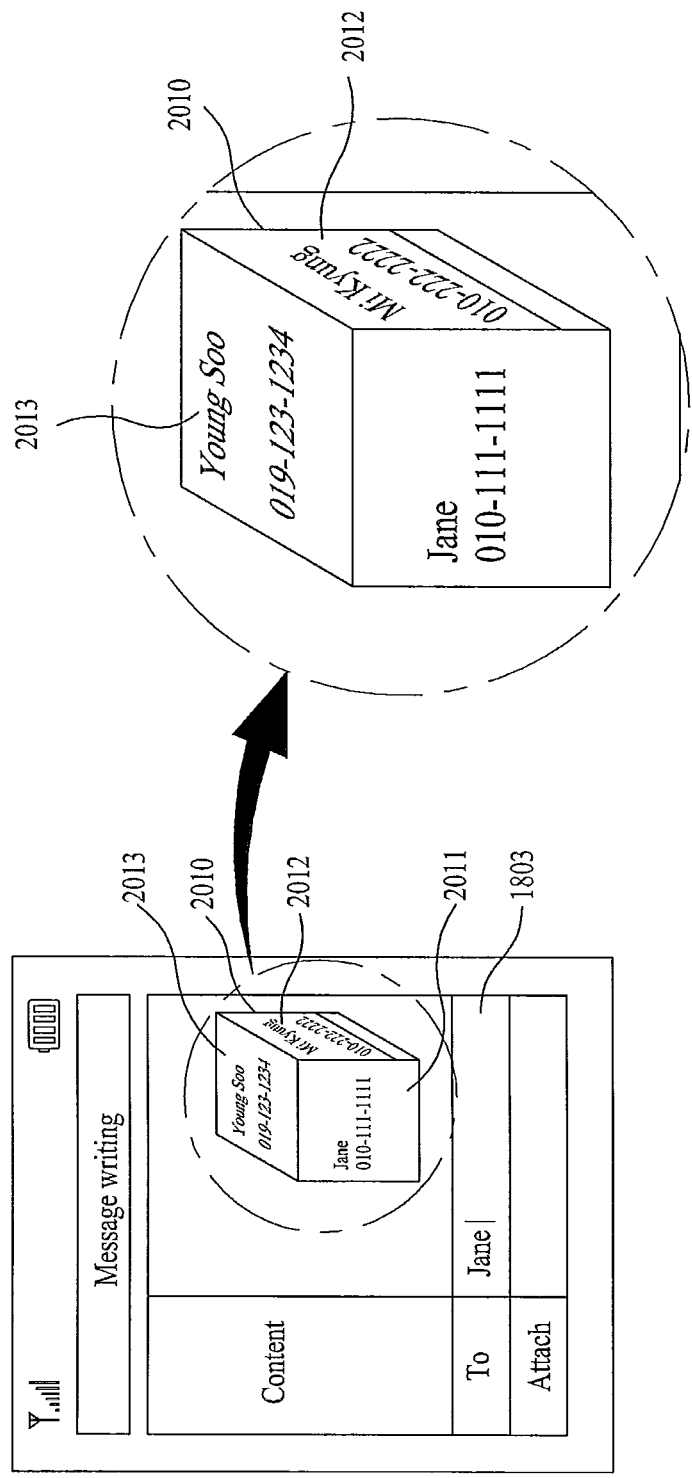

If the first correspondent party contact 2011 displayed on the first facet is selected in FIG. 20A, the mobile terminal 100 attaches the selected first correspondent party contact 2011 to the correspondent party contact input field 1803 and is then able to display the first correspondent party contact 2011 in the correspondent party contact input field 1803 [FIG. 20B].

Figure 21A:
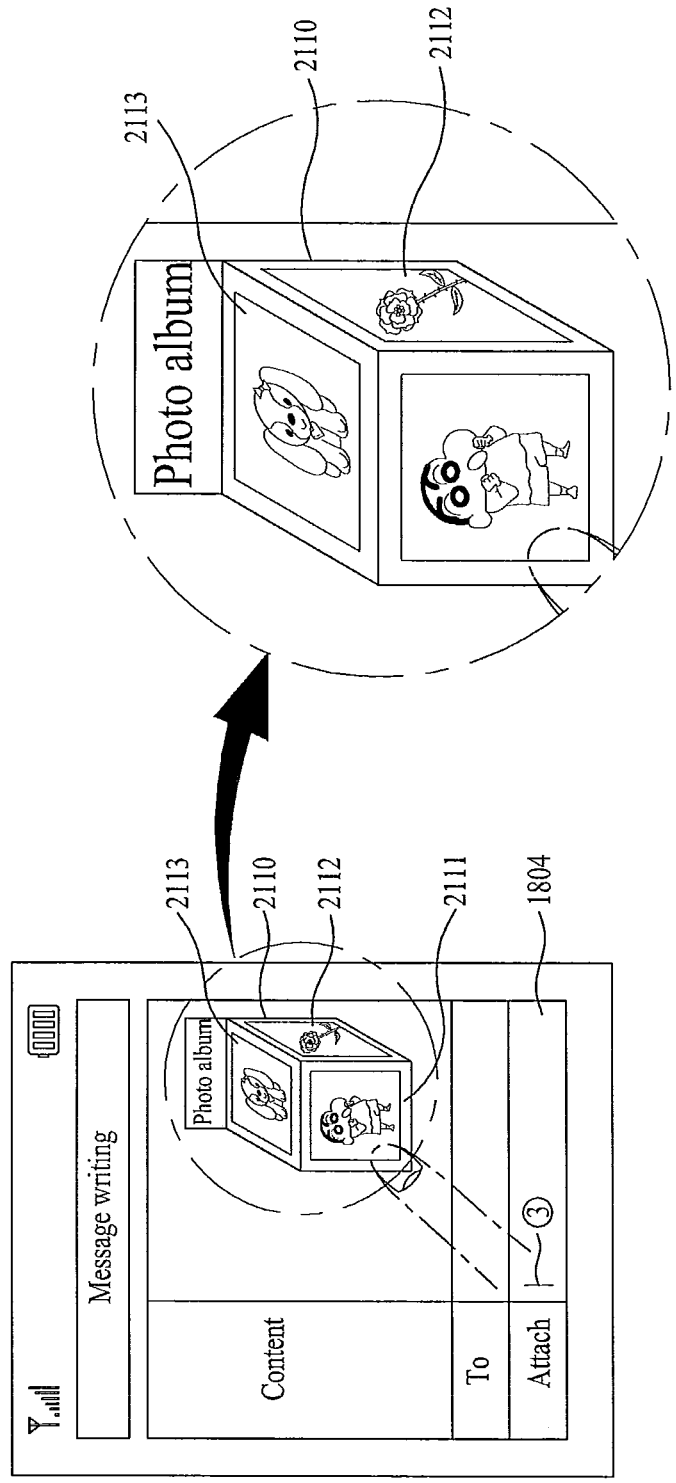
FIGS. 21A to 21B are diagrams for screen configuration of attaching corresponding data to each message field using a 3D polyhedron in the course of message writing execution according to the present invention.
Figure 21B:
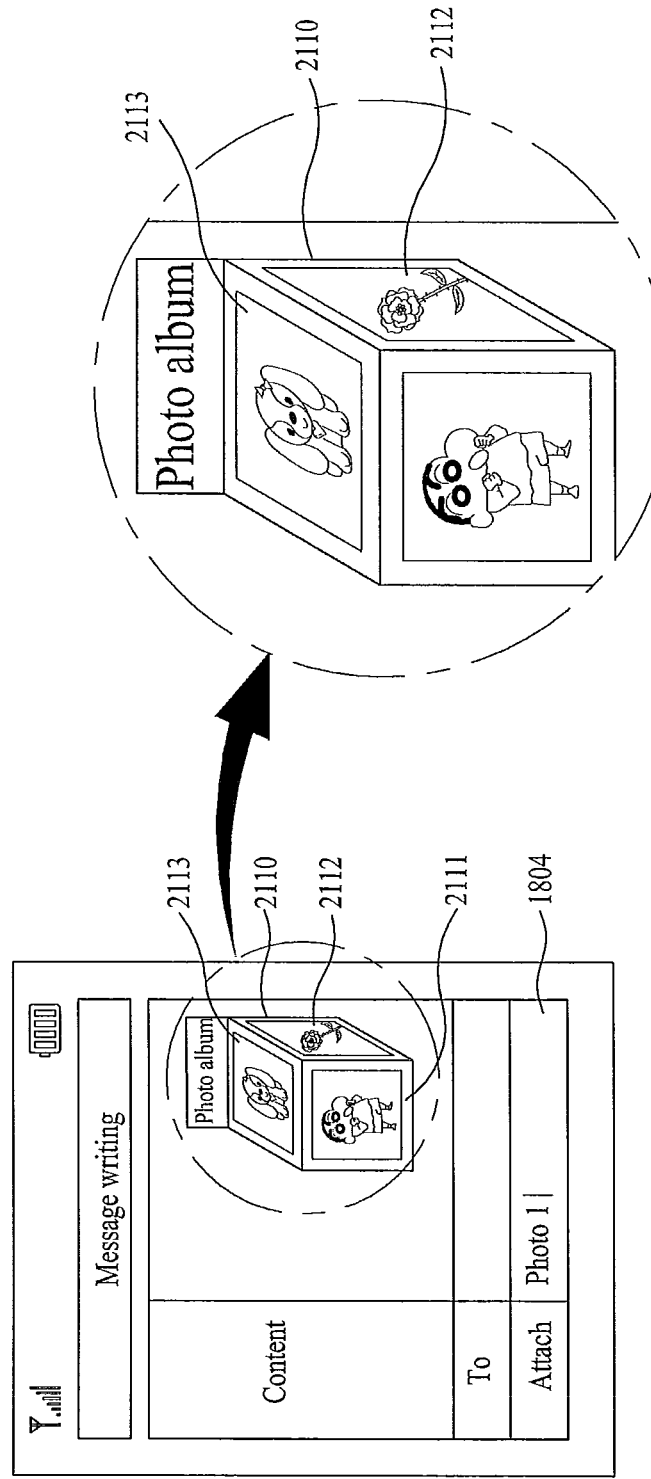

Referring to FIG. 21A, if the input indicator (e.g., cursor) is located at the attachment filed input field 1804 [③], the mobile terminal 100 is able to display a 3D polyhedron 2110 having facets on which at least one or more attachable files (or data) are displayed, respectively.

If the first file 2111 displayed on the first facet is selected in FIG. 21A, the mobile terminal 100 attaches the selected first file 2111 to an attachment file input field 1804 and is able to display identification information (e.g., name) of the first file 2111 in the attachment file input field 1804 [S21B].

In the following description, explained is a case ③ that the data type is the data attachable to the first application.

First of all, while displaying the data attachable to the first application on the facets of the 3D polyhedron, respectively, the mobile terminal 100 receives an input of a selection signal of specific data displayed on a specific facet of the facets from a user [S1170].

In case of receiving the selection signal of the specific data, the mobile terminal 100 displays the specific data as an execution picture of the first application under the control of the controller 180 [S1180].

In the displaying step S1180, the mobile terminal 100 is able to display at least one data except the specific data selected by the selection signal among the data attached to the first application on each of the facets of the 3D polyhedron.

Regarding the displaying step S1180, the following description is made in detail with reference to the accompanying drawings.

Figure 22A:
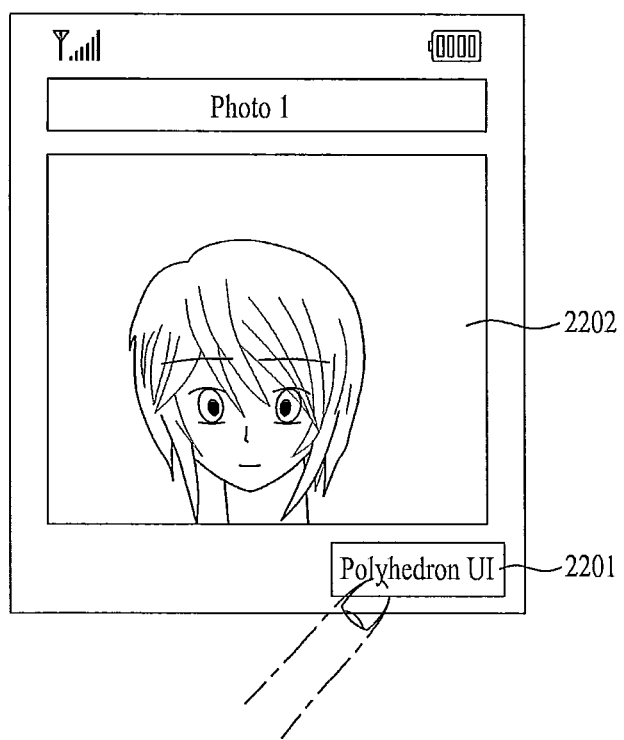
FIGS. 22A to 22C are diagrams for screen configuration of displaying data attached to a photo album using a 3D polyhedron in the course of photo album execution according to the present invention.
Figure 22B:
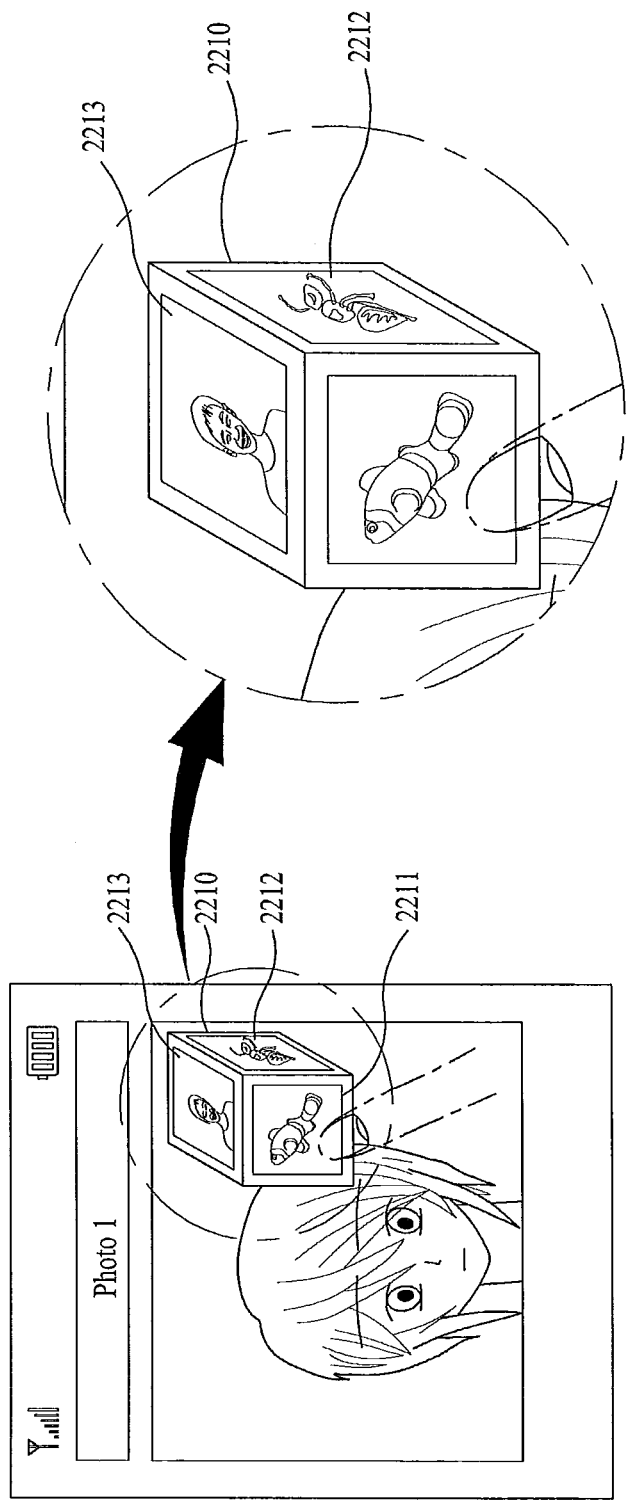
Figure 22C:
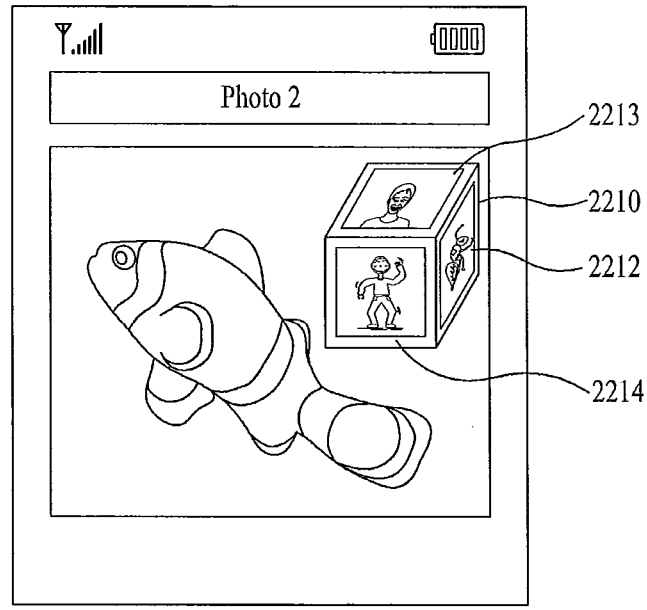

FIGS. 22A to 22C are diagrams for screen configuration of displaying data attached to a photo album using a 3D polyhedron in the course of photo album execution according to the present invention. For clarity and convenience of the following description, a first application is limited to a photo album.

First of all, as the photo album is executed, the mobile terminal 100 displays a first photo as an execution picture of the photo album and is able to display a key region 2201 for receiving an input of a display command signal of a photo album polyhedron on a prescribed region of the screen [FIG. 22A].

In this case, the photo album polyhedron can means a 3D polyhedron including facets on which photos attached to the photo album are displayed, respectively.

If the key region 2201 is activated by a user selecting action in FIG. 22A, the mobile terminal 100 displays the photo album polyhedron 2210 [FIG. 22B]. If a selection signal of a second photo 2211 displayed on the first facet of the photo album polyhedron 2210 is received, the mobile terminal 100 is able to display the second photo 2211 as an execution picture of the photo album [FIG. 22C].

Figure 23A:
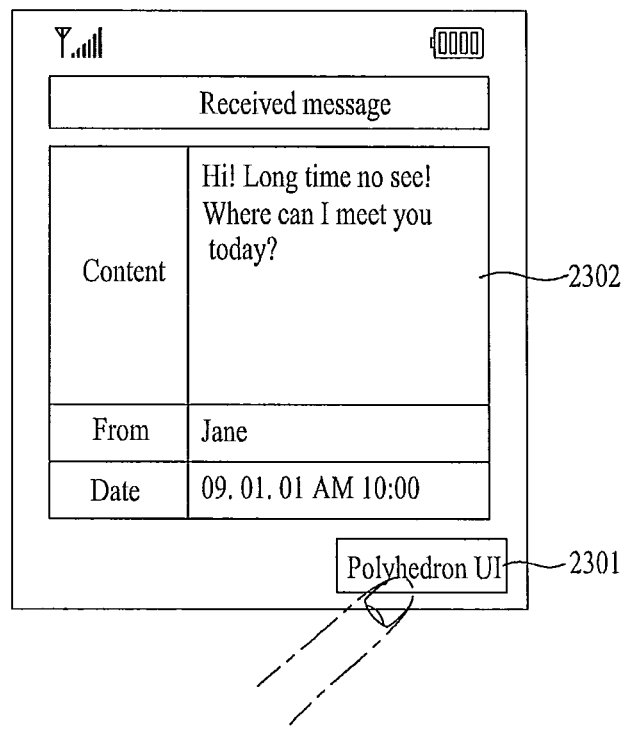
Figure 23C:
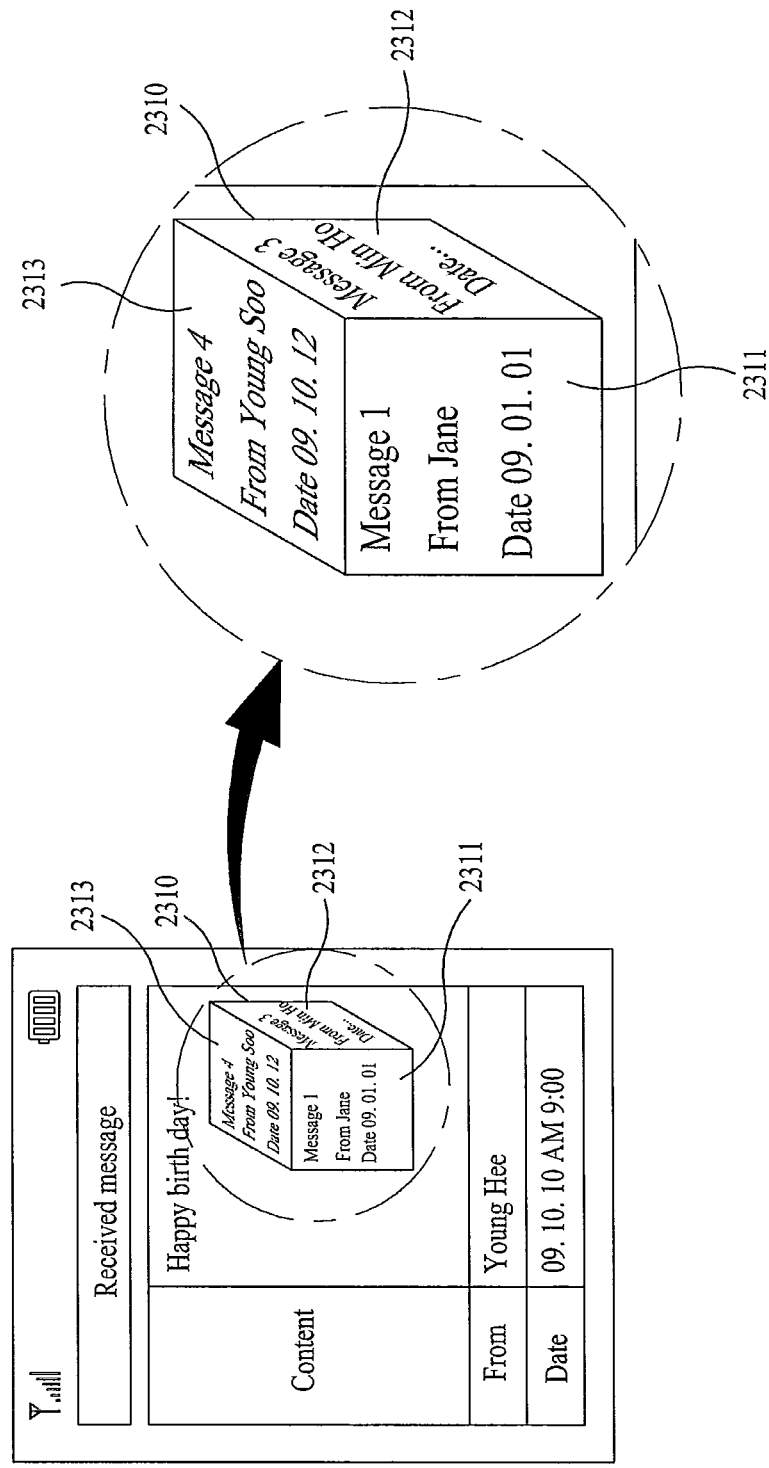

FIGS. 23A to 23C are diagrams for screen configuration of checking a received message using a 3D polyhedron in the course of received message check execution according to the present invention. For clarity and convenience of the following description, the first application is limited to a received message check.

First of all, as the received message check is executed, the mobile terminal 100 displays a first received message as an execution picture of the received message check and is able to display a key region 2301 for receiving an input of a display command signal of a received message polyhedron on a prescribed region of the screen [FIG. 23A].

In this case, the received message polyhedron can means a 3D polyhedron including facets on which received messages are displayed, respectively.

If the key region 2301 is activated by a user selecting action in FIG. 23A, the mobile terminal 100 displays the received message polyhedron 2310 [FIG. 23B]. If a selection signal of a second received message 2311 displayed on the first facet of the received message polyhedron 2310 is received, the mobile terminal 100 is able to display the second received message 2311 as an execution picture of the received message check [FIG. 23C].

In the following description, a method of controlling applications in a mobile terminal according to a third embodiment of the present invention is explained in detail with reference to the accompanying drawings.

Figure 24:
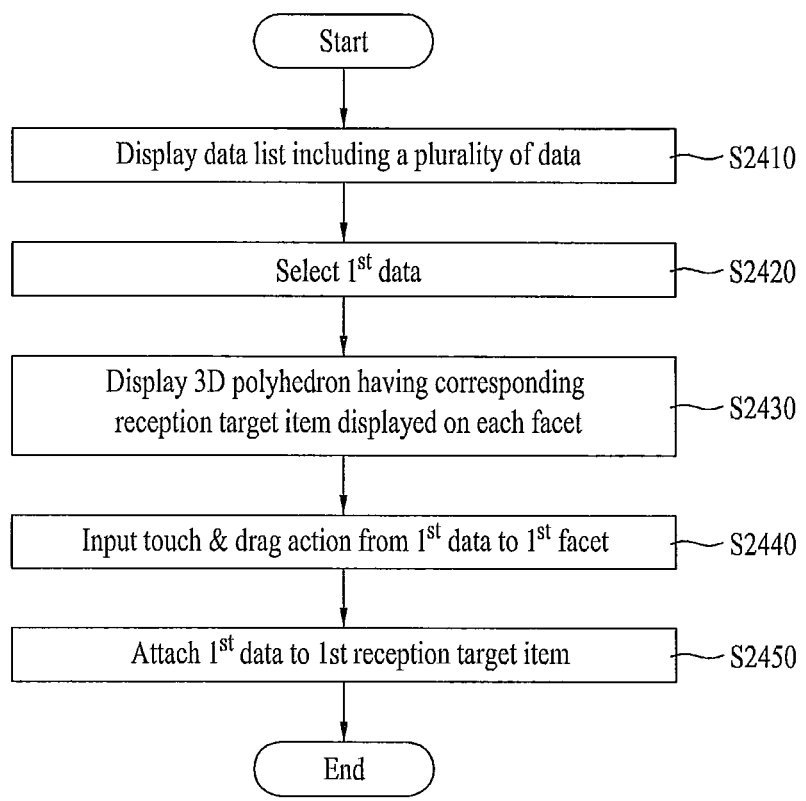
FIG. 24 is a third flowchart of a method of controlling applications in a mobile terminal according to one embodiment of the present invention.

FIG. 24 is a third flowchart of a method of controlling applications in a mobile terminal according to one embodiment of the present invention.

Referring to FIG. 24, the mobile terminal 100 displays a data list including a plurality of data [S2410] and then receives an input of a selection of a first data in the displayed data list from a user [S2420].

The mobile terminal 100 displays a 3D polyhedron having facet, on which at least one or more reception target items for the selected first data are displayed, via the display unit 151 under the control of the controller 180 [S2430].

In this case, at least one of types including correspondent party information, website information, blog information and application information can be designated to the reception target items.

For instance, the reception target item, of which type is the correspondent party information, can be represented as a correspondent party name, a correspondent party phone number, a correspondent party email, a correspondent party messenger address or the like of the correspondent party of which contact is registered with a phonebook. The reception target item, of which type is the website information, can be represented as a website address, a website representative image or the like. The reception target item, of which type is the blog information, can be represented as a blog address, a blog representative image or the like. The application reception target item, of which type is the application information, can be represented as application identification information (e.g., icon, name, etc.) or the like.

Moreover, the mobile terminal 100 is able to display a 3D polyhedron per type of the reception target item displayed on the corresponding facet. For instance, the mobile terminal 100 is able to respectively display a 3D polyhedron (hereinafter named a correspondent party polyhedron) corresponding to the correspondent party information, a 3D polyhedron (hereinafter named a web polyhedron) corresponding to the website information, a 3D polyhedron (hereinafter named a blog polyhedron) corresponding to the blog information and a 3D polyhedron (hereinafter named an application polyhedron) corresponding to the application information.

Figure 25A:
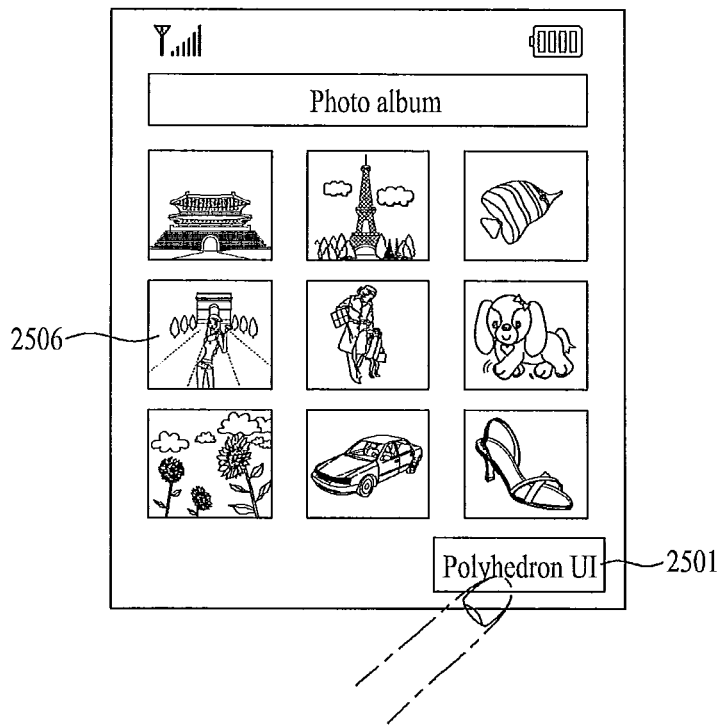
Figure 25B:
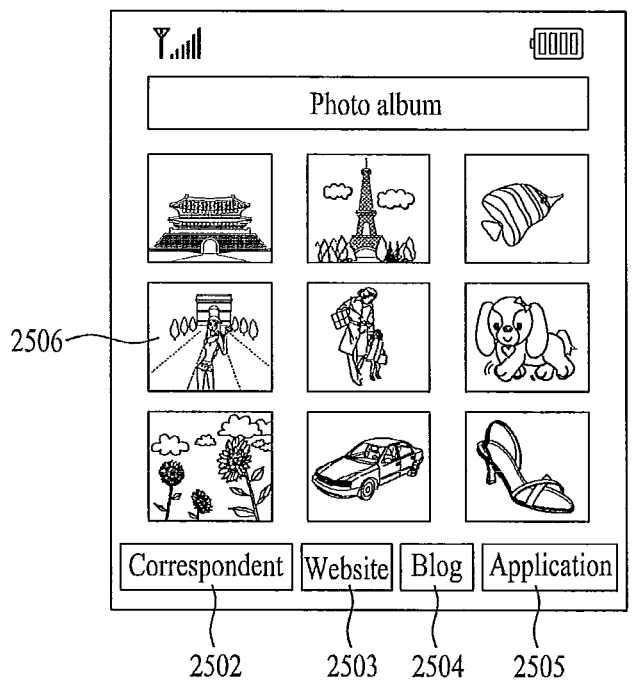

Regarding the displaying step S2430, the following description is made in detail with reference to FIGS. 25A to 25C. For clarity and convenience of the following description, a data list is limited to an image list.

Referring to FIG. 25A, while displaying an image list as a thumbnail, the mobile terminal 100 is able to display a key region 2501 for receiving an input of a display command signal of a 3D polyhedron including facets on which reception target items are displayed, respectively, on a prescribed region of the screen.

If the key region 2501 is activated by a user selecting action, the mobile terminal 100 displays type indicators 2502 to 2505 per reception target item on a prescribed region of the screen [FIG. 25B] or can display a 3D polyhedron 2510 having facets on which the types per reception target item are displayed, respectively [FIG. 25C].

Therefore, if a specific type indicator or a specific facet of the 3D polyhedron 2510 is selected, the mobile terminal 100 displays the 3D polyhedron (e.g., the correspondent party polyhedron) of the specific type or can display the 3D polyhedron of the specific type displayed on the specific facet.

Referring now to FIG. 24, the mobile terminal 100 receives an input of a touch & drag action from the selected first data to the first facet of the 3D polyhedron [S2440].

In this case, the touch & rag action can include an example of an action for commanding for attaching the first data as the reception target item corresponding to the first facet. The attachment to the reception target item can include a transmission to the reception target item (in case of the correspondent party information), an upload to the reception target item (in case of the website information or the blog information) or a storage into the reception target item (in case of the application information).

In case of receiving an input the touch & drag action to the first facet from the selected first data, under the control of the controller 180, the mobile terminal 100 attaches the selected first data to the reception target item corresponding to the first facet [S2450].

Regarding the attaching step S2450, the following description is made in detail with reference to the accompanying drawings. For clarity and convenience of the following description, assume that the 3D polyhedron displayed in the displaying step S2430 is a 3D polyhedron of a specific type.

Figure 26A:
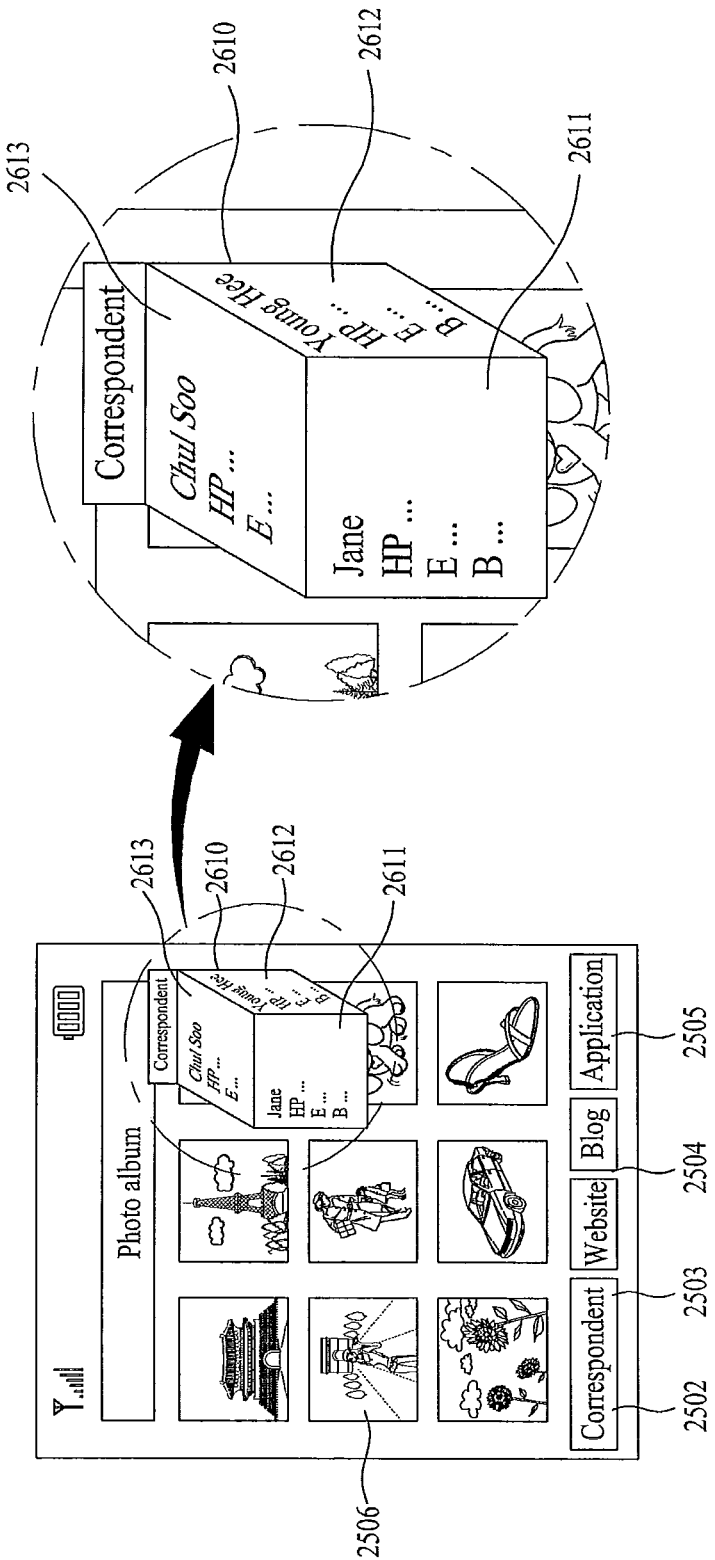
Figure 26C:
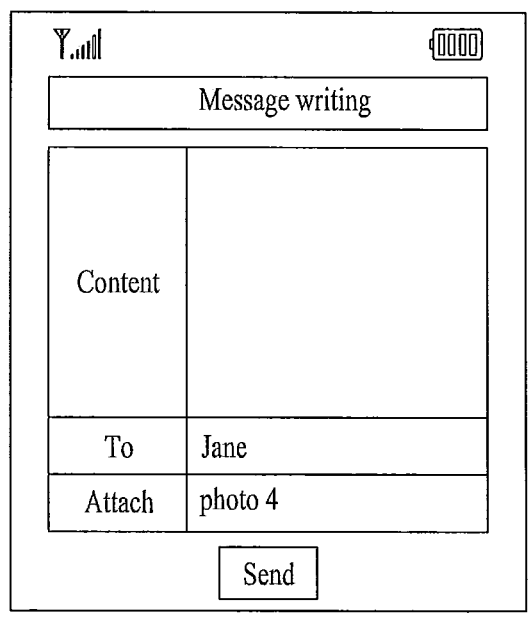

FIGS. 26A to 26C are diagrams for screen configuration of transmitting specific data to a specific correspondent party using a correspondent party polyhedron according to the present invention.

Referring to FIG. 26A, in case that the first facet 2511 having the correspondent party information (first type) displayed thereon is selected in FIG. 25C, the mobile terminal 100 keeps displaying the image list and is also able to display a correspondent party polyhedron 2610 having facets, on which the correspondent party information is displayed, on a prescribed region of the screen.

Referring to FIG. 26B, in case of receiving an input of a touch & drag action to the first facet of the correspondent party polyhedron 2610 from the fourth photo in the image list shown in FIG. 26A [a], the mobile terminal 100 is able to display a transmission type list 2620 [b].

Referring to FIG. 26C, the mobile terminal 100 is able to transmit the fourth photo to the correspondent party corresponding to the correspondent party contact information displayed on the first facet by the transmission type selected from the transmission type list.

For instance, if a message is selected from the transmission type list shown in FIG. 26B (b), it is able to display a message writing window in which the correspondent party contact information displayed on the first facet is designated to a correspondent party contact place to receive the message.

Optionally, if a message is selected from the transmission type list shown in FIG. 26B (b), the mobile terminal 100 is able to directly transmit the fourth photo to the correspondent party corresponding to the correspondent party contact information displayed on the first facet (via MMS) [not shown in the drawing].

Figure 27A:
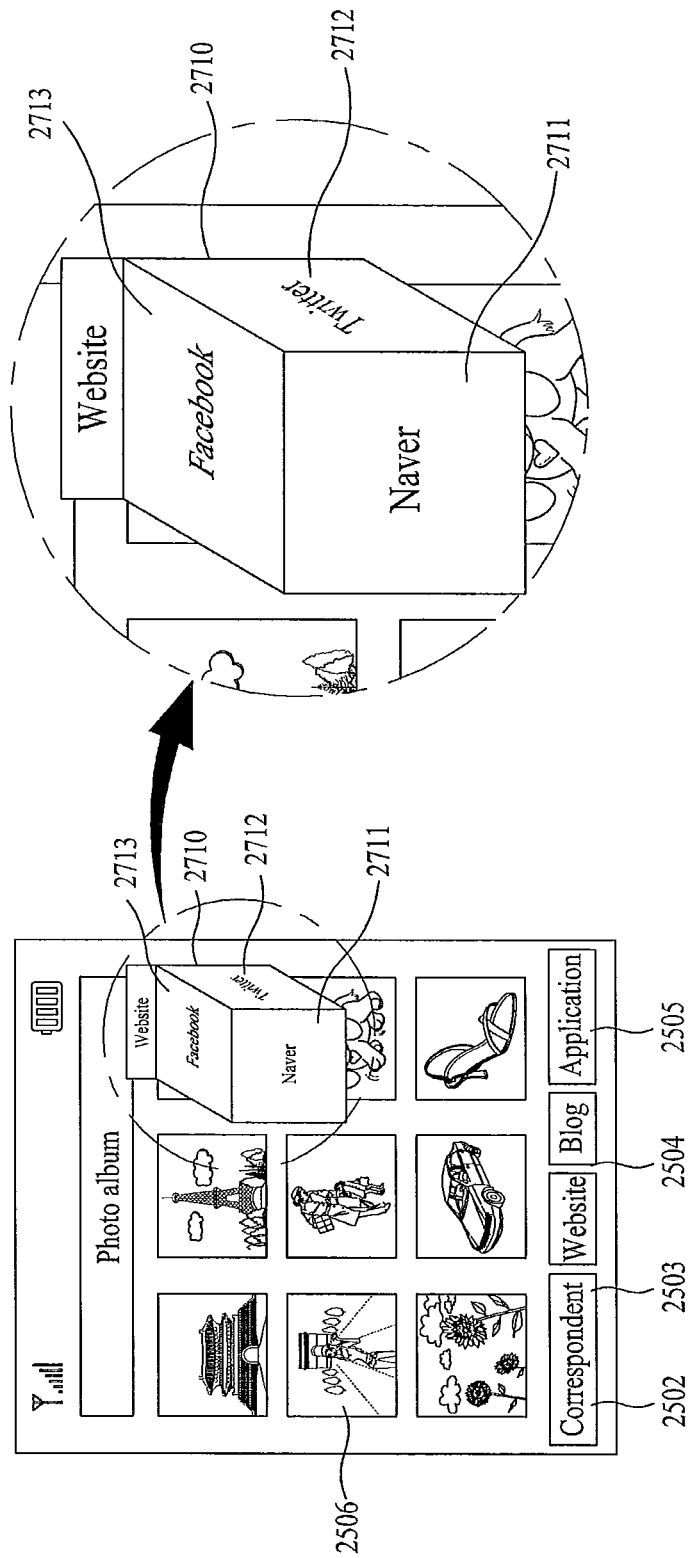
FIGS. 27A to 27C are diagrams for screen configuration of uploading specific data to a specific website using a 3D polyhedron displaying website information on each facet, in case that a reception target item is a website, according to the present invention.
Figure 27B:
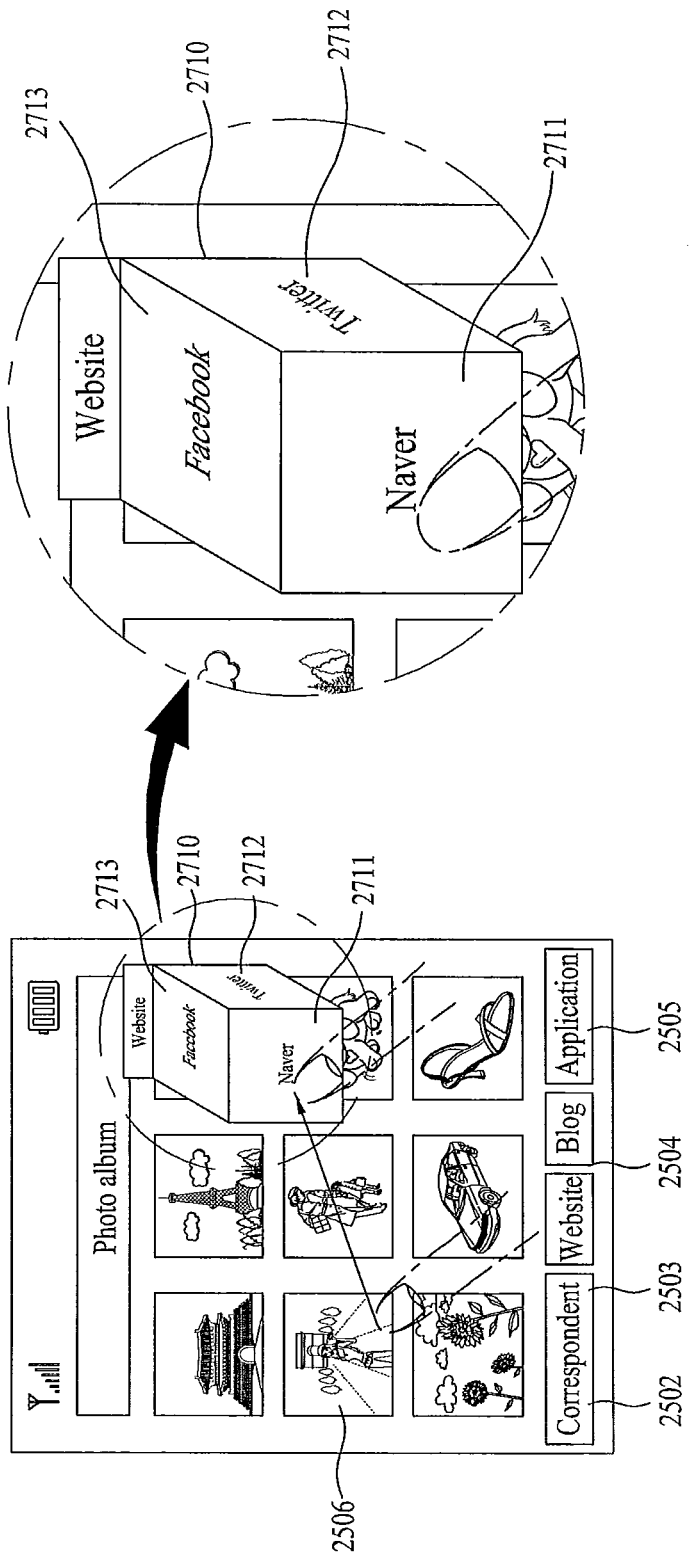
Figure 27C:
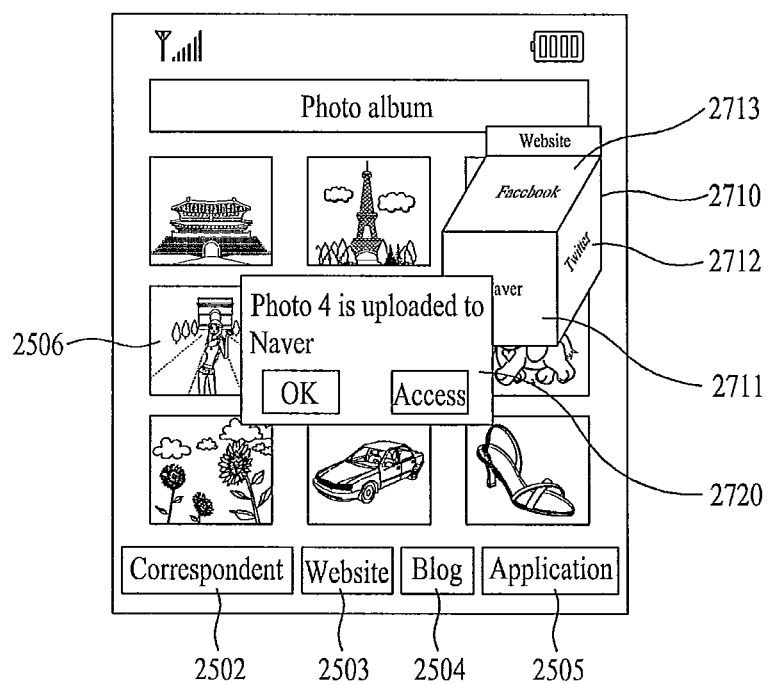

FIGS. 27A to 27C are diagrams for screen configuration of uploading specific data to a specific website using a website polyhedron according to the present invention.

Referring to FIG. 27A, if the third facet 2513 having the website information (second type) displayed thereon is selected in FIG. 25C, the mobile terminal 100 keeps displaying the image list and is also able to display a website polyhedron 2710 having facets, on which the website identification information (e.g., address, name, representative image, etc.) is displayed, on a prescribed region of the screen.

In case of receiving an input of a touch & drag action to the first facet of the website polyhedron 2710 from the fourth photo in the image list shown in FIG. 27A [FIG. 27B], the mobile terminal 100 is able to upload the fourth photo to a website corresponding to the website identification information displayed on the first facet using the wireless communication unit 110 [FIG. 27C].

If 'O.K.' is selected from an upload indication window 2720 shown in FIG. 27C, the mobile terminal 100 stops displaying the upload indication window 2720. If 'access' is selected from the upload indication window 2720 shown in FIG. 27C, the mobile terminal 100 is able to access the website to which the fourth photo has been uploaded.

Figure 28A:
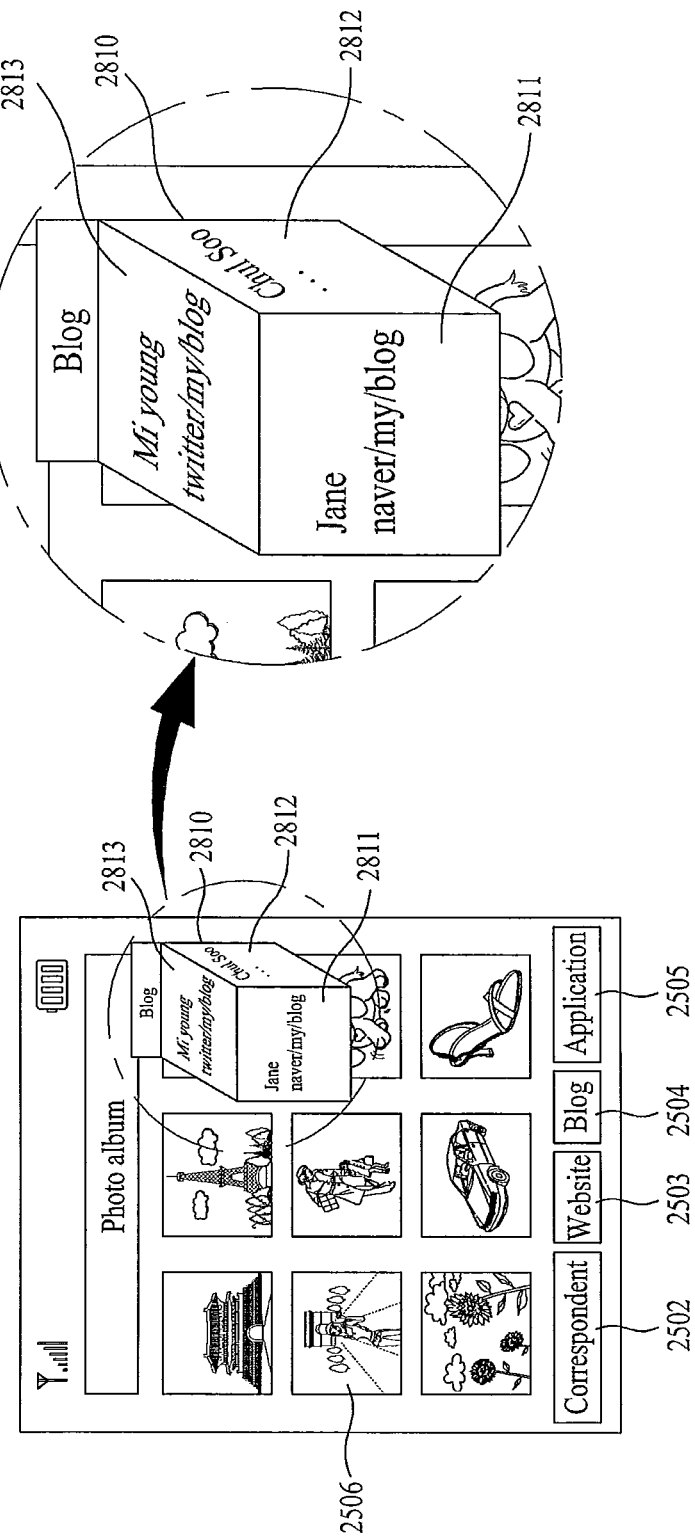
FIGS. 28A to 28C are diagrams for screen configuration of uploading specific data to a specific blog using a 3D polyhedron displaying blog information on each facet, in case that a reception target item is a blog, according to the present invention.
Figure 28B:
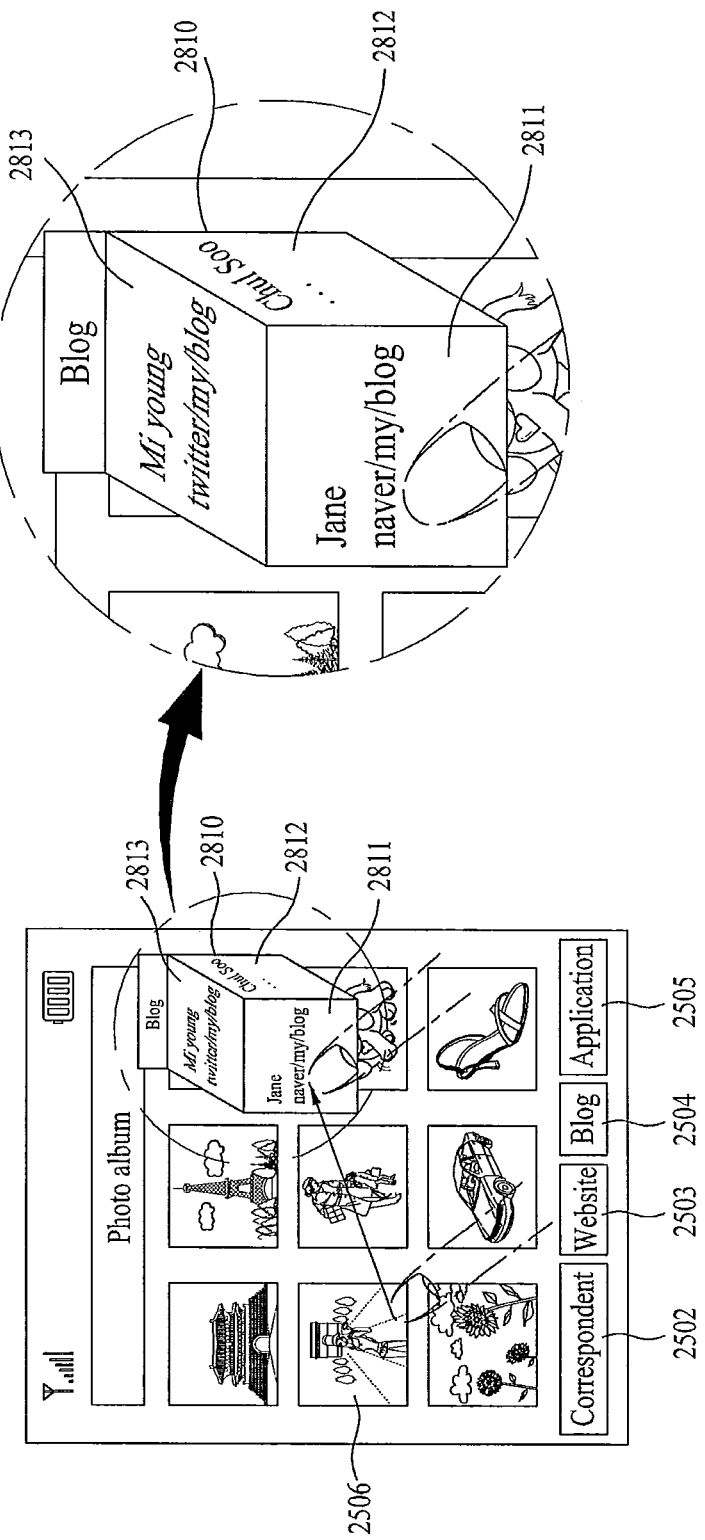
Figure 28C:
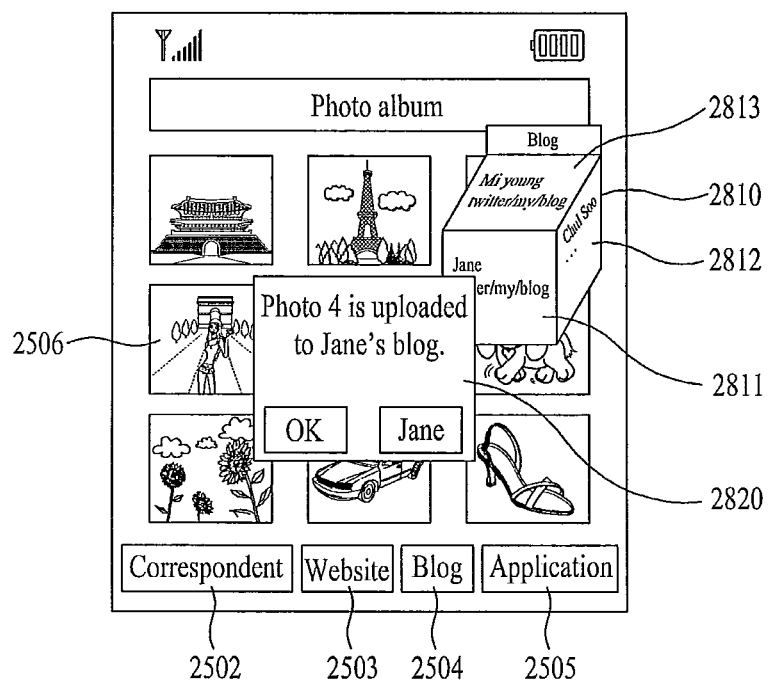

FIGS. 28A to 28C are diagrams for screen configuration of uploading specific data to a specific blog using a blog polyhedron according to the present invention.

Referring to FIG. 28A, if the second facet 2512 having the blog information (third type) displayed thereon is selected in FIG. 25C, the mobile terminal 100 keeps displaying the image list and is also able to display a blog polyhedron 2810 having facets, on which the blog information (e.g., blog user, name, representative image, etc.) is displayed, on a prescribed region of the screen.

In case of receiving an input of a touch & drag action to the first facet of the blog polyhedron 2810 from the fourth photo in the image list shown in FIG. 28A [FIG. 28B], the mobile terminal 100 is able to upload the fourth photo to a w blog corresponding to the blog identification information displayed on the first facet using the wireless communication unit 110 [FIG. 28C].

If 'O.K.' is selected from an upload indication window 2820 shown in FIG. 28C, the mobile terminal 100 stops displaying the upload indication window 2820. If 'access' is selected from the upload indication window 2720 shown in FIG. 27C, the mobile terminal 100 is able to access the blog to which the fourth photo has been uploaded.

Figure 29A:
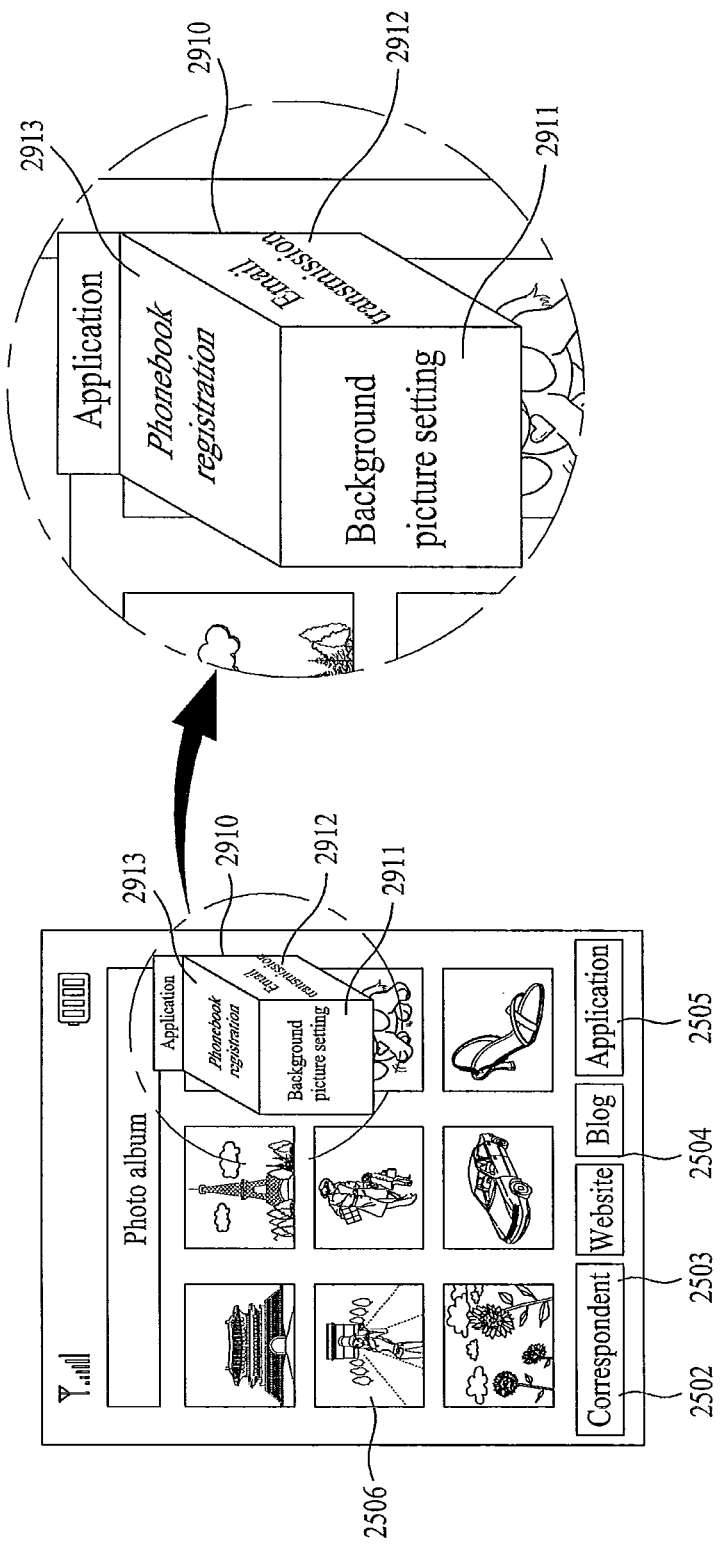
FIGS. 29A to 29C are diagrams for screen configuration of attaching specific data to a specific application using a 3D polyhedron displaying application information on each facet, in case that a reception target item is an application, according to the present invention.
Figure 29B:
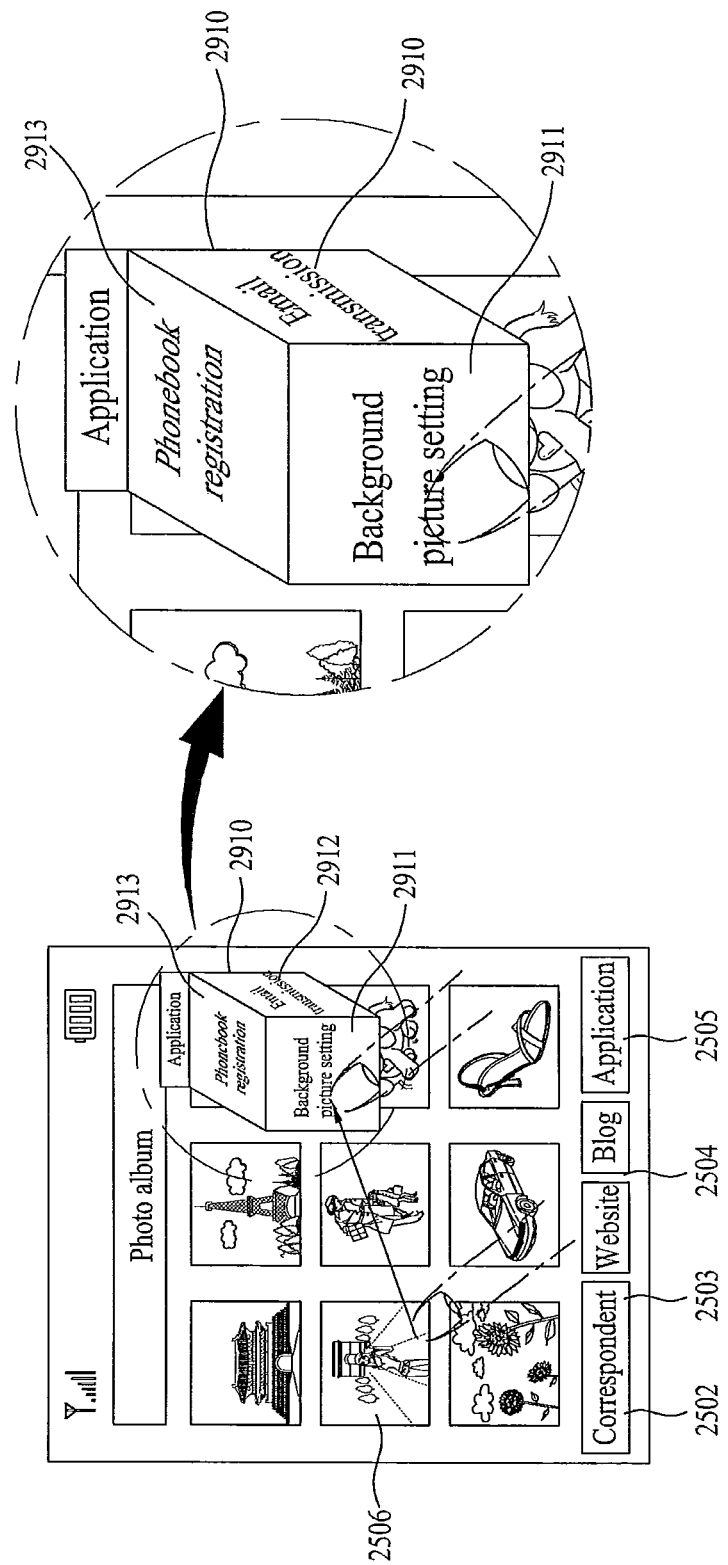
Figure 29C:
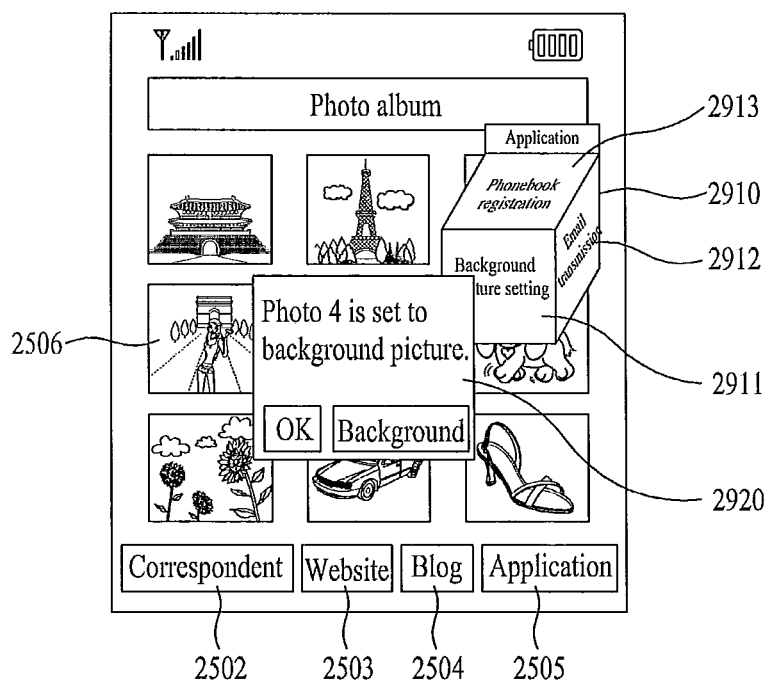

FIGS. 29A to 29C are diagrams for screen configuration of attaching specific data to a specific application using an application polyhedron according to the present invention.

Referring to FIG. 29A, as the 3D polyhedron 2510 shown in FIG. 25C is rotated, if the fourth facet (not shown in the drawing) having the application information (fourth type) displayed thereon is selected, the mobile terminal keeps displaying the image list and is also able to display an application polyhedron 2910, on which the application identification information (e.g., name, icon, etc.) is displayed, on a prescribed region of the screen.

In case that a touch & drag to the first facet, on which a background picture setting is displayed in the application polyhedron 2901, from the fourth photo in the image list shown in FIG. 29A is inputted [FIG. 29B], the mobile 100 sets the fourth photo to a background picture or is able to have the fourth photo included in the image list settable to the background image [FIG. 29C]. Namely, the mobile terminal 100 is able to attach the fourth photo to the background picture setting (i.e., an example of the application).

If 'OK' is selected from a background picture setting indication window 2920 shown in FIG. 29C, the mobile terminal 100 stops displaying the background picture setting indication window 2920. If 'background picture' is selected from the background picture setting indication window 2920, the mobile terminal 100 displays the fourth photo as the background picture or is able to set the fourth photo to the background picture.

Meanwhile, the mobile terminal 100 is able to simultaneously display at least two of the correspondent party polyhedron, the website polyhedron, the blog polyhedron and the application polyhedron, which are mentioned in the foregoing description, together [not shown in the drawing].

Besides, the mobile terminal 100 is able to display the 3D polyhedron including facets on which reception target items are displayed irrespective of the types of the reception target items, respectively.

Figure 30:
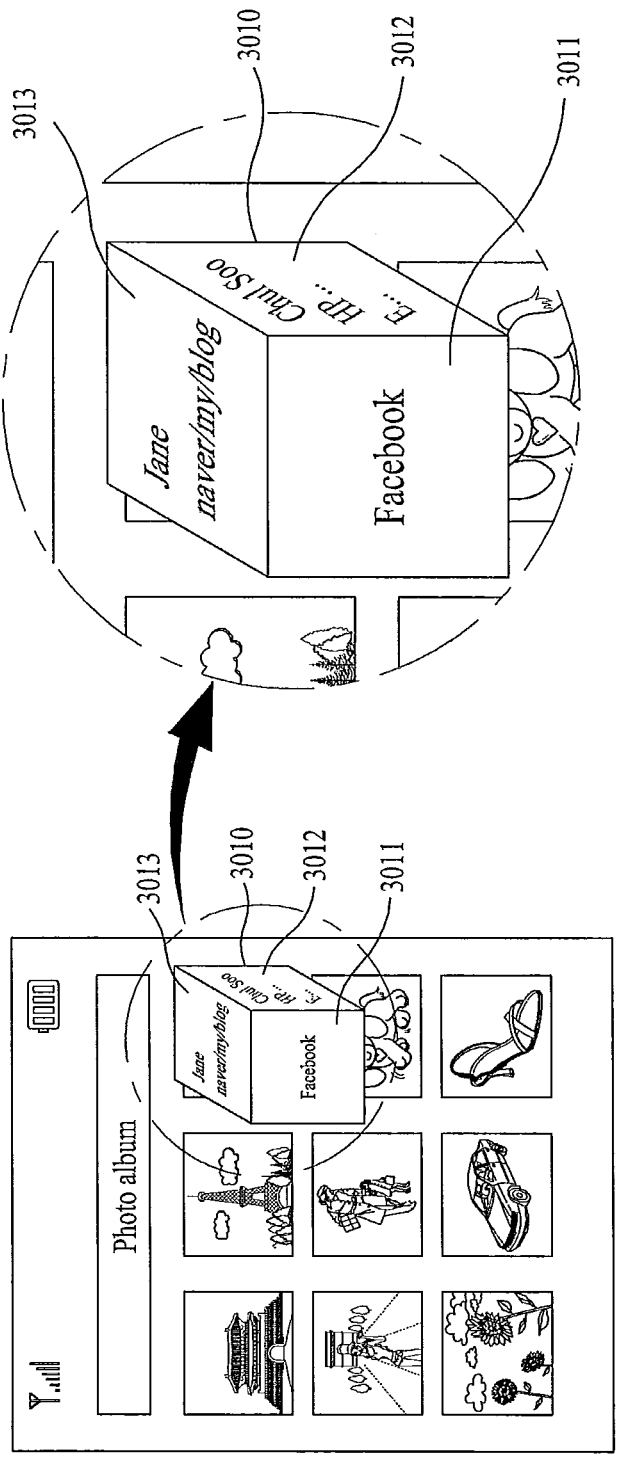
FIG. 30 is a diagram for screen configuration of displaying a 3D polyhedron displaying a reception target item on each facet according to the present invention.

Referring to FIG. 30, if the key region 2502 shown in FIG. 25A is activated, the mobile terminal 100 is able to display a 3D polyhedron 3010 having facets on which correspondent party contact information, website identification information, blog identification information and the like are displayed irrespective of the types of the reception target items, respectively. Moreover, if the number of the reception target items is greater than that of the facets of the 3D polyhedron, the mobile terminal 100 displays a plurality of 3D polyhedrons or is able to display a plurality of the reception target items on one of the facets.

Referring now to FIG. 24, in the displaying step S2430, the mobile terminal 100 displays at least one 3D polyhedron (hereinafter named an individual polyhedron) per reception target item and is then able to display data attached to the corresponding reception target item on each of the facets of the individual polyhedron.

For instance, the reception target items can include a specific correspondent party (e.g., Young Soo, Chul Soo, Jane, etc.), a specific website (e.g., FACEBOOK, TWITTER, etc.), a specific blog (e.g., Young Soo's blog, Jane's blog, etc.), a specific application (e.g., photo album, background setting, etc.) and the like.

In case of receiving an input of a touch & drag action to a prescribed one of the facets of the individual polyhedron from the first data selected in the selecting step S2420 [S2440], the mobile terminal 100 attaches the first data to the corresponding reception target item and is able to display the first data on the prescribed facet, under the control of the controller 180.

In case of receiving an input of a touch & drag action to the data list displayed in the displaying step S2410 from a prescribed one of the facets of the individual polyhedron, the mobile terminal 100 is able to add the data displayed on the prescribed facet to the data list under the control of the controller 180.

In the following description, a process for attaching specific data to a specific reception target item using an individual polyhedron is explained in detail with reference to the accompanying drawings.

Figure 31A:
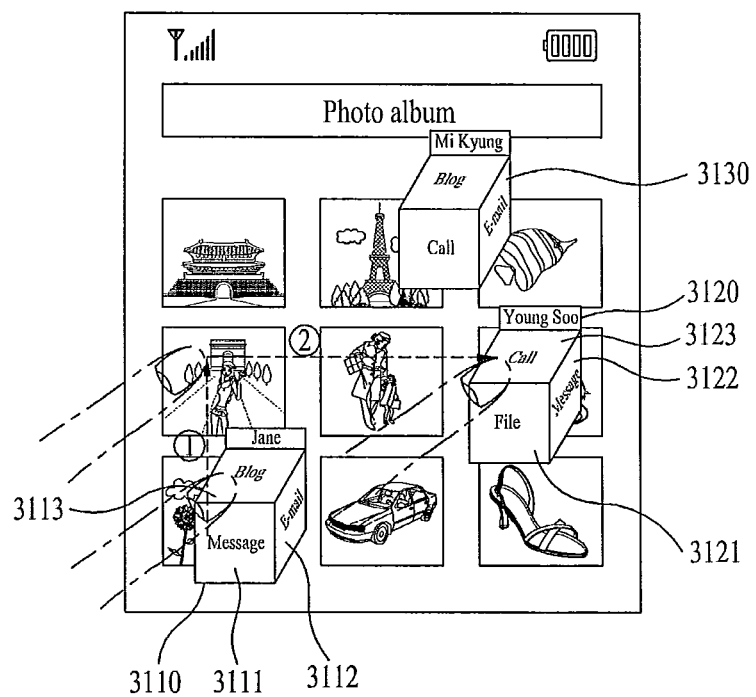
FIGS. 31A to 31C are diagrams for screen configuration of transmitting specific data to a specific correspondent party using a 3D polyhedron displayed per correspondent party, in case that a reception target item is a correspondent party, according to the present invention.
Figure 31B:
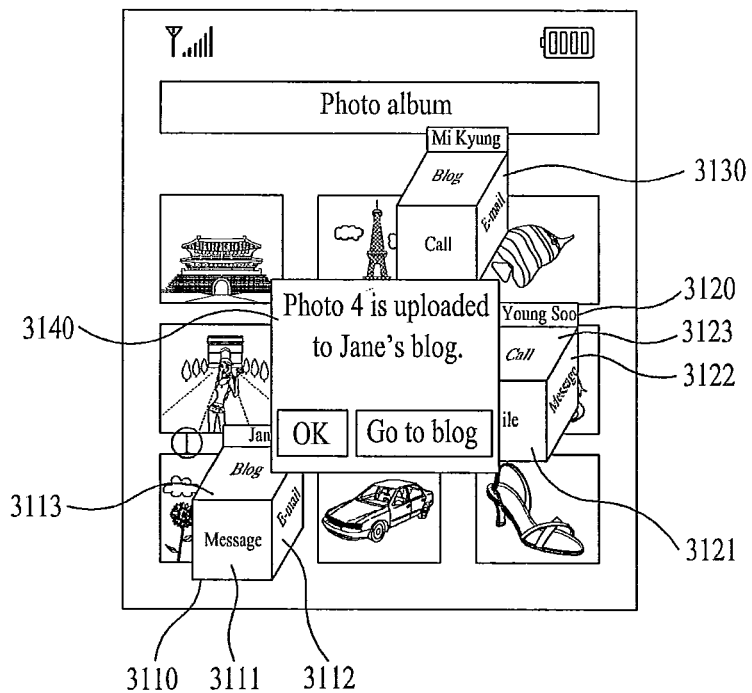
Figure 31C:
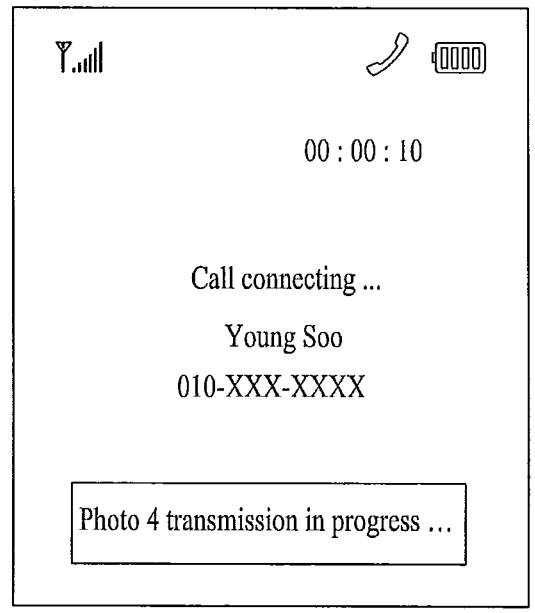

FIGS. 31A to 31C are diagrams for screen configuration of transmitting specific data to a specific correspondent party using an individual polyhedron designated per correspondent party (hereinafter named an individual correspondent party polyhedron), in case that a reception target item is a correspondent party, according to the present invention.

Referring to FIG. 31A, while displaying an image list, the mobile terminal 100 is able to display individual correspondent party polyhedrons including Mi-Kyung polyhedron 310, Young-Soo polyhedron 3120 and Jane polyhedron 3110.

A method of transceiving data with a corresponding correspondent party is displayed on each facet of the individual correspondent party polyhedron. In this case, the data transceiving method can include a call signal transmission (call), a blog access (blog), an upload to file (file), a message transmission (message), an email transmission (e-mail) and the like.

Moreover, according to a frequency of contact with a correspondent party corresponding to an individual correspondent party polyhedron or a priority setting order, it is able to make the Mi-Kyung polyhedron 310, the Young-Soo polyhedron 3120 and the Jane polyhedron 3110 differ from each other in size.

In case of receiving an input of a touch & drag action from a fourth image 2506 in the image list shown in FIG. 31A to a facet 3113 of the Jane polyhedron 3110 having the blog displayed thereon [①], the mobile terminal 100 is able to upload the fourth image to the blog of Jane [FIG. 31B].

In case of receiving an input of a touch & drag action from a fourth image 2506 in the image list shown in FIG. 31A to a facet 3123 of the Young-Soo polyhedron 3120 having the call displayed thereon [②], the mobile terminal 100 is able to send the fourth image in the course of transmitting a call signal to Young Soo [FIG. 31C].

Figure 32A:
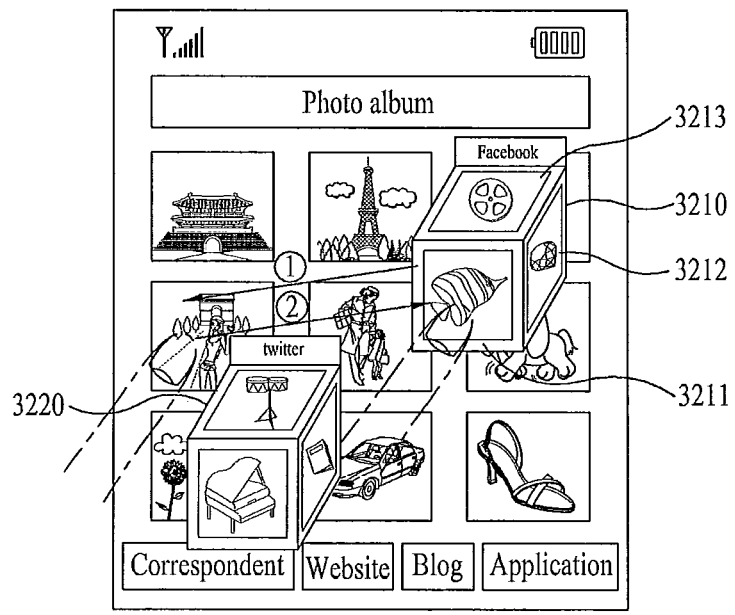
FIGS. 32A to 32C are diagrams for screen configuration of uploading specific data to a specific website using a 3D polyhedron displayed per website, in case that a reception target item is a website, according to the present invention.
Figure 32B:
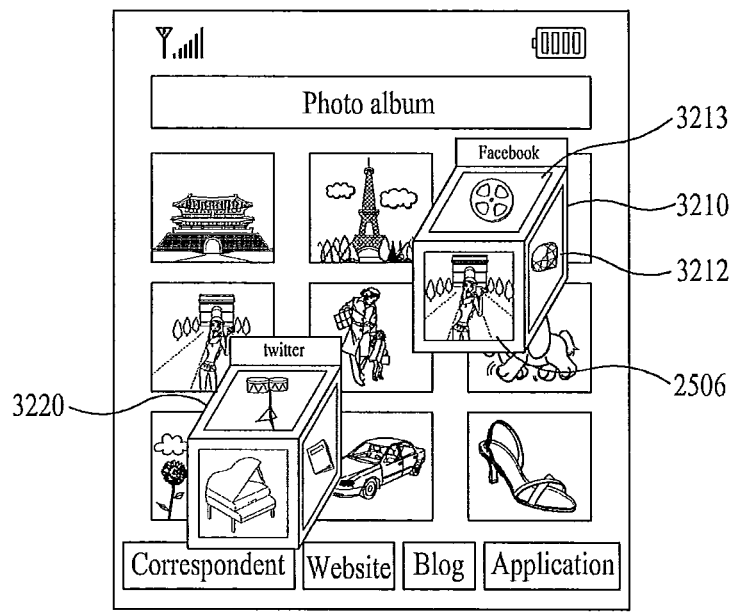
Figure 32C:
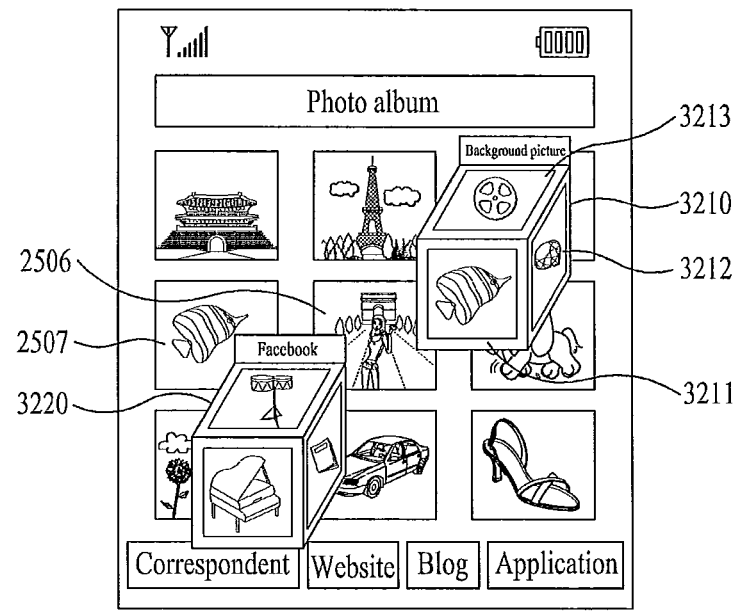

FIGS. 32A to 32C are diagrams for screen configuration of uploading specific data to a specific website using an individual polyhedron designated per website (hereinafter named an individual website polyhedron), in case that a reception target item is a website, according to the present invention.

Referring to FIG. 32A, while displaying an image list, the mobile terminal 100 is able to display individual website polyhedrons including a FACEBOOK polyhedron 3210 and a TWITTER polyhedron 3220. In this case, the FACEBOOK or the TWITTER is a website name.

The data (e.g., image) already uploaded to the corresponding website can be displayed on each facet of the individual website polyhedron. Moreover, according to frequency of access to the website corresponding to the individual website polyhedron or priority setting order, the FACEBOOK polyhedron 3210 and the TWITTER polyhedron 322 can be set to differ from each other in size.

In case of receiving an input of a touch & drag action to a first facet 3211 of the FACEBOOK polyhedron 3210 from the fourth image 2506 in the image list shown in FIG. 32A [①], the mobile terminal 100 is able to display the fourth image on the first facet 3211 [FIG. 32B].

In case of receiving an input of a touch & drag action to the image list from the first facet 3211 of the FACEBOOK polyhedron 3210 shown in FIG. 32A [②], the mobile terminal 100 is able to add the image 2507 displayed on the first facet 3211 to the data list [FIG. 32C].

Figure 33A:
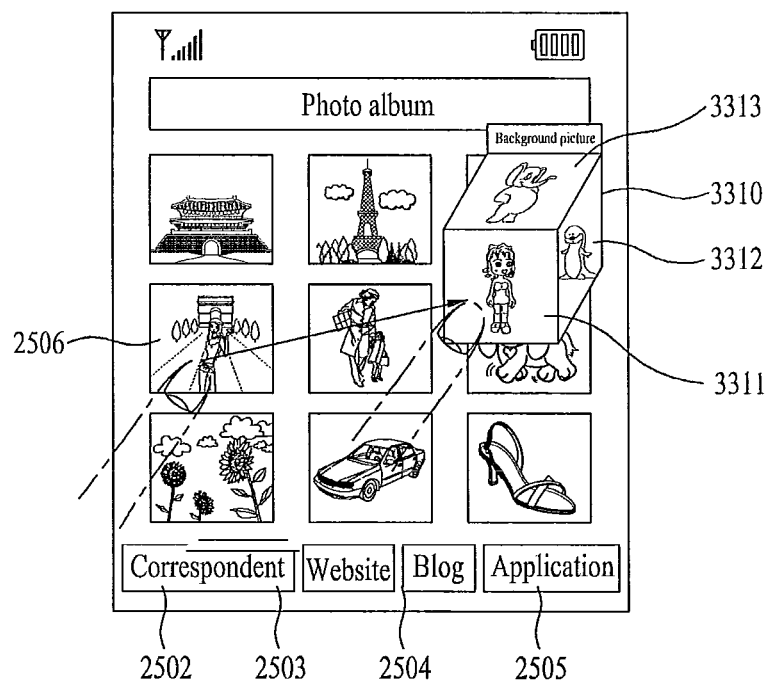
FIGS. 33A to 33C are diagrams for screen configuration of attaching specific data to a specific application using a 3D polyhedron displayed per application, in case that a reception target item is an application, according to the present invention.
Figure 33B:
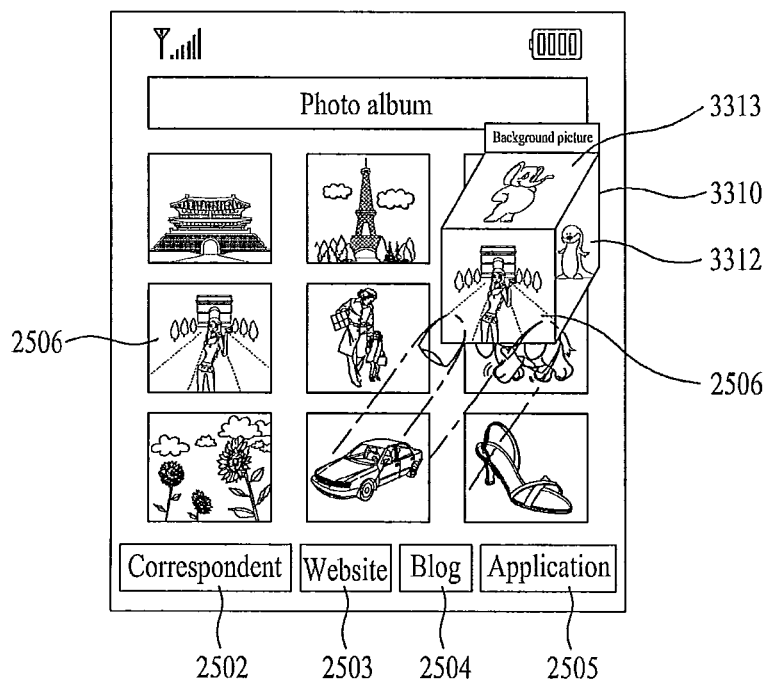
Figure 33C:
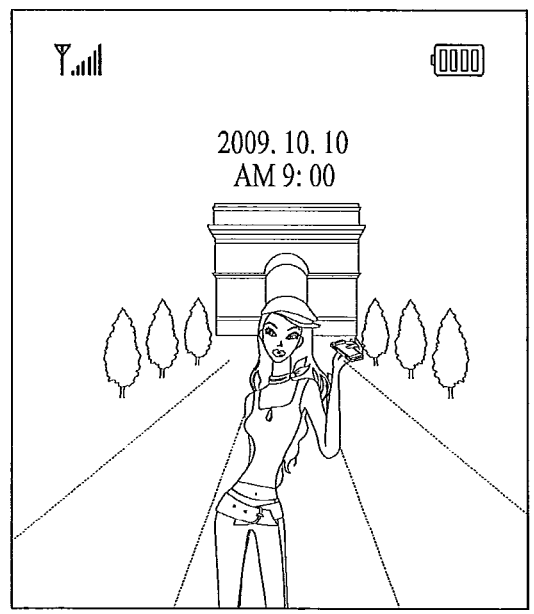

FIGS. 33A to 33C are diagrams for screen configuration of attaching specific data to a specific application using an individual polyhedron (hereinafter named an individual application polyhedron) designated per application, in case that a reception target item is an application, according to the present invention.

Referring to FIG. 33A, while displaying an image list, the mobile terminal 100 is able to display a background picture polyhedron 3310 as the individual application polyhedron.

An image settable to a background image can be displayed on each facet of the background picture polyhedron 3310. Moreover, if the number of the images settable to the background pictures is greater than that of the facets of the background picture polyhedron 3310, it is able to display at least two background picture polyhedrons.

In case of receiving an input of a touch & drag action to a first facet 3311 of the background picture polyhedron 3310 from the fourth image 2506 in the image list shown in FIG. 33A, the mobile terminal 100 designates the fourth image as an image settable to a background image and is able to display the fourth image on the first facet 3311 [FIG. 33B]. FIG. 33C shows a case that the fourth image is set to the background picture.

According to the present invention, when a new event occurs in the course of execution of a specific application, the mobile terminal 100 is able to display a 3D polyhedron (hereinafter named an event indication polyhedron) having at least one facet on which information on the new event is displayed.

For instance, the new event can include a new message reception, a schedule indication, a new data upload to a specific website or the like.

Regarding this, the following description is made in detail with reference to FIGS. 34A to 34E. For clarity and convenience of the following description, assume that a specific application is a website access.

Figure 34A:
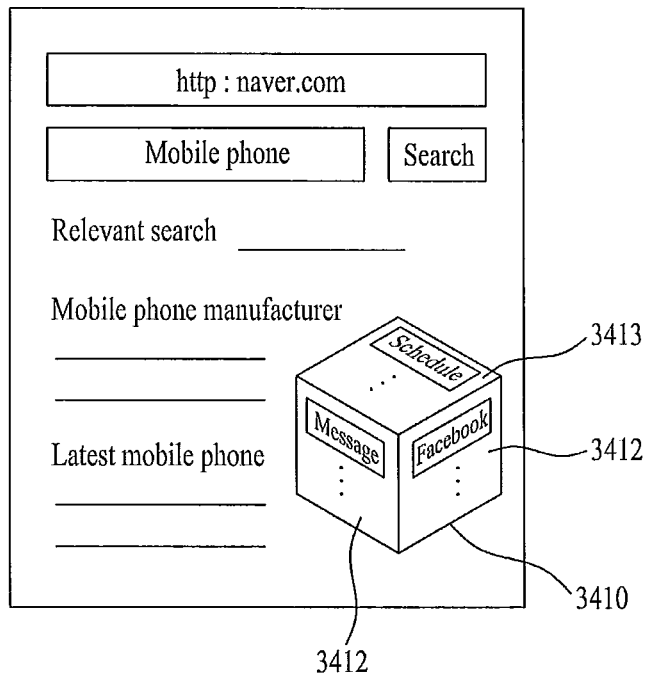

First of all, while an webpage is being displayed according to a website access, if a new event occurs, the mobile terminal 100 is able to display information on the new event on each facet of an event indication polyhedron 3410 [FIG. 34A].

Figure 34B:
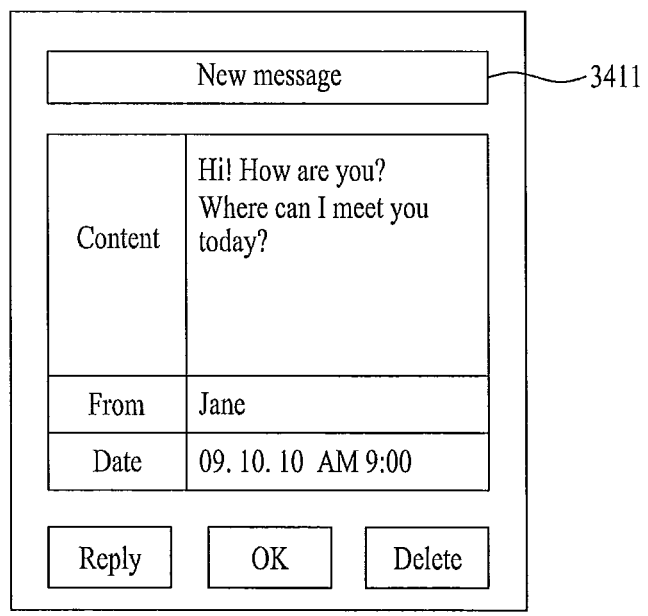
Figure 34C:
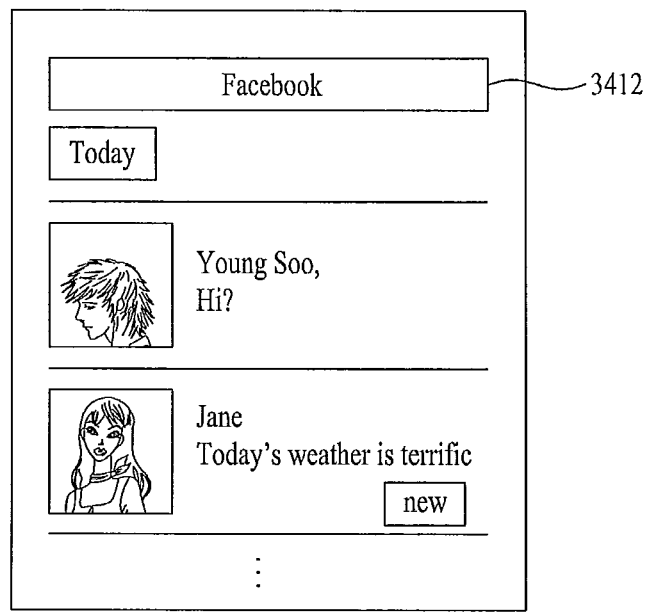
Figure 34D:
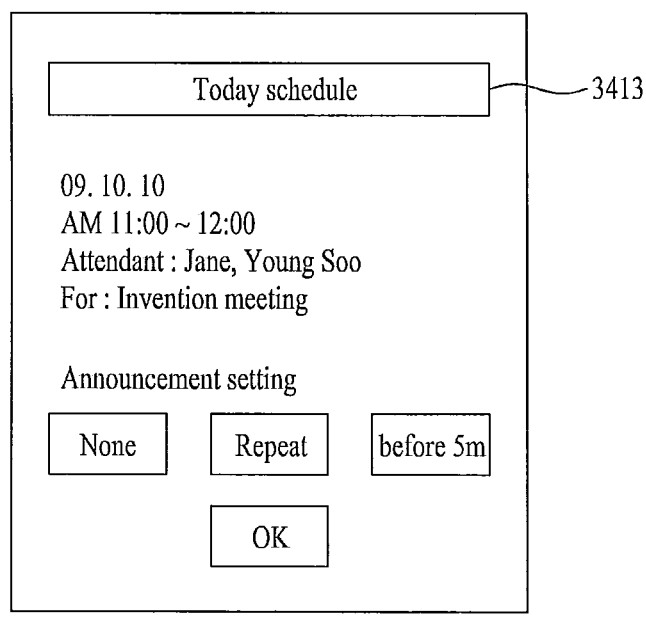

For instance, information on a newly received message can be displayed on a first facet 3411 [FIG. 34B]. Information on data newly uploaded to a specific website can be displayed on a second facet 3412 [FIG. 34C]. And, information on a schedule designated to a predetermined period of time from a current timing point can be displayed on a third facet 3413 [FIG. 34D].

Referring to FIG. 34E, in case of receiving an input of a selection signal of the first facet 3411 of the event indication polyhedron 3410 [a], the mobile terminal 100 partitions the screen into a first partitioned region and a second partitioned region and is then able to display a webpage and a content of a newly received message on the first partitioned region and the second partitioned region, respectively [b].

Meanwhile, if a random point of the first partitioned region is touched in FIG. 34E (b) [example of a return command action], the mobile terminal 100 is able to return to the state shown in FIG. 34E (a).

According to the present invention, while a webpage according to a website access is being displayed, the mobile terminal 100 is able to bookmark a specific webpage using a 3D polyhedron.

For instance, referring to FIG. 35A, in case of receiving an input of a touch & drag action to a first facet 3511 of a 3D polyhedron 3510 from a random point of a display region of a specific webpage [a], the mobile terminal 100 bookmarks the specific webpage and is able to display the specific webpage on the first facet 3511 [b].

Referring to FIG. 35B, in case of receiving an input of a touch & drag action to a third facet 3513 of a 3D polyhedron 3510 from a specific one of a plurality of images included in a specific webpage [a], the mobile terminal 100 bookmarks the webpage corresponding to the specific image and is able to display the webpage corresponding to the specific image on the third facet 3513 [b].

According to the present invention, if a specific correspondent party is selected, the mobile terminal 100 is able to display a 3D polyhedron including at least one facet on which a data transceiving method corresponding to the selected specific correspondent party is displayed.

For instance, referring to FIG. 36A, if a specific correspondent party 3601 is selected from a correspondent party contact list, the mobile terminal 100 is able to display a 3D polyhedron 3610 having facets on which the data transceiving methods are displayed, respectively. In this case, the methods of transceiving data with the specific correspondent party 3601 include a text message (SMS), a messenger (IM) and a call connection (Call).

Referring to FIG. 36B, in case of checking a message received from a specific correspondent party 3602, the mobile terminal 100 is able to display a 3D polyhedron 3630 having facets on which the data transceiving methods are displayed, respectively. In this case, the methods of transceiving data with the specific correspondent party 3602 include a text message (SMS), a blog access (Blog), and a call connection (Call).

Referring to FIG. 36C, in case of displaying an image having a specific correspondent party 3603 included as an object therein, the mobile terminal 100 is able to display a 3D polyhedron 3630 having facets on which the data transceiving methods are displayed, respectively. In this case, the methods of transceiving data with the specific correspondent party 3603 include a text message (SMS), a blog access (Blog) and a file (File).

According to the present invention, the mobile terminal 100 is able to set a 3D polyhedron display function via a menu search. The mobile terminal 100 receives an input of a designation signal of data, which will be displayed on each facet of a 3D polyhedron, from a user and is also able to designate the data to each facet of the 3D polyhedron to correspond to the inputted designation signal.

Regarding this, the following description is made in detail with reference to FIGS. 37A to 37H.

Referring to FIG. 37A, if a menu item 3701 of a menu view method setting is selected via a menu search conducted by a user is selected [a], the mobile terminal 100 is able to display a menu view method list [b].

If a 3D polyhedron display (polyhedron UI) 3703 is selected from the menu view method list shown in FIG. 37A (b), the mobile terminal is able to set a menu view method using a 3D polyhedron. Therefore, the mobile terminal 100 is able to display the corresponding data on each facet of the 3D polyhedron.

Referring to FIG. 37B, if a menu item (polyhedron UI setting) 3702 of data designation to each facet of a 3D polyhedron is selected via a menu search conducted by a user [a], the mobile terminal 100 is able to display a type list 3701 of data which will be displayed on each facet of the 3D polyhedron [b].

For instance, the type list 3710 can include a reception target application (example of reception target item), reception target correspondent party (example of reception target item), attachable data (example of application related data), attached data (example of application related data), multitasking application and the like.

Figure 37C:
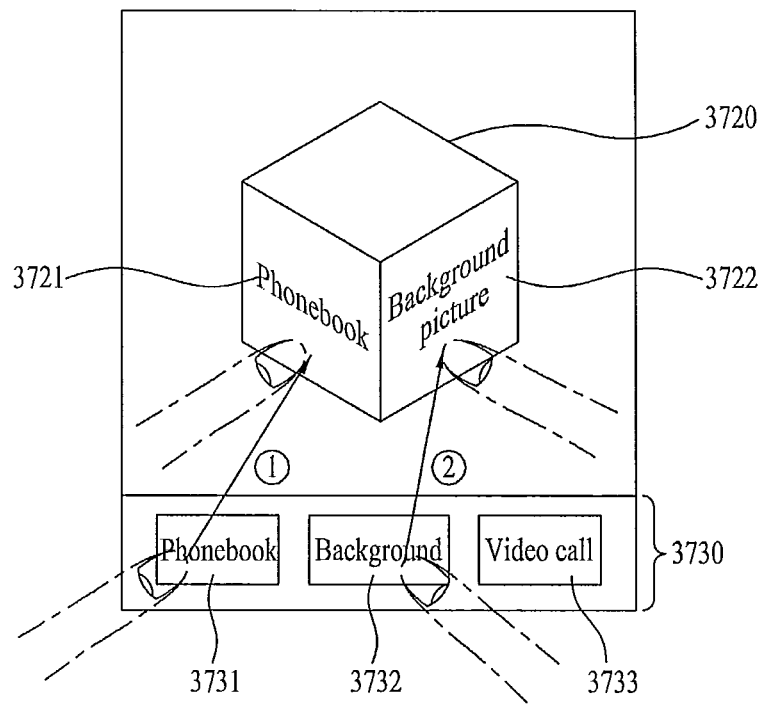

Referring to FIG. 37C, if a reception target application 3711 is selected from the type list 3710, the mobile terminal 100 is able to respectively display a 3D polyhedron 3720 and a list 3730 of designation available applications. In case of receiving an input of a touch & drag action to a first facet 3721 from a phonebook 3731 and a touch & drag action to a second facet 3722 from a background picture 3732, the mobile terminal 100 is able to designate the phonebook 3731 and the background picture 3732 to the first facet 3721 and the second facet 3722, respectively. In this case, the phonebook 3731 and the background picture 3732 are included in the designation available applications.

Meanwhile, applications can be designated to the rest of the facets except the first and second facets, respectively [not shown in the drawing].

Figure 37D:
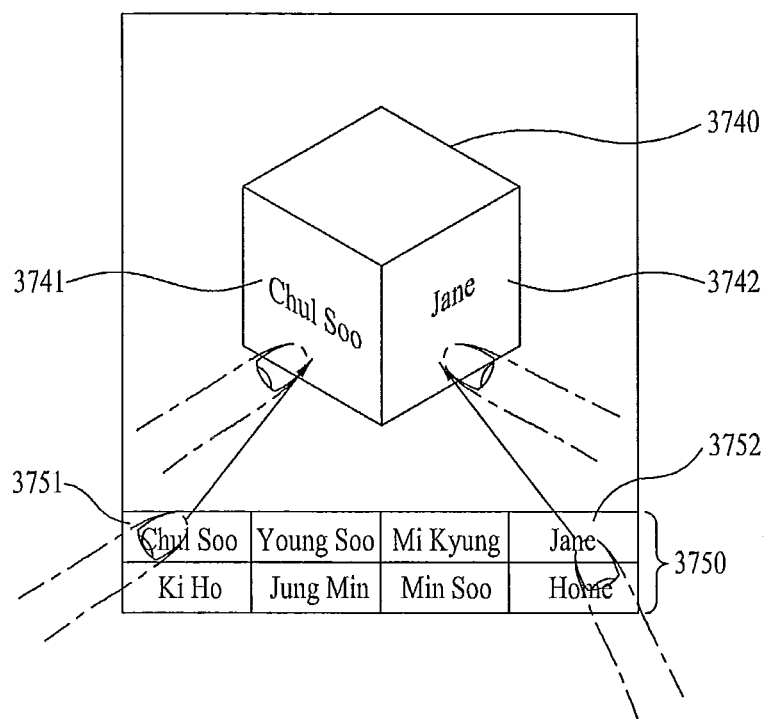

Referring to FIG. 37D, if a reception target correspondent party 3712 is selected from the type list 3710, the mobile terminal 100 is able to respectively display a 3D polyhedron 3740 and a list 3750 of designation available correspondent parties. In case of receiving an input of a touch & drag action to a first facet 3741 from Chul Soo 3751 and a touch & drag action to a second facet 3742 from Jane 3752, the mobile terminal 100 is able to designate the Chul Soo 3751 and the Jane 3752 to the first facet 3741 and the second facet 3742, respectively. In this case, the Chul Soo 3751 and the Jane 3752 are included in the designation available correspondent parties.

Meanwhile, correspondent parties can be designated to the rest of the facets except the first and second facets, respectively [not shown in the drawing].

Figure 37E:
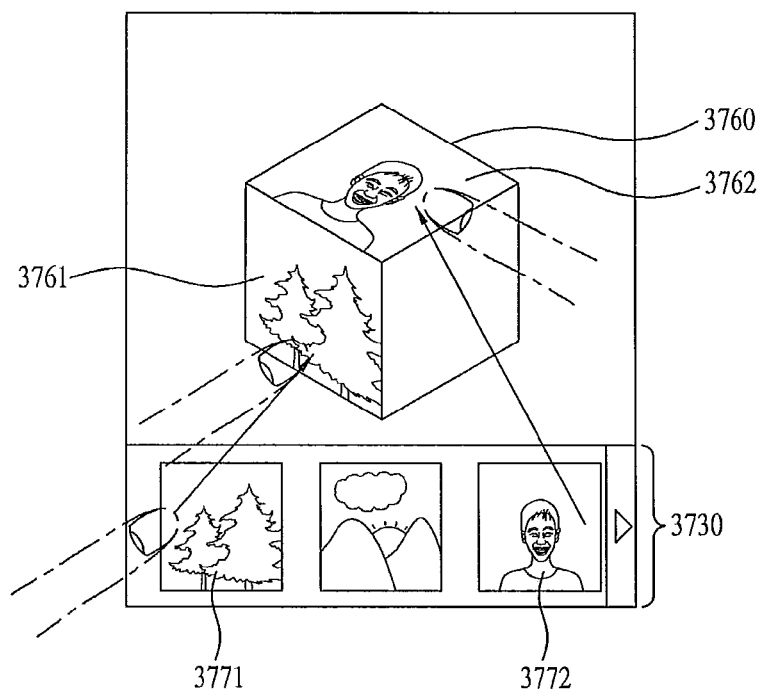

Referring to FIG. 37E, if an attachable data 3713 is selected from the type list 3710, the mobile terminal 100 is able to respectively display a 3D polyhedron 3760 and a list 3770 of attachable data. In case of receiving an input of a touch & drag action to a first facet 3761 from a first data 3771 and a touch & drag action to a second facet 3762 from a second data 3772, the mobile terminal 100 is able to designate the first data 3757 and the second data 3772 to the first facet 3761 and the second facet 3762, respectively. In this case, the first data 3771 and the second data 3772 are included in the attachable data.

Meanwhile, attachable data can be designated to the rest of the facets except the first and second facets, respectively [not shown in the drawing].

Figure 37F:
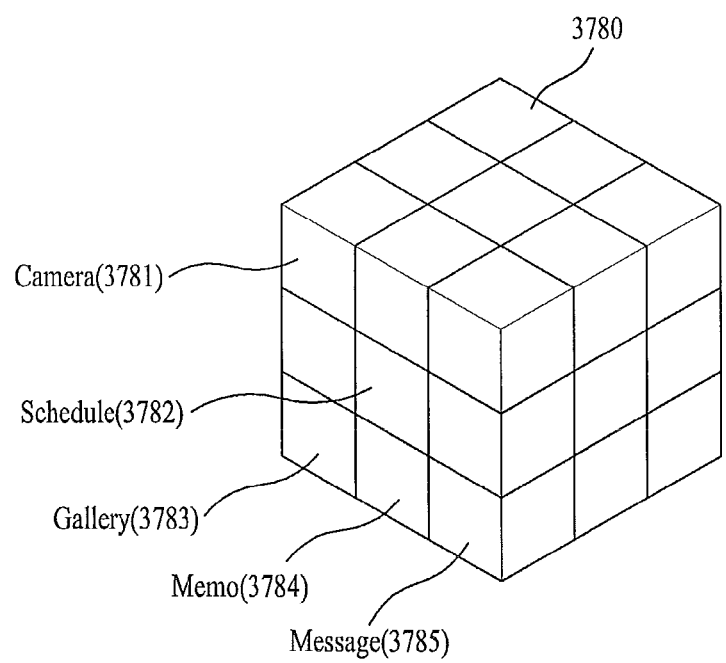
Figure 37G:
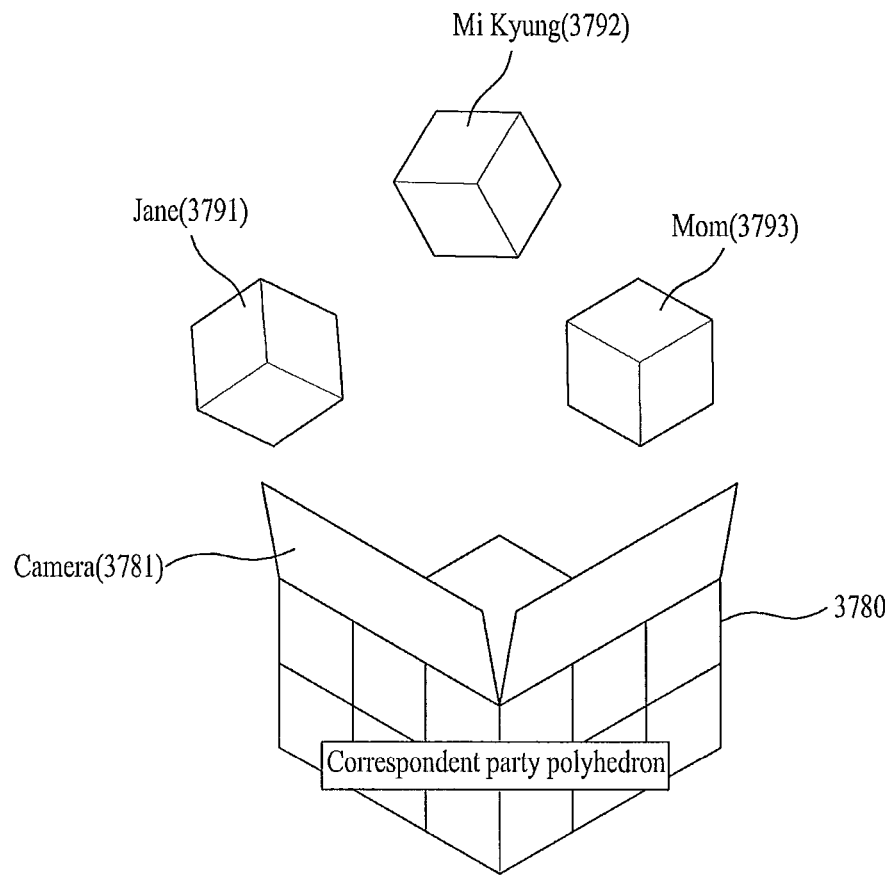
Figure 37H:
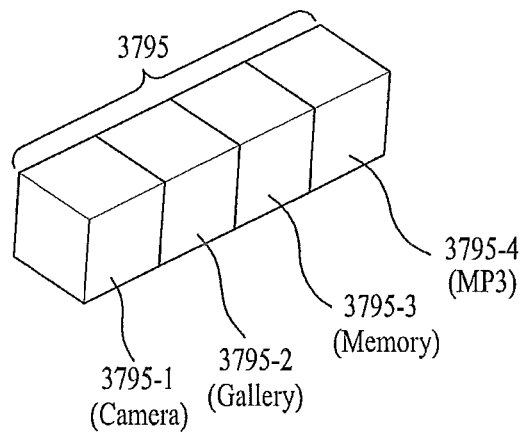

FIGS. 37F to 37H show various methods of displaying a 3D polyhedron.

For instance, referring to FIG. 37F, one facet of a 3D polyhedron is partitioned into a plurality of regions. And, data can be displayed on each of the partitioned regions. Referring to FIG. 37G, it is able to configure a polyhedron (e.g., a correspondent party polyhedron) 3790 in a manner that a plurality of sub-polyhedrons 3791 to 3793 are included in the polyhedron 3790. Referring to FIG. 37H, a plurality of 3D polyhedrons are arranged in a row to configure a polyhedron 3795.

According to the present invention, the mobile terminal 100 is able to perform at least one of a shift, enlargement, reduction, rotation and size change on a 3D polyhedron.

Figure 38E:
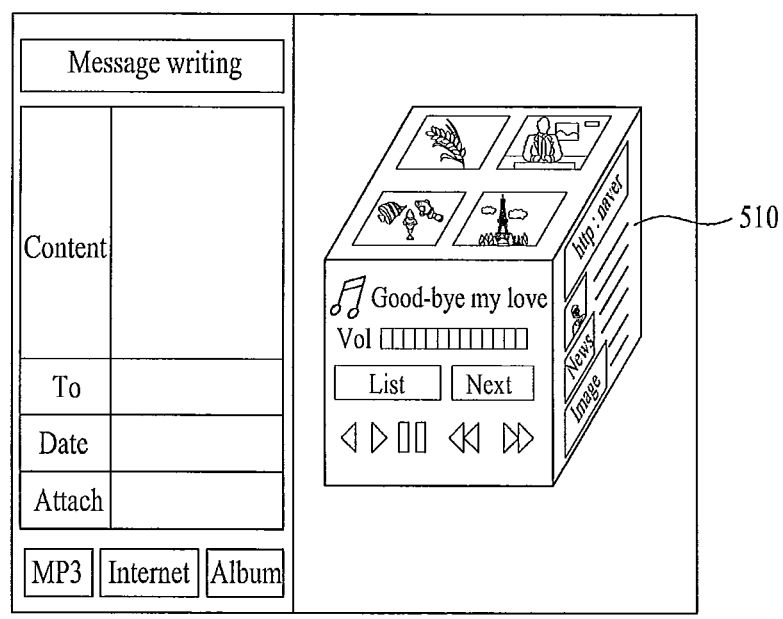

Regarding this, the following description is made in detail with reference to FIGS. 38A and 38E.

Referring to FIG. 38A, in case that a user inputs a touch & drag action to a second point from a first point (located within a 3D polyhedron 510), the mobile terminal 100 is able to shift the 3D polyhedron 510 to a position corresponding to the second point.

Referring to FIG. 38B, in case that a user inputs a touch & drag action to a second point (located outside a 3D polyhedron 510) from a first point (located within the 3D polyhedron 510), the mobile terminal 100 is able to shift the 3D polyhedron 510 to correspond to a distance of the touch & drag.

Referring to FIG. 38C, in case that a user inputs a touch & drag action to a second point (located outside a 3D polyhedron 510) from a first point (located within the 3D polyhedron 510), the mobile terminal 100 is able to reduce the 3D polyhedron 510 to correspond to a distance of the touch & drag.

Referring to FIG. 38D, if a user inputs a touch action at a predetermined speed in a predetermined distance, the mobile terminal 100 is able to rotate a 3D polyhedron in a predetermined direction at a count or angle corresponding to the predetermined speed.

Referring to FIG. 38E, the mobile terminal 100 partitions a screen into a plurality of regions. The mobile terminal 100 displays an execution picture of an application on a first partitioned region and also displays a 3D polyhedron on a second partitioned region. Of course, as mentioned in the foregoing description, the mobile terminal 100 is able to display the 3D polyhedron 510 on a prescribed region of the execution picture.

Regarding the 3D polyhedron display, if the mobile terminal 100 receives an input of a display command signal of a 3D polyhedron from a user or is in a situation for displaying the 3D polyhedron, it is able to automatically display the 3D polyhedron.

After a 3D polyhedron has been displayed, if an operation using the 3D polyhedron is not performed for a predetermined period of time, the mobile terminal 100 is able to stop displaying the 3D polyhedron under the control of the controller 180.

Accordingly, the present invention provides the following effects and/or advantages.

First of all, the present invention displays a 3D polyhedron including facets, on which control windows of all applications ongoing to be executed as backgrounds in multitasking mode are displayed, respectively, thereby effectively controlling an operation of the corresponding application without a picture switching using the control window displayed on each of the facets of the 3D polyhedron.

Secondly, the present invention displays a 3D polyhedron including facets, on which at least one or more data related to a currently executed application are displayed in a specific application executed state, thereby effectively controlling an operation of the corresponding application without a picture switching using the data displayed on each of the facets of the 3D polyhedron.

Thirdly, when a 3D polyhedron having a reception target item displayed on its facet is displayed in a data list display state, if a touch & drag action to a specific facet of the 3D polyhedron from specific data in the data list is inputted, the present invention enables the specific data to be effectively attached as a specific reception target item.

According to one embodiment of the present invention, the above-described application controlling methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a display unit configured to display an execution screen of a first application among a plurality of executed applications; and
a processor configured to:
control the display unit to display a plurality of execution items and a 3D polyhedron display item on a background screen when the background screen is displayed instead of the execution screen of the first application, the plurality of execution items indicating each of the plurality of executed applications;
control the display unit to display the execution screen of the first application including a 3D polyhedron instead of the background screen when the 3D polyhedron display item is selected, the 3D polyhedron displaying a plurality of control windows corresponding to the plurality of executed applications except the first application on each facet of facets of the 3D polyhedron;
partition a display region of the display unit into a first region and a second region when one of the facets of the 3D polyhedron is selected and a screen partition command is received;

control the display unit to display the execution screen of the first application in the first region; and control the display unit to display an execution screen of a second application corresponding to a control window displayed on the selected one of the facets and the 3D polyhedron in the second region.

2. The mobile terminal of claim 1, wherein the processor executes the first application as a foreground and also executes the plurality of executed applications except the first application as a background.

3. The mobile terminal of claim 1, wherein the processor performs at least one of shift, enlargement, reduction and rotation of the 3D polyhedron according to an externally inputted input signal.

4. An application controlling method of a mobile terminal, the method comprising:

executing a plurality of applications;

displaying, on a display of the mobile terminal, an execution screen of a first application among the plurality of executed applications;

displaying, on a background screen of the display, a plurality of execution items and a 3D polyhedron display item when the background screen is displayed instead of the execution screen of the first application, the plurality of execution items indicating each of the plurality of the executed applications;

displaying, on the display, the execution screen of the first application including a 3D polyhedron instead of the background screen when the 3D polyhedron display item is selected, the 3D polyhedron displaying a plurality of control windows corresponding to the plurality of executed applications except the first application on each facet of facets of the 3D polyhedron;

partitioning a display region of the display into a first region and a second region when one of the facets of the 3D polyhedron is selected and a screen partition command is received;

displaying, in the first region, the execution screen of the first application; and displaying, in the second region, an execution screen of a second application corresponding to a control window displayed on the selected one of the facets and the 3D polyhedron.

* * * * *